US012806519B2

(12) United States Patent
Kaku et al.

(10) Patent No.: US 12,806,519 B2
(45) Date of Patent: Nov. 24, 2026

(54) SEAT EXPERIENCE SYSTEM, SEAT UNIT AND CAR

(71) Applicant: TS TECH CO., LTD., Asaka (JP)

(72) Inventors: Hiroyuki Kaku, Shioya-gun (JP); Atsushi Kusano, Shioya-gun (JP); Akira Miyoshi, Shioya-gun (JP); Satoshi Suzuki, Shioya-gun (JP); Munetaka Kowa, Shioya-gun (JP); Yousuke Higashi, Shioya-gun (JP); Yoshikazu Ito, Shioya-gun (JP)

(73) Assignee: TS TECH CO., LTD., Saitama (JP)

( * ) Notice: Subject to any disclaimer, the term of this patent is extended or adjusted under 35 U.S.C. 154(b) by 152 days.

(21) Appl. No.: 18/774,449

(22) Filed: Jul. 16, 2024

(65) Prior Publication Data

US 2024/0367039 A1 Nov. 7, 2024

Related U.S. Application Data

(63) Continuation of application No. 17/631,606, filed as application No. PCT/JP2020/028661 on Jul. 27, 2020, now Pat. No. 12,076,639.

(30) Foreign Application Priority Data

Jul. 30, 2019 (JP) ................................ 2019-139314
Dec. 11, 2019 (JP) ................................ 2019-223427
Dec. 11, 2019 (JP) ................................ 2019-223430

(51) Int. Cl.
*A63F 13/428* (2014.01)
*A63F 13/57* (2014.01)
(Continued)

(52) U.S. Cl.
CPC ............ *A63F 13/428* (2014.09); *A63F 13/57* (2014.09); *A63F 13/803* (2014.09); *B60N 2/90* (2018.02); *B60N 2002/981* (2018.02)

(58) Field of Classification Search
CPC ...... A63F 13/428; A63F 13/57; A63F 13/803; A63F 13/21; A63F 13/90; A63F 13/218;
(Continued)

(56) References Cited

U.S. PATENT DOCUMENTS 6,009,750 A * 1/2000 Maurer ............... G01M 99/001 73/172
10,517,539 B2 12/2019 Sai et al.
(Continued)

FOREIGN PATENT DOCUMENTS

CN 107233730 A 10/2017
JP H0923476 A 1/1997
(Continued)

OTHER PUBLICATIONS

Notice of Reasons for Refusal issued for Japanese Patent Application No. 2024-118328, Dispatch date: Apr. 22, 2025, 8 pages including English machine translation.
(Continued)

*Primary Examiner* — Pierre E Elisca
(74) *Attorney, Agent, or Firm* — HSML P.C.

(57) ABSTRACT

A seat experience system that allows an occupant to grasp the state of the system and feel secure about using the system is provided. In the seat experience system, a seat includes a seat body, and a sensor provided at the seat body and configured to acquire a measurement value for detection of a motion of the occupant seated on the seat body. A controller is connected to the sensor and capable of acquiring the measurement value from the sensor, and a seat experience device is connected to the controller and operable based on the measurement value. The seat experience device may be capable of communicating with a server. If the seat experience device detects a malfunction of the seat experience system, the seat experience device notifies the
(Continued)

occupant of the malfunction and limits at least a subset of functions of the seat experience system.

20 Claims, 30 Drawing Sheets

(51) Int. Cl.
*A63F 13/803* (2014.01)
*B60N 2/90* (2018.01)

(58) Field of Classification Search
CPC ........ A63F 13/24; A63F 13/814; A63F 13/55; A63F 2300/1056; A63F 2300/8017; B60N 2/90; B60N 2002/981; B60N 2/0028; G06F 3/01; G06F 3/011
USPC ............................................................ 463/36
See application file for complete search history.

(56) References Cited

U.S. PATENT DOCUMENTS

| | | | |
|---|---|---|---|
| 11,904,749 | B2 | 2/2024 | Kaku et al. |
| 11,932,147 | B2 | 3/2024 | Kaku et al. |
| 2017/0101011 | A1 | 4/2017 | Hong |
| 2018/0156629 | A1 | 6/2018 | Lem et al. |
| 2019/0239813 | A1 | 8/2019 | Sai et al. |
| 2019/0359334 | A1 | 11/2019 | Riedel et al. |
| 2021/0039537 | A1 | 2/2021 | Kaku et al. |
| 2021/0078448 | A1 | 3/2021 | Kaku et al. |
| 2021/0188131 | A1 | 6/2021 | Kaku |
| 2021/0237620 | A1 | 8/2021 | Mizoi et al. |
| 2022/0242292 | A1 | 8/2022 | Kaku et al. |
| 2022/0288490 | A1 | 9/2022 | Kaku et al. |
| 2024/0149773 | A1 | 5/2024 | Kaku et al. |

FOREIGN PATENT DOCUMENTS

| | | | |
|---|---|---|---|
| JP | H1156818 | A | 3/1999 |
| JP | H1164131 | A | 3/1999 |
| JP | 2006250627 | A | 9/2006 |
| JP | 2009020656 | A | 1/2009 |
| JP | 2014104253 | A | 6/2014 |
| JP | 2015063253 | A | 4/2015 |
| JP | 2015150064 | A | 8/2015 |
| JP | 2017065504 | A | 4/2017 |
| JP | 2019130230 | A | 8/2019 |
| JP | 2019151251 | A | 9/2019 |

OTHER PUBLICATIONS

Notice of Reasons for Refusal issued for Japanese Patent Application No. 2024-118328, Dispatch date: Jul. 1, 2025, 8 pages including English machine translation.

Notice of Reasons for Refusal issued for Japanese Patent Application No. 2023-215413, Dispatch date: Aug. 20, 2024, 20 pages including English machine translation.

First Office Action issued for Chinese Patent Application No. 202080055870.2, dated Jan. 8, 2025, 20 pages including English machine translation.

Notice of Reasons for Refusal issued for Japanese Patent Application No. 2023-190474, Dispatch date: Mar. 5, 2025, 8 pages including English machine translation.

Notice of Reasons for Refusal issued for Japanese Patent Application No. 2023-190474, Dispatch date: Aug. 5, 2025, 8 pages including English machine translation.

Minoru Moriwaki, Games Coupled with Movement of a Car . . . Porsche, Development of VR Entertainment for Backseat Occupants, Response [Online], Jul. 18, 2019, [date of retrieval Sep. 10, 2020], Internet:<URL: https://response.jp/article/2019/07/18/324548.html> p. 1, Paragraphs 1 to 4 (2 pages with partial English translation of relevant portion, i.e., written descriptions of the article).

Honda, Public Demonstration of Car-installed VR system [Dream Drive], Real Time Coupling with Movement of a Car, PANORA [Online], Jan. 9, 2017, [date of retrieval Sep. 10, 2020], Internet:<URL: http://panora.tokyo/18684> p. 1, Paragraph 2 (4 pages with partial English translation of relevant portion, which explains functions of Honda Dream Drive.).

New Car-installed Entertainment of Audi in which Movement of a Car is coupled with VR Space, @ Dime [Online], Jan. 9, 2019, [date of retrieval Sep. 10, 2020], Internet:<URL: https://dime.jp/genre/649817/> pp. 2 to 3 (6 pages with partial English translation of relevant portion, i.e., portions of the article explaining the entertainment system).

International Search Report and Written Opinion issued for International Patent Application No. PCT/JP2020/028661, Date of mailing: Oct. 13, 2020, 18 pages including English translation.

Notification of Reasons for Refusal issued for Japanese Patent Application No. 2019-139314, Dispatch Date: May 16, 2023, 9 pages including English translation.

Notification of Reasons for Refusal issued for Japanese Patent Application No. 2019-223427, Dispatch Date: Jun. 6, 2023, 7 pages including English translation.

Notice of Reasons for Refusal issued for Japanese Patent Application No. 2023-097417, Dispatch date: Apr. 16, 2024, 8 pages including English machine translation.

Notice of Reasons for Refusal issued for Japanese Patent Application No. 2024-205912, dated Jan. 20, 2026, 6 pages including English machine translation.

* cited by examiner

FIG.6

| CONDITIONS | IMITATIVE WORDS |
|---|---|
| $1.5 \leq TS/TS_n$ | fura-fura (tottering) |
| $1.2 \leq TS/TS_n < 1.5$ | nosshi-nosshi (lumping along) |
| $0.7 \leq TS/TS_n < 1.2$ | suta-suta (walking at brisk pace) |
| $TS/TS_n < 0.7$ | dota-dota (walking with heavy steps noisily) |

FIG.7

| NUMBER OF STEPS | EXERCISE LEVELS |
|---|---|
| ～60 | slow rambling |
| 61～110 | usual daily-life walking |
| 111～140 | exercise walking |
| 141～240 | jogging |
| 240～ | dashing |

(a)

(b)

(a)

(b)

(a)

(b)

SEAT EXPERIENCE SYSTEM, SEAT UNIT AND CAR

TECHNICAL FIELD

The present disclosure relates to a seat experience system, seat unit, and car including a sensor provided at a seat body.

BACKGROUND ART

A device with a pressure sensor or the like installed at an occupant's seat to estimate a sitting posture of the occupant is known in the art (Patent Document 1, Patent Document 2).

CITATION LIST

Patent Document

Patent Document 1: JP H11-064131 A
Patent Document 2: JP 2017-65504 A

SUMMARY OF INVENTION

However, the devices disclosed in Patent Document 1 and Patent Document 2 only evaluate and provide the evaluation for a sitting posture of the driver, and do not encourage a motivation of an occupant. The inventors named in the present application and their colleagues have been contemplating a seat experience system that uses measurement values of a sensor provided at a seat to encourage the motivation of an occupant seated on the seat and make the time seated on the seat more worthwhile. In such an advanced system, it is desirable that an occupant can understand the state of the system, the system operation is changed according to the state of the system, and an occupant can safely enjoy the system.

In such a seat experience system, it is desirable to cut down on power consumption.

Further, to suggest a new value of a seat, the inventors named in the present application and their colleagues have been contemplating a seat experience system in which an operable object on a screen of a terminal can be operated by means of a seat.

A seat experience system comprising a seat, a controller, and a seat experience device is proposed herein.

The seat includes a seat body, and a sensor. The sensor is provided at the seat body and acquires a measurement value for detection of a motion of an occupant seated on the seat body. The controller is connected to the sensor and capable of acquiring the measurement value from the sensor.

The seat experience device is connected to the controller and configured operable based on the measurement value.

If the seat experience device detects a malfunction of the seat experience system, the seat experience device notifies the occupant of the malfunction and limits at least a subset of functions of the seat experience system.

According to this configuration, since the seat experience device notifies the occupant of a malfunction and limits at least a subset of functions of the seat experience system if the seat experience device detects the malfunction of the seat experience system, the occupant can grasp the state of the system and feel secure about using the seat experience system.

It is preferable that if the seat experience device detects a malfunction of the seat experience system, the seat experience device provides a notification of the malfunction to a terminal used by an administrator of the seat experience system.

According to this configuration, since the administrator of the seat experience system can become aware of the malfunction, the malfunction can be quickly fixed. Alternatively, it is possible to offer the occupant an advice of how to deal with the malfunction to thereby make the occupant feel secure.

The seat experience device may be configured to detect a malfunction of the seat experience system in response to receipt of a notification of the malfunction from the controller.

The controller may be configured to determine that a malfunction has occurred in the sensor if a signal from the sensor keeps exhibiting values higher than a predetermined value for a predetermined time period, or keeps exhibiting values lower than a predetermined value for a predetermined time period, or keeps fluctuating greatly for a predetermined time period.

It is preferable that if the controller determines that a malfunction has occurred in the sensor, the controller stops supplying electricity to the sensor.

By not supplying electricity to a sensor in which a malfunction has occurred, power consumption can be reduced.

The seat experience device may further comprise a server with which the seat experience device is capable of communicating. In this case, the seat experience system may be configured in such a manner that if the seat experience device detects a malfunction of the seat experience system, the seat experience device provides a notification of the malfunction to a terminal used by an administrator of the seat experience system and the server, or provides a notification of the malfunction to the server instead of providing a notification of the malfunction to the terminal used by the administrator of the seat experience system.

In the seat experience system, the seat experience device may be configured to provide a game to be played by an occupant making motions on the seat body. The seat experience device may also be configured to be capable of communicating with another seat experience device via the server to execute the game on-line concurrently with the another seat experience device. In this case, the seat experience system may be configured in such a manner that if an error occurs in communication between the seat experience device and the server, the game is not executed on-line concurrently with the another seat experience device and allowed to be executed off-line only.

According to this configuration, the seat experience device can provide a game to the occupant even when it cannot communicate with the server.

In the seat experience system, the seat may be installed in a car. In this case, it is preferable that the seat experience device acquires, from a navigation system, route information currently provided for navigation, location information of the car, and velocity information of the car, and notifies the occupant of a possibility of losing communication with the server, if the seat experience device determines, based on the route information, the location information, and the velocity information, that the car is going to enter an area susceptible to communication failure.

According to this configuration, the occupant can be made aware beforehand that a communication error may possibly occur.

In this disclosure, a seat unit comprising a seat and a controller is proposed. The seat includes a seat body, and a sensor provided at the seat body and configured to acquire a measurement value for detection of a motion of an occupant seated on the seat body, and the controller is connected to the sensor and capable of acquiring the measurement value from the sensor. The controller may be configured to determine that a malfunction has occurred in the sensor if a signal received from the sensor keeps exhibiting values higher than a predetermined value for a predetermined time period, or keeps exhibiting values lower than a predetermined value for a predetermined time period. The seat unit may be configured in such a manner that if the controller determines that a malfunction has occurred in the sensor, the controller stops supplying electricity to the sensor.

As a further aspect of the seat experience system, a seat experience system comprising a seat body, a seat including a plurality of sensors that acquire information for detection of a motion of an occupant seated on the seat body, and a terminal that acquires the information from the sensors and has a screen is proposed.

The terminal changes a velocity of an operable object on the screen based on the information.

According to this configuration, since the velocity of the operable object on the screen is changed based on the information acquired by the terminal from the sensor, the operable object on the screen of the terminal can be operated at a velocity reflecting an intention of the occupant in response to the motion of the occupant on the seat.

The sensor may include a plurality of pressure sensors that acquire values of pressure from the occupant, and the terminal may change the velocity of the operable object on the screen based on the values of pressure.

The terminal may be configured in such a manner that the higher the values of pressure, the higher the velocity of the operable object is.

The terminal may be configured in such a manner that the higher the values of pressure, the lower the velocity of the operable object is.

The pressure sensors may comprise: a first pressure sensor configured to: output a first normal pressure value when a posture assumed by the occupant is a normal posture, output a first higher pressure value higher than the first normal pressure value when the posture assumed by the occupant is a leaning-forward posture in which a weight of the occupant is placed further forward than the weight of the occupant in the normal posture, and output a first lower pressure value lower than the first normal pressure value when the posture assumed by the occupant is a leaning-rearward posture in which the weight of the occupant is placed further rearward than the weight of the occupant in the normal posture, or a second pressure sensor configured to: output a second normal pressure value when the posture assumed by the occupant is the normal posture, output a second lower pressure value lower than the second normal pressure value when the posture assumed by the occupant is a leaning-forward posture in which the weight of the occupant is placed further forward than the weight of the occupant in the normal posture, and output a second higher pressure value higher than the second normal pressure value when the posture assumed by the occupant is a leaning-rearward posture in which the weight of the occupant is placed further rearward than the weight of the occupant in the normal posture, and the terminal may be configured to: determine, upon receipt of the first higher pressure value from the first pressure sensor, or upon receipt of the second lower pressure value from the second pressure sensor, that the posture of the occupant is the leaning-forward posture, and set a velocity of the operable object in such a manner that the higher the first higher pressure value acquired when it is determined that the posture is the leaning-forward posture, or the lower the second lower pressure value acquired when it is determined that the posture is the leaning-forward posture, the higher the velocity of upward movement of the operable object on the screen is.

The pressure sensors may comprise: a first pressure sensor configured to: output a first normal pressure value when a posture assumed by the occupant is a normal posture, output a first higher pressure value higher than the first normal pressure value when the posture assumed by the occupant is a leaning-forward posture in which a weight of the occupant is placed further forward than the weight of the occupant in the normal posture, and output a first lower pressure value lower than the first normal pressure value when the posture assumed by the occupant is a leaning-rearward posture in which the weight of the occupant is placed further rearward than the weight of the occupant in the normal posture, or a second pressure sensor configured to: output a second normal pressure value when the posture assumed by the occupant is the normal posture, output a second lower pressure value lower than the second normal pressure value when the posture assumed by the occupant is a leaning-forward posture in which the weight of the occupant is placed further forward than the weight of the occupant in the normal posture, and output a second higher pressure value higher than the second normal pressure value when the posture assumed by the occupant is a leaning-rearward posture in which the weight of the occupant is placed further rearward than the weight of the occupant in the normal posture, and the terminal may be configured to: determine, upon receipt of the first lower pressure value from the first pressure sensor, or upon receipt of the second higher pressure value from the second pressure sensor, that the posture of the occupant is the leaning-rearward posture, and set a velocity of the operable object in such a manner that the lower the first lower pressure value acquired when it is determined that the posture is the leaning-rearward posture, or the higher the second higher pressure value acquired when it is determined that the posture is the leaning-rearward posture, the higher the velocity of downward movement of the operable object on the screen is.

The pressure sensors may comprise: a third pressure sensor configured to: output a third normal pressure value when a posture assumed by the occupant is a normal posture, output a third higher pressure value higher than the third normal pressure value when the posture assumed by the occupant is a leaning-leftward posture in which a weight of the occupant is placed further leftward than the weight of the occupant in the normal posture, and output a third lower pressure value lower than the third normal pressure value when the posture assumed by the occupant is a leaning-rightward posture in which the weight of the occupant is placed further rightward than the weight of the occupant in the normal posture, or a fourth pressure sensor configured to: output a fourth normal pressure value when the posture assumed by the occupant is the normal posture, output a fourth lower pressure value lower than the fourth normal pressure value when the posture assumed by the occupant is a leaning-leftward posture in which the weight of the occupant is placed further leftward than the weight of the occupant in the normal posture, and output a fourth higher pressure value higher than the fourth normal pressure value when the posture assumed by the occupant is a leaning-rightward posture in which the weight of the occupant is placed further rightward than the weight of the occupant in the normal posture, and the terminal may be configured to: determine, upon receipt of the third higher pressure value from the third pressure sensor, or upon receipt of the fourth lower pressure value from the fourth pressure sensor, that the posture of the occupant is the leaning-leftward posture, and set a velocity of the operable object in such a manner that the higher the third higher pressure value acquired when it is determined that the posture is the leaning-leftward posture, or the lower the fourth lower pressure value acquired when it is determined that the posture is the leaning-leftward posture, the higher the velocity of leftward movement of the operable object on the screen is.

The pressure sensors may comprise: a third pressure sensor configured to: output a third normal pressure value when a posture assumed by the occupant is a normal posture, output a third higher pressure value higher than the third normal pressure value when the posture assumed by the occupant is a leaning-leftward posture in which a weight of the occupant is placed further leftward than the weight of the occupant in the normal posture, and output a third lower pressure value lower than the third normal pressure value when the posture assumed by the occupant is a leaning-rightward posture in which the weight of the occupant is placed further rightward than the weight of the occupant in the normal posture, or a fourth pressure sensor configured to: output a fourth normal pressure value when the posture assumed by the occupant is the normal posture, output a fourth lower pressure value lower than the fourth normal pressure value when the posture assumed by the occupant is a leaning-leftward posture in which the weight of the occupant is placed further leftward than the weight of the occupant in the normal posture, and output a fourth higher pressure value higher than the fourth normal pressure value when the posture assumed by the occupant is a leaning-rightward posture in which the weight of the occupant is placed further rightward than the weight of the occupant in the normal posture, and the terminal may be configured to: determine, upon receipt of the third lower pressure value from the third pressure sensor, or upon receipt of the fourth higher pressure value from the fourth pressure sensor, that the posture of the occupant is the leaning-rightward posture, and set a velocity of the operable object in such a manner that the lower the third lower pressure value acquired when it is determined that the posture is the leaning-rightward posture, or the higher the fourth higher pressure value acquired when it is determined that the posture is the leaning-rightward posture, the higher the velocity of rightward movement of the operable object on the screen is.

The pressure sensors may comprise a fifth pressure sensor that receives a load from a right leg of the occupant, the operable object may be a moving object which moves against a background displayed on the screen, and the terminal may set a velocity of the moving object in such a manner that the higher the pressure value acquired from the fifth sensor, the higher the velocity of forward movement of the moving object is.

The pressure sensors may comprise a sixth pressure sensor that receives a load from a left leg of the occupant, the operable object may be a moving object which moves against a background displayed on the screen, and the terminal may set a velocity of the moving object in such a manner that the higher the pressure value acquired from the sixth sensor, the lower the velocity of forward movement of the moving object is.

The pressure sensors may comprise: a third pressure sensor configured to: output a third normal pressure value when a posture assumed by the occupant is a normal posture, output a third higher pressure value higher than the third normal pressure value when the posture assumed by the occupant is a leaning-leftward posture in which a weight of the occupant is placed further leftward than the weight of the occupant in the normal posture, and output a third lower pressure value lower than the third normal pressure value when the posture assumed by the occupant is a leaning-rightward posture in which the weight of the occupant is placed further rightward than the weight of the occupant in the normal posture, or a fourth pressure sensor configured to: output a fourth normal pressure value when the posture assumed by the occupant is the normal posture, output a fourth lower pressure value lower than the fourth normal pressure value when the posture assumed by the occupant is a leaning-leftward posture in which the weight of the occupant is placed further leftward than the weight of the occupant in the normal posture, and output a fourth higher pressure value higher than the fourth normal pressure value when the posture assumed by the occupant is a leaning-rightward posture in which the weight of the occupant is placed further rightward than the weight of the occupant in the normal posture, the operable object may be a moving object which moves against a background displayed on the screen, and the terminal may be configured to: determine, upon receipt of the third higher pressure value from the third pressure sensor, or upon receipt of the fourth lower pressure value from the fourth pressure sensor, that the posture of the occupant is the leaning-leftward posture, and set a turning velocity of the moving object in such a manner that the higher the third higher pressure value acquired when it is determined that the posture is the leaning-leftward posture, or the lower the fourth lower pressure value acquired when it is determined that the posture is the leaning-leftward posture, the higher the turning velocity of the moving object toward the left is.

The pressure sensors may comprise: a third pressure sensor configured to: output a third normal pressure value when a posture assumed by the occupant is a normal posture, output a third higher pressure value higher than the third normal pressure value when the posture assumed by the occupant is a leaning-leftward posture in which a weight of the occupant is placed further leftward than the weight of the occupant in the normal posture, and output a third lower pressure value lower than the third normal pressure value when the posture assumed by the occupant is a leaning-rightward posture in which the weight of the occupant is placed further rightward than the weight of the occupant in the normal posture, or a fourth pressure sensor configured to: output a fourth normal pressure value when the posture assumed by the occupant is the normal posture, output a fourth lower pressure value lower than the fourth normal pressure value when the posture assumed by the occupant is a leaning-leftward posture in which the weight of the occupant is placed further leftward than the weight of the occupant in the normal posture, and output a fourth higher pressure value higher than the fourth normal pressure value when the posture assumed by the occupant is a leaning-rightward posture in which the weight of the occupant is placed further rightward than the weight of the occupant in the normal posture, the operable object may be a moving object which moves against a background displayed on the screen, and the terminal may be configured to: determine, upon receipt of the third lower pressure value from the third pressure sensor, or upon receipt of the fourth higher pressure value from the fourth pressure sensor, that the posture of the occupant is the leaning-rightward posture, and set a turning velocity of the moving object in such a manner that the lower the third lower pressure value acquired when it is determined that the posture is the leaning-rightward posture, or the higher the fourth higher pressure value acquired when it is determined that the posture is the leaning-rightward posture, the higher the turning velocity of the moving object toward the right is.

Another aspect of the seat experience system is proposed which comprises: a seat including a seat body, and a plurality of sensors configured to acquire information (measurement values) for detection of a motion of an occupant seated on the seat body; a controller capable of acquiring the information from the sensor; and a terminal with a screen.

The controller operates an operable object on the screen based on the information acquired from the sensors.

According to this configuration, since the operable object on the screen is operated based on information acquired by the controller from the sensors, the operable object on the screen of the terminal can be operated by means of the seat in response to the motion of the occupant seated on the seat.

The controller may be provided at the seat body, and configured to set and output to the terminal a command for operating the operable object based on the information acquired from the sensors, and the terminal may operate the operable object based on the command.

According to this configuration, since the process of converting the information received from the sensors to commands does not have to be performed by the terminal, the processing speed of the terminal can be made faster, and, for example, in a game played on the terminal, a controller apart from the seat can be used in combination with the seat.

The controller may be provided at the terminal, and configured to set a command for operating the operable object based on the information acquired from the sensors and to operate the operable object based on the command.

According to this configuration, since the process of converting the information received from the sensors to commands does not have to be performed by the seat, the processing speed of the seat can be made faster.

The controller may be capable of determining, based on the information from the sensors, whether a posture of the occupant is a leaning-forward posture in which a weight of the occupant is placed further forward than the weight of the occupant in a normal posture, or a leaning-rearward posture in which the weight of the occupant is placed further rearward than the weight of the occupant in the normal posture, configured to set a first command when it is determined that the posture of the occupant is the leaning-forward posture, and set a second command when it is determined that the posture of the occupant is the leaning-rearward posture.

The sensors may comprise: a first pressure sensor configured to: output a first normal pressure value when the posture assumed by the occupant is the normal posture, output a first higher pressure value higher than the first normal pressure value when the posture assumed by the occupant is the leaning-forward posture, and output a first lower pressure value lower than the first normal pressure value when the posture assumed by the occupant is the leaning-rearward posture, or a second pressure sensor configured to: output a second normal pressure value when the posture assumed by the occupant is the normal posture, output a second lower pressure value lower than the second normal pressure value when the posture assumed by the occupant is the leaning-forward posture, and output a second higher pressure value higher than the second normal pressure value when the posture assumed by the occupant is the leaning-rearward posture, and the controller may be configured to: determine, upon receipt of the first higher pressure value from the first pressure sensor, or upon receipt of the second lower pressure value from the second pressure sensor, that the posture of the occupant is the leaning-forward posture.

The sensors may comprise: a first pressure sensor configured to: output a first normal pressure value when the posture assumed by the occupant is the normal posture, output a first higher pressure value higher than the first normal pressure value when the posture assumed by the occupant is the leaning-forward posture, and output a first lower pressure value lower than the first normal pressure value when the posture assumed by the occupant is the leaning-rearward posture, or a second pressure sensor configured to: output a second normal pressure value when the posture assumed by the occupant is the normal posture, output a second lower pressure value lower than the second normal pressure value when the posture assumed by the occupant is the leaning-forward posture, and output a second higher pressure value higher than the second normal pressure value when the posture assumed by the occupant is the leaning-rearward posture, and the controller may be configured to: determine, upon receipt of the first lower pressure value from the first pressure sensor, or upon receipt of the second higher pressure value from the second pressure sensor, that the posture of the occupant is the leaning-rearward posture.

The first command may be a command indicating that an operation to move the operable object on the screen in the upward direction has been performed, and the second command may be a command indicating that an operation to move the operable object on the screen in the downward direction has been performed.

The first command may be a command for causing the operable object on the screen to jump to a first height, and the second command may be a command for causing the operable object on the screen to jump to a second height higher than the first height.

The controller may be capable of determining, based on the information from the sensors, whether the posture of the occupant is a leaning-leftward posture in which the weight of the occupant is placed further leftward than the weight of the occupant in the normal posture, or a leaning-rightward posture in which the weight of the occupant is placed further rightward than the weight of the occupant in the normal posture, and configured to set a third command when it is determined that the posture is the leaning-leftward posture, and to set a fourth command when it is determined that the posture is the leaning-rightward posture.

The sensors may comprise: a third pressure sensor configured to: output a third normal pressure value when the posture assumed by the occupant is the normal posture, output a third higher pressure value higher than the third normal pressure value when the posture assumed by the occupant is the leaning-leftward posture, and output a third lower pressure value lower than the third normal pressure value when the posture assumed by the occupant is the leaning-rightward posture, or a fourth pressure sensor configured to: output a fourth normal pressure value when the posture assumed by the occupant is the normal posture, output a fourth lower pressure value lower than the fourth normal pressure value when the posture assumed by the occupant is the leaning-leftward posture, and output a fourth higher pressure value higher than the fourth normal pressure value when the posture assumed by the occupant is the leaning-rightward posture, and the controller may be configured to: determine, upon receipt of the third higher pressure value from the third pressure sensor, or upon receipt of the fourth lower pressure value from the fourth pressure sensor, that the posture of the occupant is the leaning-leftward posture.

The sensors may comprise: a third pressure sensor configured to: output a third normal pressure value when the posture assumed by the occupant is the normal posture, output a third higher pressure value higher than the third normal pressure value when the posture assumed by the occupant is the leaning-leftward posture, and output a third lower pressure value lower than the third normal pressure value when the posture assumed by the occupant is the leaning-rightward posture, or a fourth pressure sensor configured to: output a fourth normal pressure value when the posture assumed by the occupant is the normal posture, output a fourth lower pressure value lower than the fourth normal pressure value when the posture assumed by the occupant is the leaning-leftward posture, and output a fourth higher pressure value higher than the fourth normal pressure value when the posture assumed by the occupant is the leaning-rightward posture, and the controller may be configured to: determine, upon receipt of the third lower pressure value from the third pressure sensor, or upon receipt of the fourth higher pressure value from the fourth pressure sensor, that the posture of the occupant is the leaning-rightward posture.

The third command may be a command indicating that an operation to move the operable object on the screen toward the left has been performed, and the fourth command may be a command indicating that an operation to move the operable object on the screen toward the right has been performed.

BRIEF DESCRIPTION OF DRAWINGS

FIG. 6 is a table of criteria for determination of imitative or onomatopoeic words.

FIG. 7 is a table for determination of exercise levels.

DESCRIPTION OF EMBODIMENTS

Next, a first embodiment of a seat experience system will be described in detail with reference made to accompanying drawings where appropriate.

Figure 1:
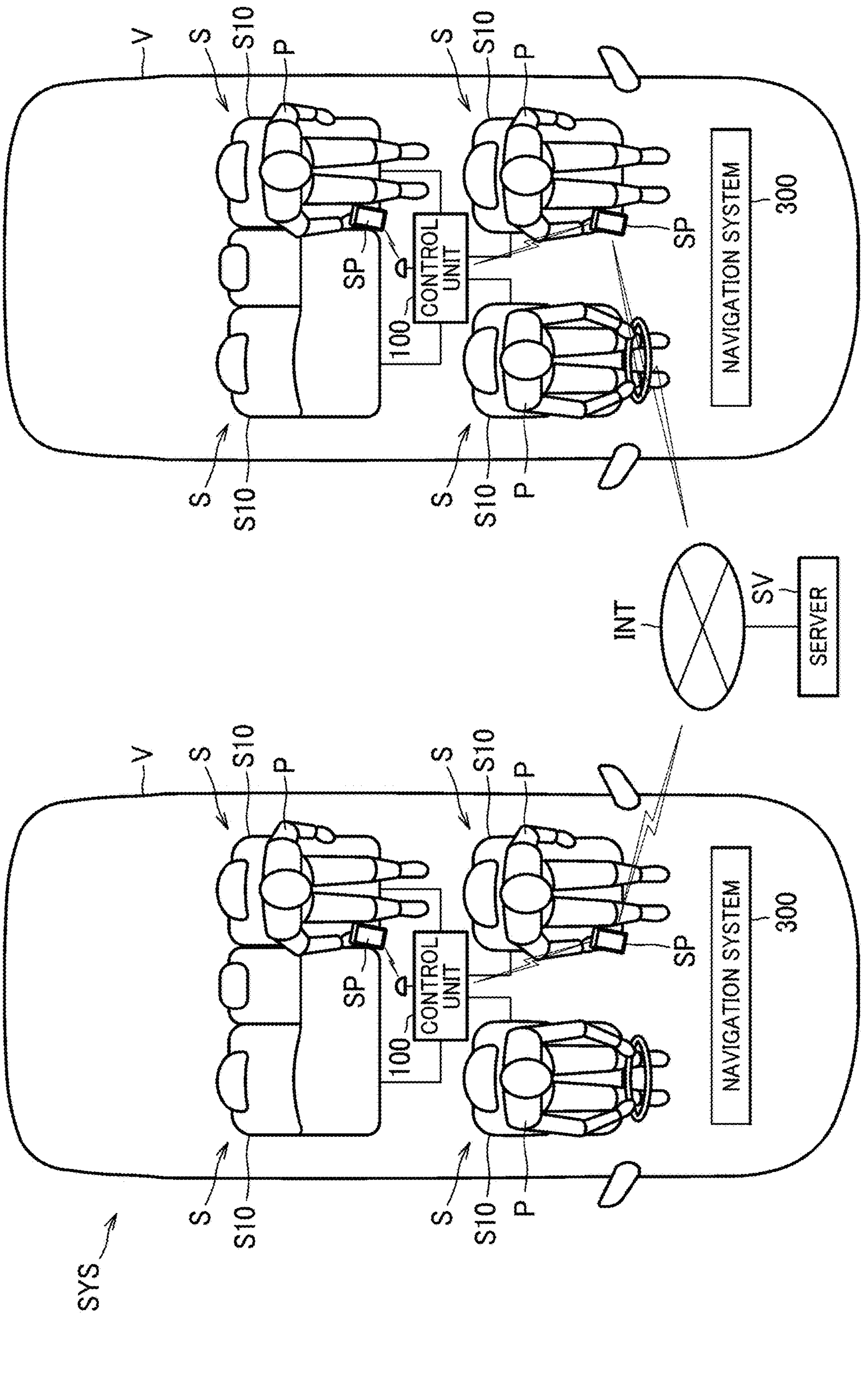
FIG. 1 is a diagram showing a general configuration of a seat experience system according to a first embodiment.

As shown in FIG. 1, the seat experience system SYS of the present embodiment provides an on-line game using seats S, smartphones SP as examples of seat experience devices, and a server SV. The seats S are configured, for example, as car seats installed in a car V. The seat experience system SYS comprises a control unit 100 as an example of a controller. The car V is provided, for example, with four seats S, i.e., two front seats and two rear seats. In the car V, the control unit 100 integrates information of the four seats, operates the four seats in conjunction with one another, and communicates with the smartphones SP. A navigation system 300 is also installed in the car V.

Each smartphone SP is used by an occupant P. The smartphones SP are portable terminals that communicate with the server SV via the Internet INT using the Internet Protocol. The smartphones SP are capable, depending on the location, of communicating with the server SV via a public wireless network using Wi-Fi (registered trademark). Each smartphone SP is capable of communicating with the navigation system 300 via near-field wireless communication, such as Bluetooth (registered trademark) or Wi-Fi (registered trademark), etc., and can acquire route information currently provided for navigation, location information of the car V, velocity information of the car V, etc., from the navigation system 300.

The seat experience system SYS of the present embodiment provides a 100-meter dash game on the smartphones SP, using seat bodies S10. This game allows a plurality of players to concurrently participate on-line in the 100-meter dash. The smartphones SP each include a display DSP (see FIG. 2); the control unit 100 outputs a signal that causes a character in the game shown on the display DSP to run in response to motions of right and left legs alternately moved up and down.

That is, the smartphones SP are configured to be capable of providing a game played by occupants P making motions on respective seat bodies S10, communicating with other smartphones SP (including smartphones SP in the same car and smartphones SP in another car) via the server, and concurrently executing the game on-line with the other smartphones SP.

Figure 2:
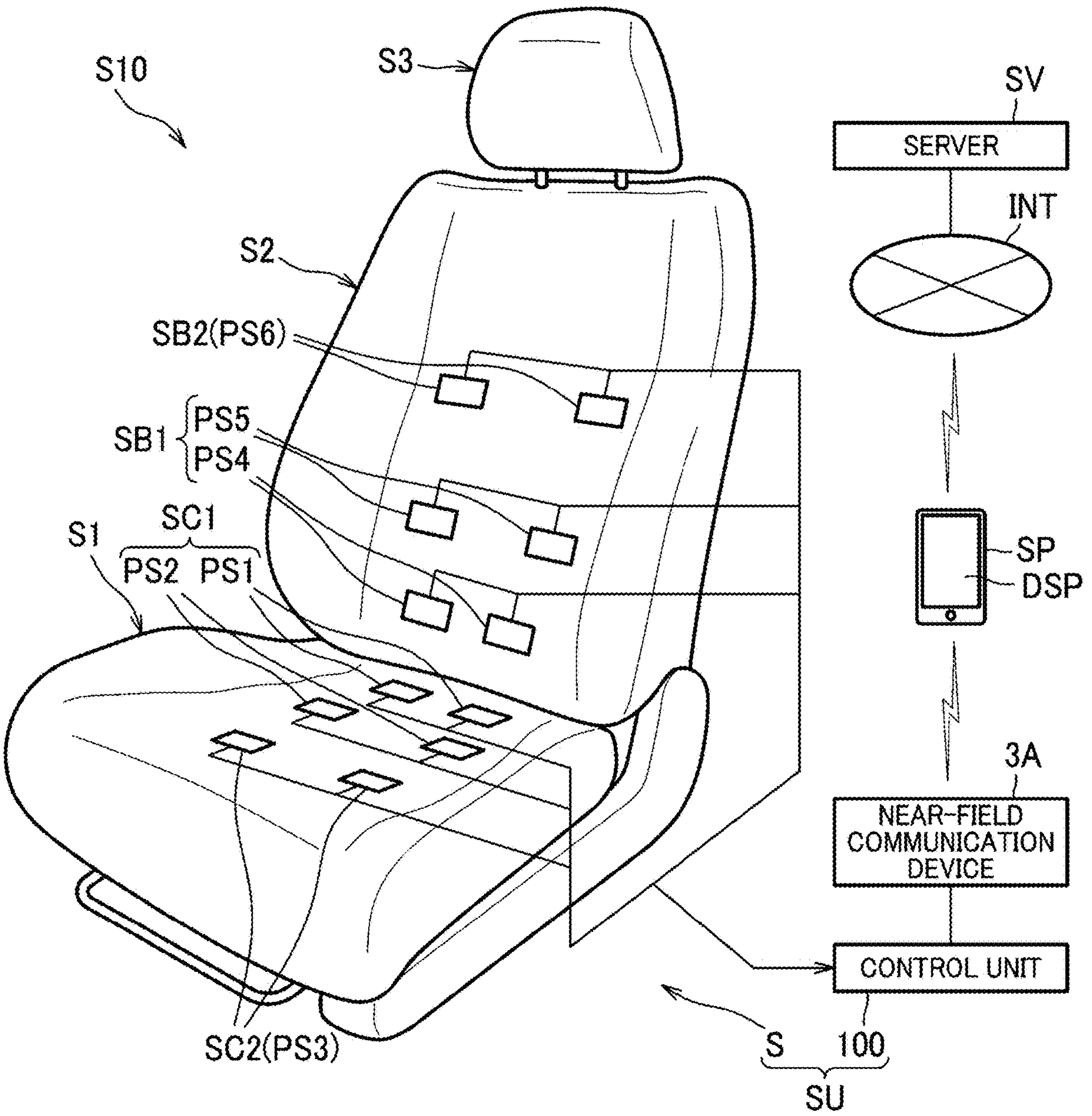
FIG. 2 is a diagram for explaining a configuration of each seat.

As shown in FIG. 2, the seat body S10 includes a seat cushion S1, a seat back S2, and a headrest S3. A plurality of pressure sensors PS1 to PS6 are provided under the outer coverings of the seat cushion S1 and the seat back S2. The pressure sensors PS1 to PS6 are sensors configured to acquire measurement values for detecting a motion of the occupant P seated on the seat body S10. The pressure sensors PS1 to PS6 are located so as to be capable of detecting a state of a seat surface that faces the occupant P seated on the seat body S10, and acquire values of pressure from the occupant P seated on the seat body S10. The control unit 100 is connected to the pressure sensors PS1 to PS6 and configured to be capable of acquiring the values of pressure from the pressure sensors PS1 to PS6. The smartphones SP are connected to the control unit 100 and configured to be operable based on the measurement values of the pressure sensors PS1 to PS6. The seat S constitutes a seat unit SU along with the control unit 100 (and a near-field communication device 3A described later).

The respective pressure sensors PS1 to PS6 are provided in pairs, each located left and right, symmetric with respect to a laterally central position of the seat S.

To be more specific, the pressure sensors PS1 to PS3 are provided at the seat cushion S1. The pressure sensors PS1 and the pressure sensors PS2 are provided in positions of the seat cushion S1 corresponding to the buttocks the occupant P. The pressure sensors PS1 and the pressure sensors PS2 constitute a first cushion sensor SC1 for measuring pressure from the buttocks of the occupant P. The pressure sensors PS2 are located a little forward of the pressure sensors PS1. The first cushion sensor SC1 may alternatively consist only of either pair of the pressure sensors PS1 or the pressure sensors PS2.

The pressure sensors PS3 are located under the thighs of the occupant P. The pressure sensors PS3 constitute a second cushion sensor SC2 for measuring values of pressure from the thighs of the occupant P. The pressure sensors PS3 are located forward and largely apart from the pressure sensors PS1 and the pressure sensors PS2.

The pressure sensors PS4 to PS6 are provided at the seat back S2. The pressure sensors PS4 are provided in positions corresponding to the back of the lumbar region of the occupant P. The pressure sensors PS5 are located a little above the pressure sensors PS4. The pressure sensors PS4 and the pressure sensors PS5 constitute a first back sensor SB1 for measuring pressure from the lumbar region of the occupant P. The first back sensor SB1 may alternatively consist only of either pair of the pressure sensors PS4 or the pressure sensors PS5.

The pressure sensors PS6 are located above and largely apart from the pressure sensors PS4 and the pressure sensors PS5. The pressure sensors PS6 are provided in positions corresponding to an upper portion of the back of the occupant P. The pressure sensors PS6 constitute a second back sensor SB2 for measuring values of pressure from the upper portion of the back of the occupant P.

In the following description, pressure values acquired from the pressure sensors PS1 to PS6 are indicated by P1 to P6, and the pressure values of right and left sensors are indicated with subscripts R and L, such as $\mathbf{P1}_R$, $\mathbf{P1}_L$. The pressure sensors PS1 to PS6 are each configured, for example, as an element whose electrical resistance varies with external pressure applied thereon, wherein the higher the pressure value, the higher (or the lower) the voltage of the detection signal becomes. Accordingly, in practical applications, the magnitudes of the pressure values are compared with reference made to the magnitudes of voltage values; however, for easy understanding, it is described in this specification as if determination is made based on the magnitudes of the pressure values.

Figure 3:
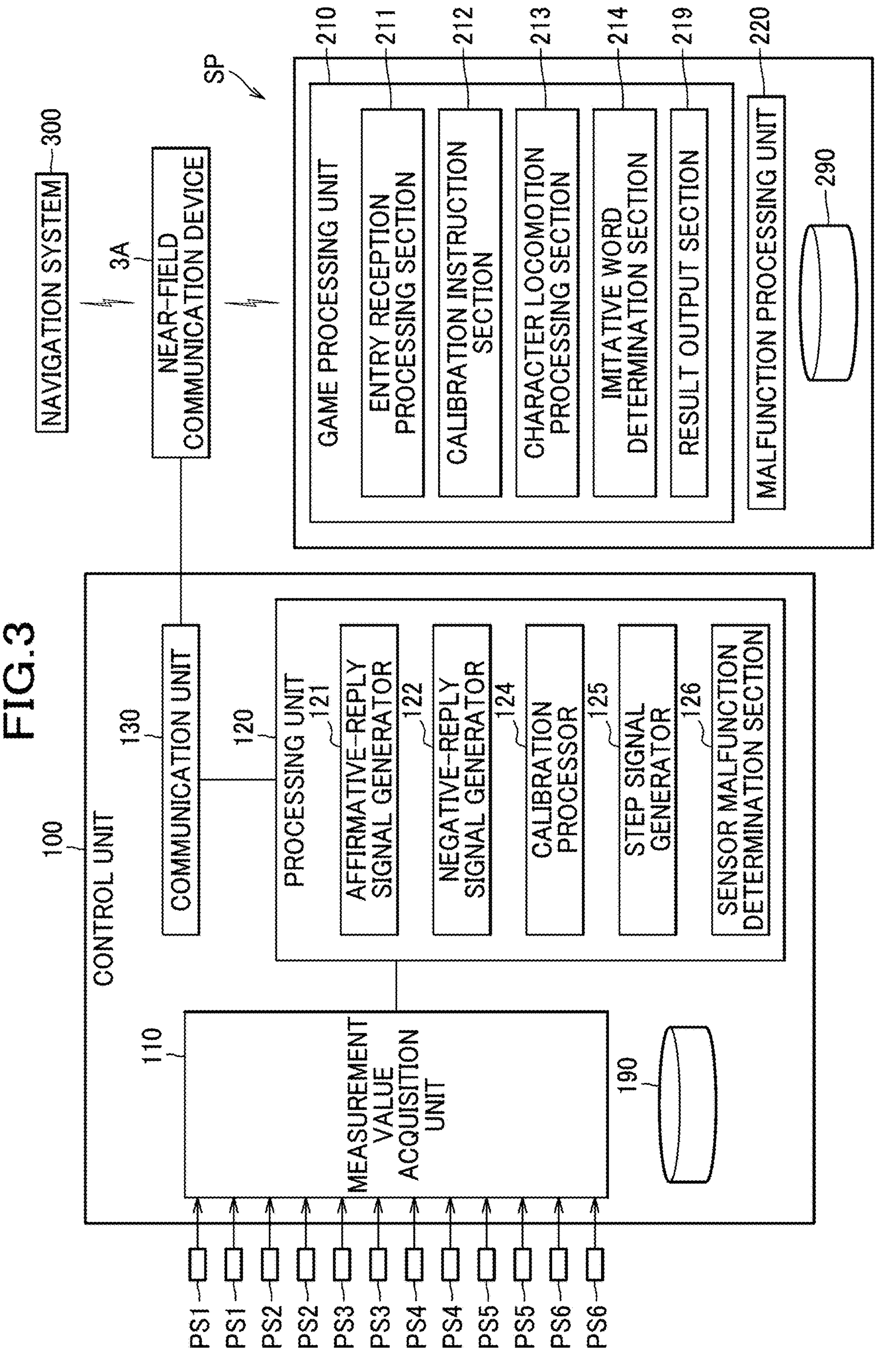
FIG. 3 is a block diagram for explaining the configurations of the seat and the system.

As shown in FIG. 3, the control unit 100 comprises a measurement value acquisition unit 110, a processing unit 120, a communication unit 130, and a storage unit 190. The smartphone SP comprises a game processing unit 210, a malfunction processing unit 220, and a storage unit 290. The control unit 100 and the smartphone SP each include a CPU, a ROM, a RAM, a rewritable nonvolatile memory, etc. (not shown); each functional unit is implemented through execution of pre-stored programs.

The control unit 100 is connected to a near-field communication device 3A which enables near-field wireless communication, such as Bluetooth (registered trademark), Wi-Fi (registered trademark), etc. The control unit 100 is capable of communicating with the smartphones SP using the communication unit 130 via the near-field communication device 3A, providing the smartphones SP with predetermined screens and/or sounds in conjunction with an application (app) installed in the smartphones SP, and acquiring data input at the smartphones SP.

The measurement value acquisition unit 110 has a function of acquiring measurement values of pressure per predetermined control cycle from the respective pressure sensors PS1 to PS6. The measurement value acquisition unit 110 supplies electricity to each pressure sensor PS1 to PS6 when it acquires a measurement value from each pressure sensor PS1 to PS6. The measurement values acquired by the measurement value acquisition unit 110 are stored in the storage unit 190 and used in the processing unit 120. The storage unit 190 is used to store data required for computation, processing, etc., on an as-appropriate basis.

The processing unit 120 communicates with the smartphones SP and executes a process of transmitting a signal for operating an app for the 100-meter dash game provided in the smartphones SP. The processing unit 120 comprises an affirmative-reply signal generator 121, a negative-reply signal generator 122, a calibration processor 124, a step signal generator 125, and a sensor malfunction determination section 126.

The processing unit 120 has a first operation mode in which a signal is outputted based on the measurement values of the pressure sensors PS1 to PS6, and a second operation mode in which no signal is outputted. The processing unit 120 may operate in the first operation mode only after providing via the smartphone SP a notification to prompt an occupant P to perform a motion. To be more specific, as will be described later, after receipt of a signal indicating reception of a variety of signals from the smartphone SP, the first operation mode is established to output a signal, while after receipt of a signal indicating the end of reception, the second operation mode is adopted to output no signal.

The affirmative-reply signal generator 121 and the negative-reply signal generator 122 respectively output an affirmative-reply signal and a negative-reply signal. The processing unit 120 causes the affirmative-reply signal generator 121 or the negative-reply signal generator 122 to output to the smartphone SP, according to the motion of the occupant P, an affirmative-reply signal or a negative-reply signal, after the processing unit 120 receives an entry reception signal from the smartphone SP.

To be more specific, the affirmative-reply signal generator 121 outputs an affirmative-reply signal on condition that the pressure value $P6_R$ acquired from the right pressure sensor PS6 exceeds a predetermined threshold value P6*th*. Similarly, the negative-reply signal generator 122 outputs a negative-reply signal on condition that the pressure value $P6_L$ acquired from the left pressure sensor PS6 exceeds a predetermined threshold value P6*th*.

In the game processing unit 210 of the smartphone SP, a first operation of starting a game for the smartphone SP is assigned to the affirmative-reply signal, and a second operation of selecting not to play the game is assigned to the negative-reply signal.

The calibration processor 124 acquires the pressure values $P3_R$, $P3_L$ from the right and left pressure sensors PS3, after the processing unit 120 receives a calibration start signal from the smartphone SP. Subsequently, the calibration processor 124 determines a normal pressure $P3_n$ that is an average pressure of an occupant P currently seated and a threshold value $P3_{th}$ for detection of peaks of pressure values, and computes and outputs to the smartphone SP a normal step cycle $TS_n$ that is an average time interval in which a sequence of motions of the legs of the occupant P is completed.

Figure 5:
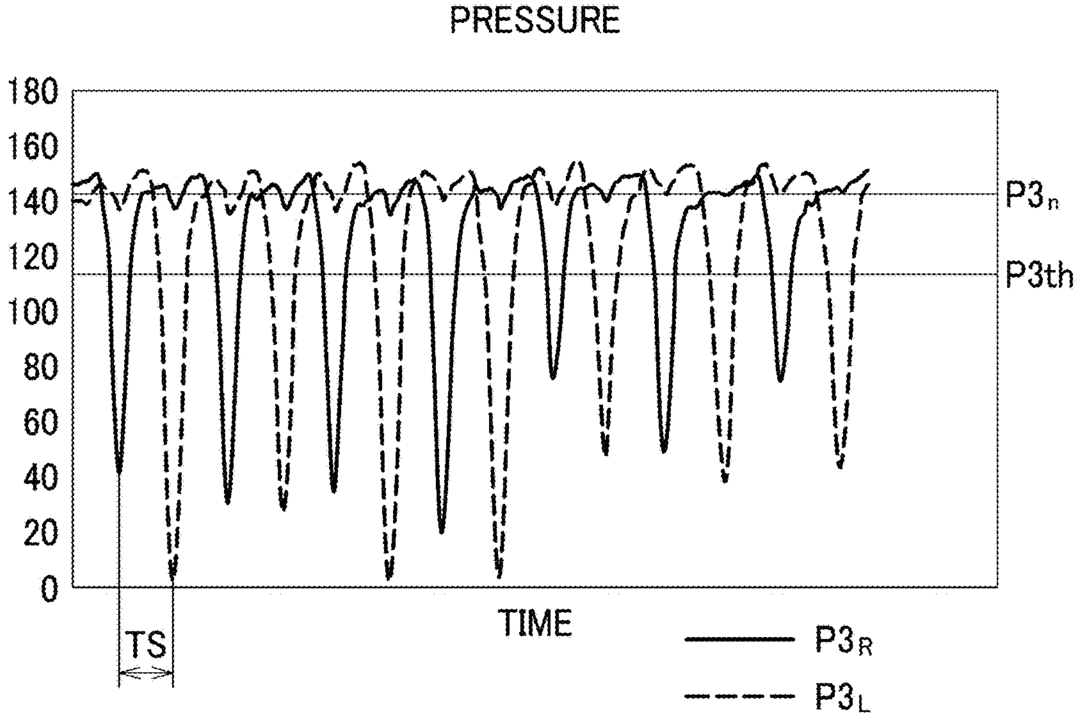
FIG. 5 is a graph showing fluctuations in pressure acquired during calibration.

To be more specific, when an occupant P lifts his/her legs alternately, the pressure values $P3_R$, $P3_L$ change, for example, as shown in FIG. 5. In FIG. 5, a term in which the pressure goes down sharply indicates that the occupant P has lifted his/her leg up and the pressure at an area detected by the pressure sensor PS3 has become small accordingly. In fact, the pressure values that have not gone down but kept at about 140 are deemed to be an average normal pressure $P3_n$ detected when the legs are not lifted up. To compute the normal pressure $P3_n$, for example, you may identify such absolute values at or below a predetermined value (i.e., the values of which variations are small) among the absolute values of the differences between the last value and the present value of the pressure values $P3_R$, $P3_L$ (remainders each determined by subtraction of the last value P3($n$−1) from the present value P3($n$)), and sum up and average the present values from which the identified absolute values are obtained.

The threshold value P3*th* is a threshold value for determining that the legs are currently being lifted up; for example, as in the case of FIG. 5, values ranging generally from 100 to 120 may be used. For this purpose, the threshold value P3*th* may be a value obtained by multiplying the normal pressure $P3_n$ by a predetermined value. For example, the value obtained by multiplying the normal pressure $P3_n$ by a predetermined value ranging generally from 0.6 to 0.9 may be used as the threshold value P3*th*.

The normal step cycle $TS_n$ is an average value of the step cycles TS that are time intervals between peaks of the pressure values $P3_R$, $P3_L$.

Peaks of the pressure values $P3_R$, $P3_L$ may be determined when the difference between the last value and the present value changes from the negative to the positive under the condition that each pressure value $P3_R$, $P3_L$ is lower than the threshold value P3*th* (i.e., the pressure values have crossed the threshold value from above to below), and the last value P3($n$−1) detected at this last time is assumed as a peak value Pm.

After the processing unit 120 receives a race start signal from the smartphone SP, the step signal generator 125 detects peaks of the pressure values $P3_R$, $P3_L$ varying according to the motions of the occupant P, and computes the peak value Pm. The detection of peaks and the computation of the peak value Pm may be executed in such a manner as executed by the calibration processor 124. The step signal generator 125 then computes a step intensity F ($F_R$, $F_L$) that is a leg-lift motion scale. The step intensity F may be indicated by the magnitude of the peak, i.e., a value obtained by subtraction of the peak value Pm from the normal pressure P3. In this embodiment, the obtained value is normalized by the normal pressure $P3_n$ so as to eliminate variations caused by the physique of an occupant P. For example, the step intensity F may be given as follows:

$$F=(P3_n-Pm)/P3_n$$

The step signal generator 125 proceeds, upon detection of a peak of the pressure values $P3_R$, $P3_L$, to output the peak value Pm and the step intensity F to the smartphone SP. In this way, the step signal generator 125 outputs a signal based on the change in the pressure values P3 acquired from the pressure sensors PS3.

The sensor malfunction determination section 126 determines, if pressure values, as signals received from the sensors PS1 to PS6, keep exhibiting values higher than a predetermined value Pmax for a predetermined time period, that a failure (malfunction) has occurred in the corresponding pressure sensor. This is because, in such case, the pressure sensors may be damaged by electrical shortings, etc. If the sensor malfunction determination section 126 determines that a failure has occurred in at least one of the pressure sensors PS1 to PS6, supply of electricity to the pressure sensor PS1 to PS6 in which the failure has occurred is stopped.

On the other hand, the game processing unit 210 of the smartphone SP executes, upon startup of the app, a game proceeding process. Further, the game processing unit 210 transmits, upon startup of the app, identification information of the smartphone SP to the server SV. The server SV registers the identification information of the app-launched smartphone SP. Upon exit of the app, the game processing unit 210 transmits an exit-app signal to the server SV together with the identification information of the smartphone SP. In response, the server SV deletes the identification information of the smartphone SP which sent the exit-app signal from a list of the registration information of app-launched smartphones SP.

The game processing unit 210 comprises an entry reception processing section 211, a calibration instruction section 212, a character locomotion processing section 213, an imitative word determination section 214, and a result output section 219. The game processing unit 210 stores signals received from the control unit 100 together with times of receipt in the storage unit 290. The storage unit 290 is used, where deemed appropriate, to store data required for computation, processing, etc. The storage unit 290 also stores a second count which will be described later. The game processing unit 210 is configured to transmit data such as traveled distances L as computed, results of exercises, etc. to the control unit 100, where appropriate, to share the data with smartphones SP associated with other seats S. The control unit 100 accumulates these data in the storage unit 190.

Figure 17:
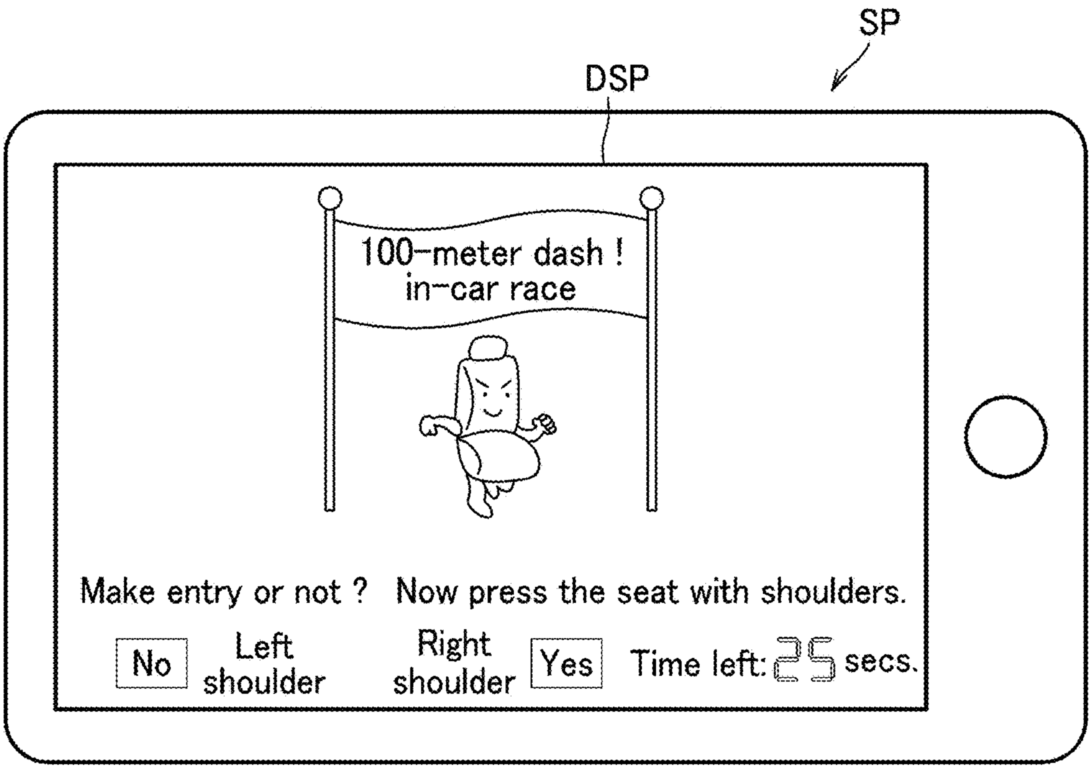
FIG. 17 is an example of a start screen.

The entry reception processing section 211 shows a start screen for reception of entry on the display DSP, transmits an entry reception signal to the control unit 100 and the server SV, and waits for an affirmative-reply signal or a negative-reply signal from the control unit 100 for a predetermined time period. The entry reception processing section 211 also transmits the entry reception signal to the control unit 100, when it receives an entry invitation signal from the server SV, and waits for an affirmative-reply signal or a negative-reply signal from the control unit 100 for a predetermined time period. The start screen shows a notification for prompting the occupant P to do a motion, for example, as shown in FIG. 17, which includes texts such as “Make entry or not? Now press the seat with shoulders.”, and representations of “No, left shoulder, right shoulder, Yes”. It is to be understood that the representations of Yes and No may each have a function as a button for providing the smartphone SP with the affirmative-reply signal or the negative-reply signal that can be generated by touching the display DSP. The entry reception processing section 211, upon receipt of the affirmative-reply signal, transmits an entry signal to the server SV and proceeds to execute a game proceeding process, and upon receipt of the negative-reply signal, proceeds to end the app without executing the game proceeding process. If the predetermined time period has elapsed without receiving the affirmative-reply signal or the negative-reply signal, the game processing unit 210 then transmits a reception close signal to the control unit 100, and ends the app.

The smartphone SP, when transmitting the entry reception signal or entry signal or the like to the server SV, transmits the identification information of the smartphone SP therewith.

The calibration instruction section 212, upon receipt of a game start signal from the server SV, shows a calibration screen, transmits a calibration start signal to the control unit 100, and waits for signals related to calibration from the control unit 100 for a predetermined time period. After lapse of the predetermined time period, the calibration instruction section 212 outputs a calibration end signal to the control unit 100. Further, the calibration instruction section 212 transmits the calibration end signal to the server SV.

The character locomotion processing section 213 operates during a 100-meter dash race, and causes upon receipt of a step intensity F, a character on the display DSP to move toward a finish line. The amount of locomotion is determined in accordance with the magnitude of the step intensity F. The character locomotion processing section 213 may, for example, cause the character to move a distance F [m] toward the finish line.

The imitative word determination section 214 operates during a 100-meter race, and determines, and outputs on the display DSP, an imitative word that expresses a way an occupant P is running (onomatopoeia or mimetic representation such as “Yochi-yochi (looks as if toddling)”). Determination of the imitative word may be made, for example, based on the step cycle TS that is a time interval at which the occupant P is moving his/her legs by comparison with the determination conditions shown in FIG. 6. The step cycle TS is the time interval of the step intensity F received from the control unit 100; however, as the time interval at which the step intensity F is received is not regular, an average time interval for the past 20 m can be adopted for computation.

In the present embodiment, for the purpose of reducing the effect of variations among individual occupants P, the determination of the imitative word expression is made by comparing a value given by division of the step cycle TS by the normal step cycle $TS_n$ with a threshold value. For example, $TS/TS_n$ 1.5 or greater, which means that the cycle is long, is assigned to “fura-fura (tottering)”; $TS/TS_n$ 1.2 or greater and smaller than 1.5 to “nosshi-nosshi (lumping along)”; $TS/TS_n$ 0.7 or greater and smaller than 1.2 to “suta-suta (walking at a brisk pace)”; $TS/TS_n$ smaller than 0.7 to “dota-dota (walking with heavy steps noisily)”, etc.

The result output section 219 determines and outputs on the display DSP, after an occupant P finishes in a 100-meter dash game, the result of exercise and recommendation. In addition, the result of exercise is transmitted to the control unit 100.

To be more specific, the result output section 219 determines, as the result of exercise, an exercise level, a quantity of exercise, an exercise intensity, and a recommendation.

The exercise level is determined by looking up the exercise level determination table of FIG. 7 based on the number of steps taken during a 100-meter race. For example, the exercise level determination table lists pre-defined items such as “slow rambling” assigned to the number of steps 60 or smaller, “usual daily-life walking” to the number of steps ranging from 61 to 110, “exercise walking” to the number of steps ranging from 111 to 140, “jogging” to the number of steps ranging from 141 to 240, and “dashing” to the number of steps 240 or larger, etc.

The quantity of exercise may be computed for example as a cumulative value of step intensities F measured during a 100-meter race.

The exercise intensity is represented by METs (metabolic equivalents). The value of the exercise intensity may be determined for example by multiplying the number of steps taken during a 100-meter race by a predetermined coefficient.

The recommendation may be determined by looking up a recommendation table stored beforehand in the storage unit 290. The recommendation table may be formulated for example with predetermined recommendations associated with parameters such as the numbers of steps, record times for a 100-meter race, average step cycles, etc. The recommendation can be determined by looking up the recommendation with these parameters after finishing in the 100-meter race.

After determining the exercise level, the quantity of exercise, the exercise intensity and the recommendation, the result output section 219 outputs these results on the display DSP.

The malfunction processing unit 220 executes repeatedly or at appropriate times, an error check process that checks whether or not a malfunction has occurred in the seat experience system SYS, and executes, if a malfunction is detected, processes according to the type of malfunction.

If a malfunction of the seat experience system SYS is detected, the malfunction processing unit 220 notifies the occupant P of the malfunction and limits at least a subset of functions of the seat experience system SYS.

For example, if it is detected that a malfunction has occurred in at least one of the pressure sensors PS1 to PS6, the malfunction processing unit 220 shows a text message indicating a pressure sensor error on the display DSP to notify the occupant P of the malfunction, and also sends a malfunction notification mail to the mail address of the administrator of the seat experience system SYS. When the terminal of the administrator receives the malfunction notification mail, the notification of the malfunction is displayed on the terminal. The administrator includes a person who provides service to a user such as the occupant, or a person who has developed the seat S. The malfunction processing unit 220 also provides notification of the malfunction to the server SV.

Notification of the malfunction is made with indication of a pressure sensor identified as that in which the malfunction has occurred, among the plurality of pressure sensors PS1 to PS6. Whether a malfunction has occurred or not is recorded in the storage unit 290 of the smartphone SP and/or the storage unit 390 of the server SV. The app using the seat S is preferably configured unable to run when a malfunction is recorded for a sensor necessary for the app. The app may either be configured unable to run when a malfunction has occurred in all sensors necessary for the app, or unable to run when a malfunction has occurred in a subset of the sensors necessary for the app.

In the event that a malfunction is detected in at least one of pressure sensors PS1 to PS6, the malfunction processing unit 220 prohibits the game processing unit 210 from processing the game. The game processing unit 210 prohibits the execution of the 100-meter dash game, but continues to permit access to past game records.

The smartphone SP detects the malfunctions of the pressure sensors PS1 to PS6 in response to receipt of a notification of the malfunction from the control unit 100.

When an error occurs in communication with the server SV, for example, when communication with the server SV is not possible, the malfunction processing unit 220 allows the game to be executed off-line only without communicating with other smartphones SP (this is called an "off-line" mode).

The malfunction processing unit 220 acquires route information currently provided for navigation, location information of the car V, and velocity information of the car V, etc. from the navigation system 300, and determines, based on the route information, the location information, and the velocity information, whether or not the car V is going to enter an area susceptible to communication failure within a predetermined time period. The area susceptible to communication failure includes: for example, an underground area such as a tunnel, an area in the mountains at or above a predetermined altitude, and the like. Since the route the car V will travel for the predetermined time period from the present time can be determined from the route information, the present location and the velocity information, it can be determined whether or not the car V is going to enter an area susceptible to communication failure within the predetermined time period by determining whether or not such areas are included in the route to be traveled during the predetermined time period. In this embodiment, one example of the area susceptible to communication failure is a tunnel. If it is determined that the car V is going to enter a tunnel within the predetermined time period, the malfunction processing unit 220 indicates on the display DSP and notifies the occupant P that there is a possibility of communication failure with the server SV.

Figure 4:
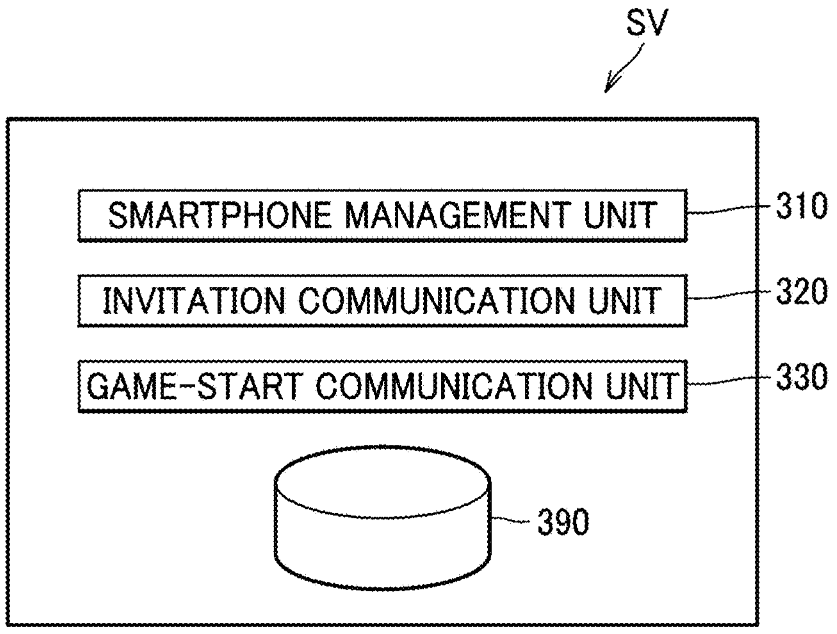
FIG. 4 is a block diagram for explaining a configuration of a server.

As shown in FIG. 4, the server SV comprises a smartphone management unit 310, an invitation communication unit 320, a game-start communication unit 330, and a storage unit 390.

The server SV stores, in the storage unit 390, identification information transmitted from the smartphones SP upon startup of the apps, and thereby manages the smartphones SP with the apps launched. The identification information includes the address of the smartphone SP. Upon receipt of exit-app signals from the smart phones SP, the identification information of the corresponding smartphones SP is deleted from the storage unit 390.

The invitation communication unit 320 transmits, if an entry reception signal is received from one smartphone SP, entry invitation signals to the other app-launched smartphones SP, based on the identification information stored in the storage unit 390. If an entry signal is received from any of the smartphones SP within a predetermined time period, the invitation communication unit 320 stores the identification information of the participating smartphones SP in the storage unit 390.

The game-start communication unit 330 transmits, after the predetermined time period of entry invitation has lapsed, game-start signals to the participating smartphones SP, based on the identification information of participating smartphones SP stored in the storage unit 390.

The storage unit 390 stores, as appropriate, the identification information of the smartphones SP with the apps launched, identification information of smartphones SP participating in the race as well as data necessary for processes of the server SV.

Next, a description will be given of an example of processes of the control unit 100, the smartphone SP app, and the server SV, as well as other processes of the game processing unit 210, with reference to the flowcharts.

To begin with, the processes of the control unit 100 will be described below.

Processes of FIG. 8 to FIG. 10 and FIG. 15 are executed repeatedly.

Figure 8:
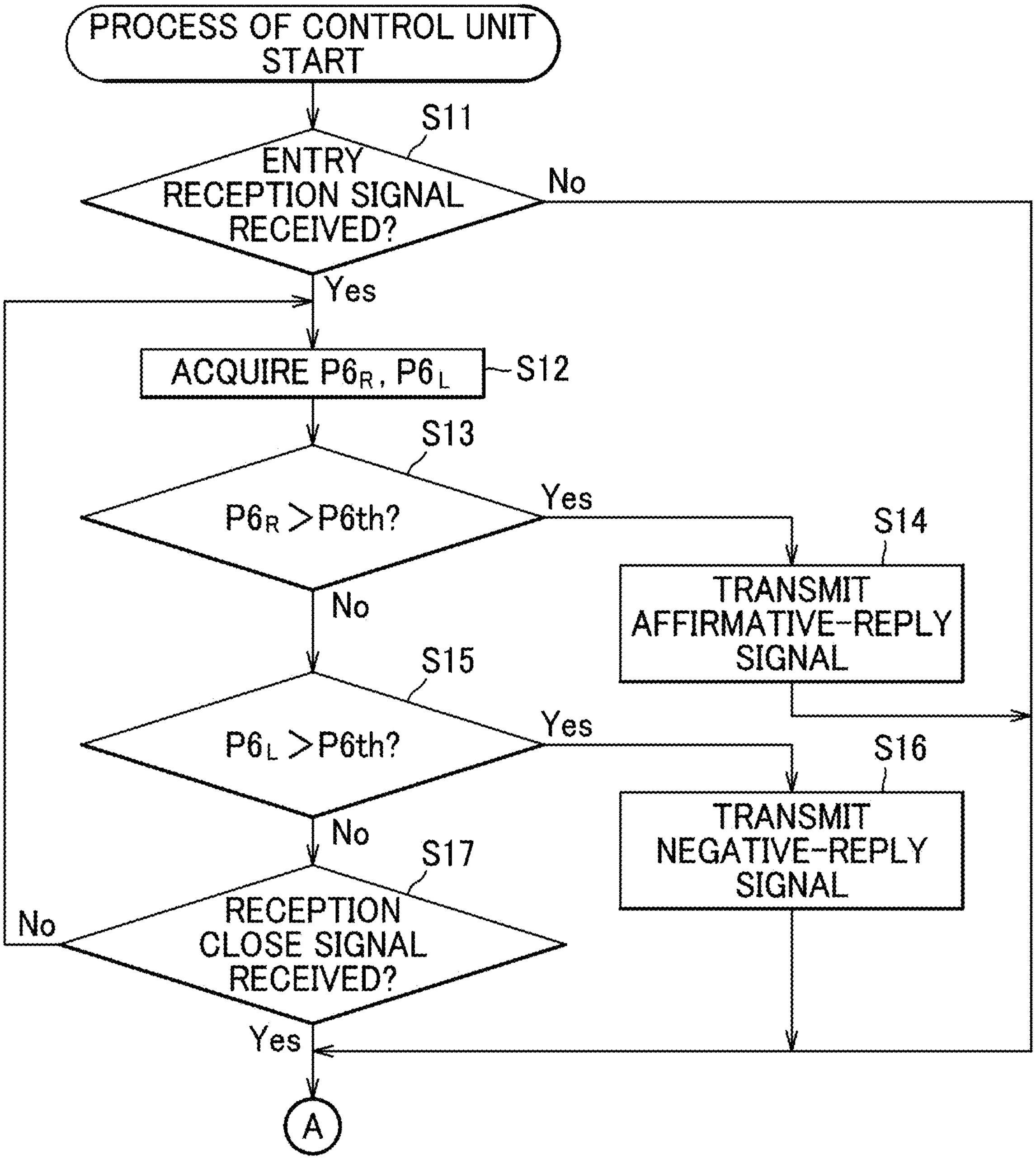
FIG. 8 is a flowchart of an example of the process of the control unit, showing a subset of steps for entry of a game.

As shown in FIG. 8, in the first place, the processing unit 120 executes steps S11 to S17 related to the entry of the game. To be more specific, first, it is determined whether or not an entry reception signal has been received (S11).

If it is determined that an entry reception signal has been received (Yes, S11), the processing unit 120 then acquires pressure values $P6_R$, $P6_L$ (S12), and determines whether or not the right pressure value $P6_R$ is higher than the threshold value $P6th$ (S13). If $P6_R$ is higher than $P6th$ (Yes, S13), then an affirmative-reply signal is transmitted (S14), and the process related to the entry of the game is ended.

If $P6_R$ is not higher than $P6th$ (No, S13), the processing unit 120 then determines whether or not the left pressure value $P6_L$ is higher than $P6th$ (S15). If $P6_L$ is higher than $P6th$ (Yes, S15), then a negative-reply signal is transmitted (S16), and the process related to the entry of the game is ended.

If $P6_L$ is not higher than $P6th$ (No, S15), the processing unit 120 then determines whether or not a reception close signal has been received (S17), and if not received (No, S17), then the process starting from step S12 is repeated, while if received (Yes, S17), then the process related to the entry of the game is ended.

Figure 9:
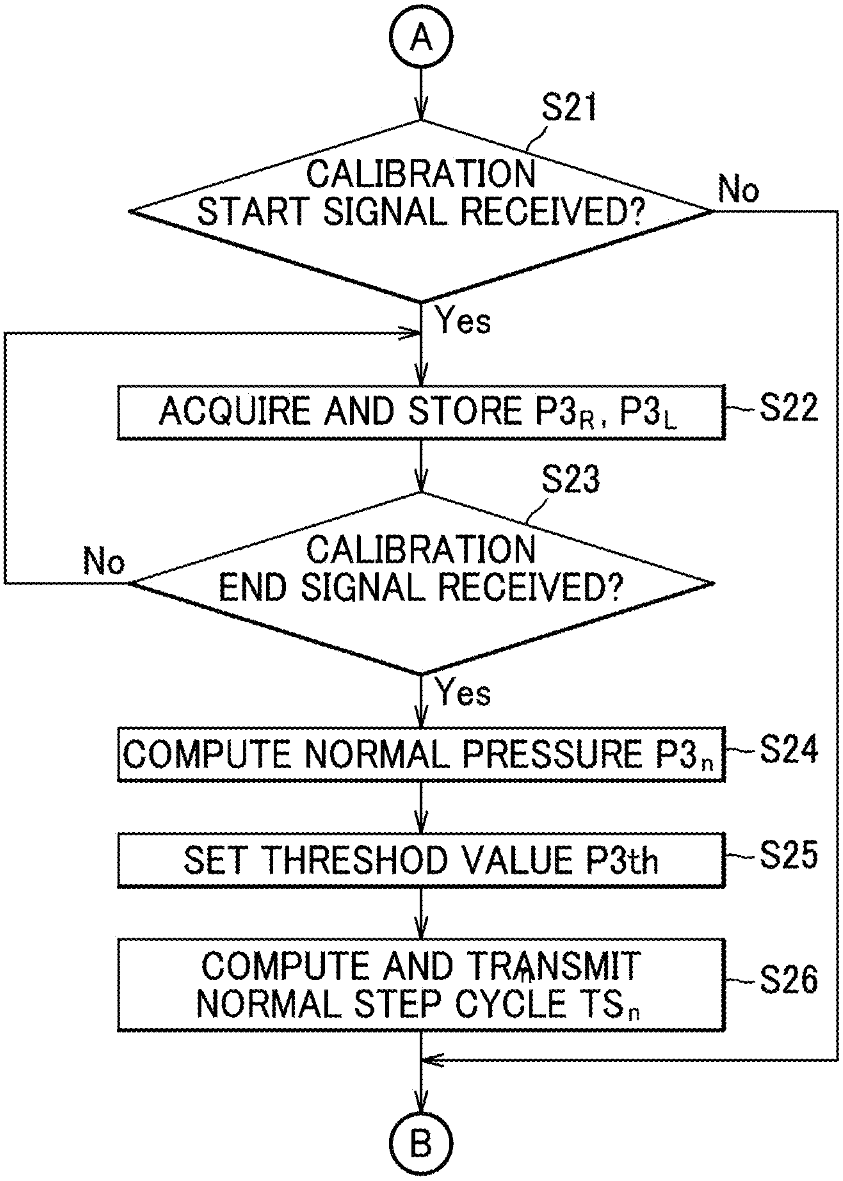
FIG. 9 is a flowchart of an example of the process of the control unit, showing a subset of steps for calibration.

After the process related to the entry of the game is ended, the calibration processor 124 of the processing unit 120 executes steps S21 to S26 related to the calibration process, as shown in FIG. 9.

The processing unit 120 determines whether or not a calibration start signal has been received (S21), and if received (Yes, S21), then acquires and stores pressure values $P3_R$, $P3_L$ (S22). Subsequently, it is determined whether or not a calibration end signal has been received, and steps S22 to S23 are repeated until receipt of that signal, i.e., as long as no such signal is received (No, S23), while once the signal is received (Yes, S23), then the process proceeds to step S24.

In step S24, the calibration processor 124 computes a normal pressure $P3_n$ based on the pressure values $P3_R$, $P3_L$ acquired during a predetermined time period and stored (S24). Then, a threshold value $P3th$ is set based on the normal pressure $P3_n$ (S25). In addition, a normal step cycle $TS_n$ is computed, and transmitted to the smartphone SP (S26).

In step S21, if the calibration start signal has not been received (No), then the calibration processor 124 proceeds to step S30 (see FIG. 10) without executing the calibration process.

Next, the processing unit 120 executes a process of steps S30 to S40 related to a race.

Figure 10:
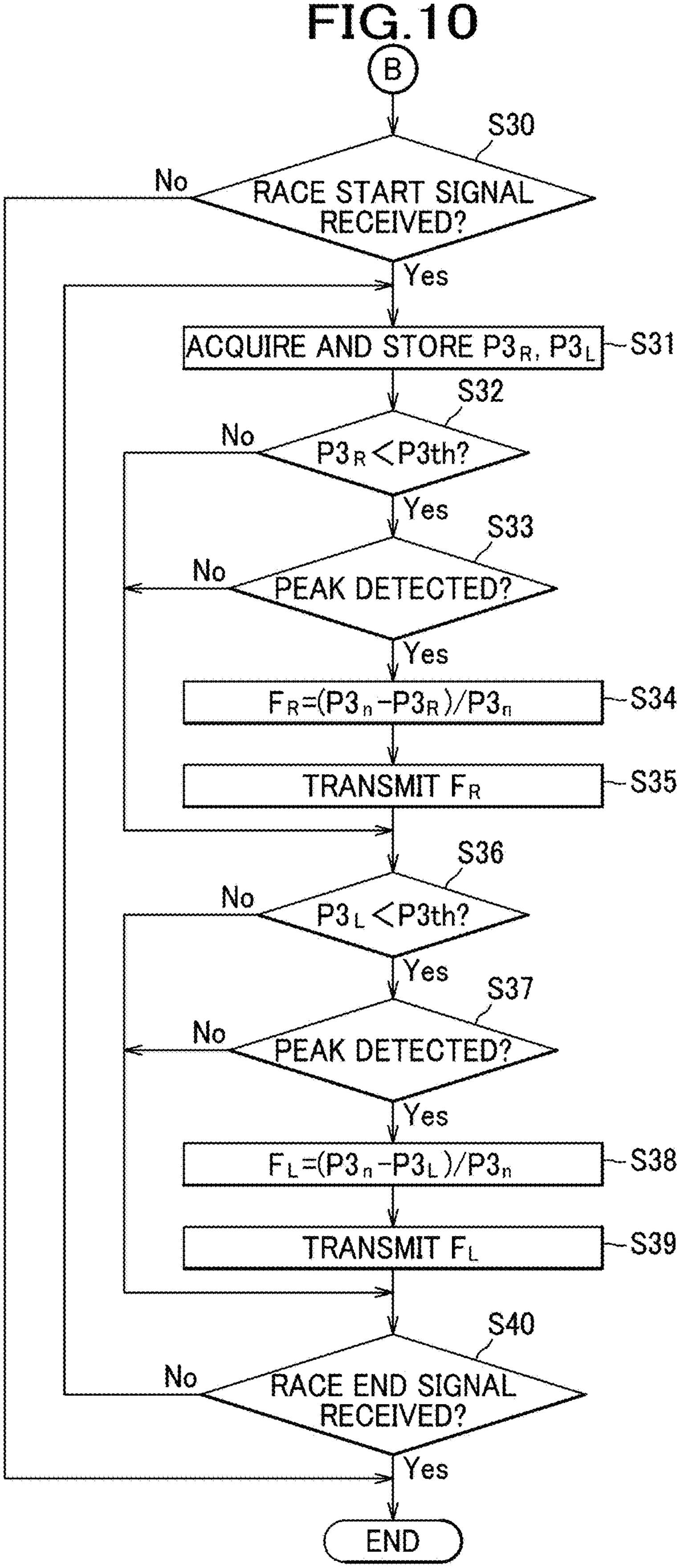
FIG. 10 is a flowchart of an example of the process of the control unit, showing a subset of steps for a race.

As shown in FIG. 10, first, the processing unit 120 determines whether or not a race start signal has been received from the smartphone SP (S30). If the race start signal has not been received (No, S30), then the processing unit 120 ends the present process. If the race start signal has been received (Yes, S30), then the step signal generator 125 acquires and stores the pressure values $P3_R$, $P3_L$ (S31).

Subsequently, it is determined whether or not the right pressure value $P3_R$ is lower than the threshold value $P3th$ (S32), and if lower (Yes, S32), then it is determined whether or not a peak has been detected from the last value and the present value of the pressure values $P3_R$ (S33).

If a peak has been detected (Yes, S33), then the step signal generator 125 computes a step intensity $F_R$ from the normal pressure $P3_n$ and the pressure value $P3_R$ (S34). The step intensity $F_R$ thus computed is transmitted to the smartphone SP (S35).

On the other hand, if the right pressure value $P3_R$ is not lower than the threshold value $P3th$ (No, S32), or no peak has been detected (No, S33), then the step signal generator 125 proceeds to step S36 without computing and transmitting the step intensity $F_R$.

In steps S36 to S39, the step signal generator 125 executes the processes of detecting a peak, and computing and transmitting a step intensity $F_L$ for the left pressure values $P3_L$. As these processes are similar to those of steps S31 to S35, a description thereof will be omitted.

In step S40, the processing unit 120 determines whether or not a race end signal has been received, and if not received (No, S40), then the process starting from step S31 is repeated, while if received (Yes, S40), then the process is ended.

Figure 11:
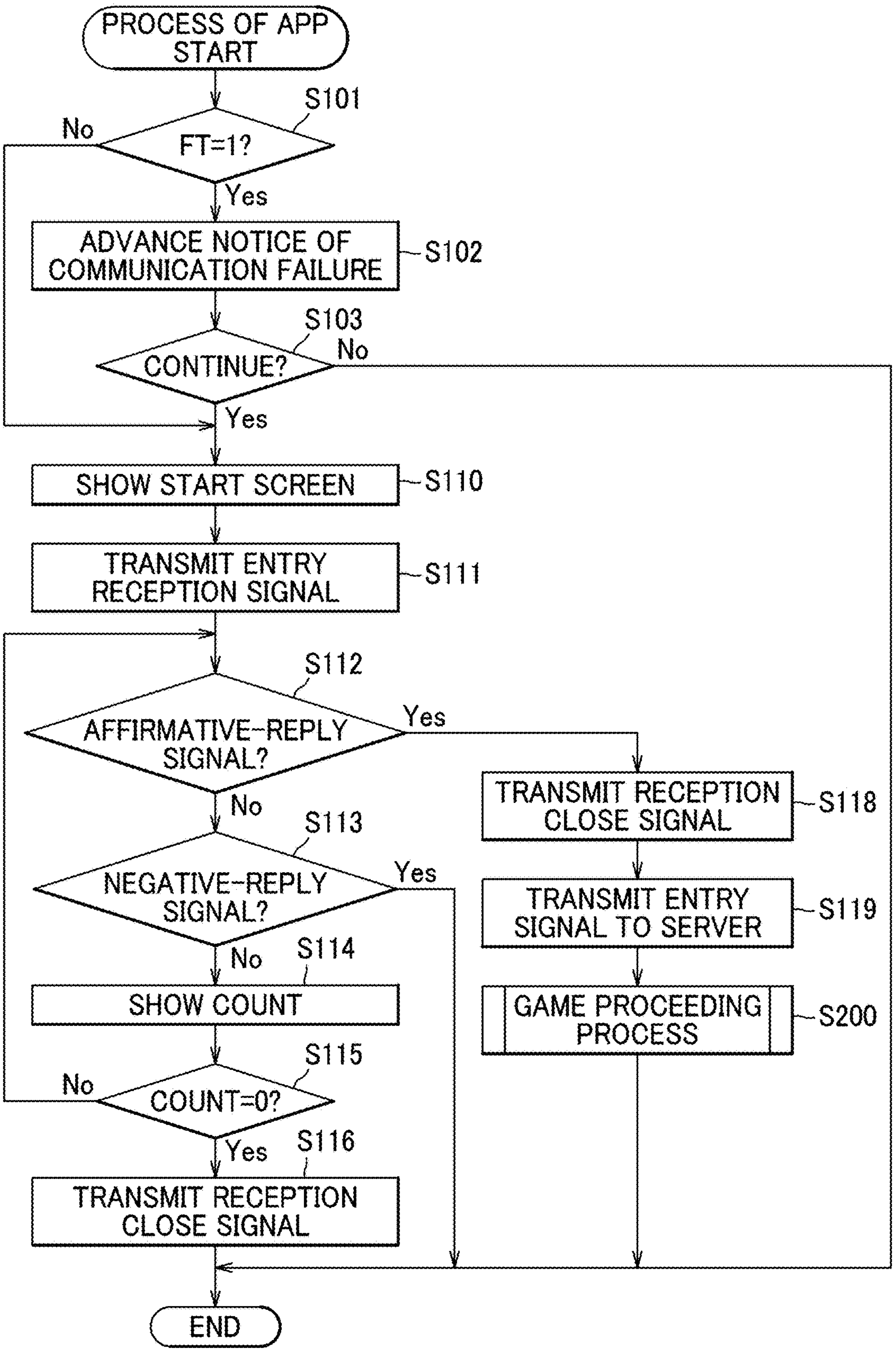
FIG. 11 is a flowchart of an example of the process of an app.
Figure 12:
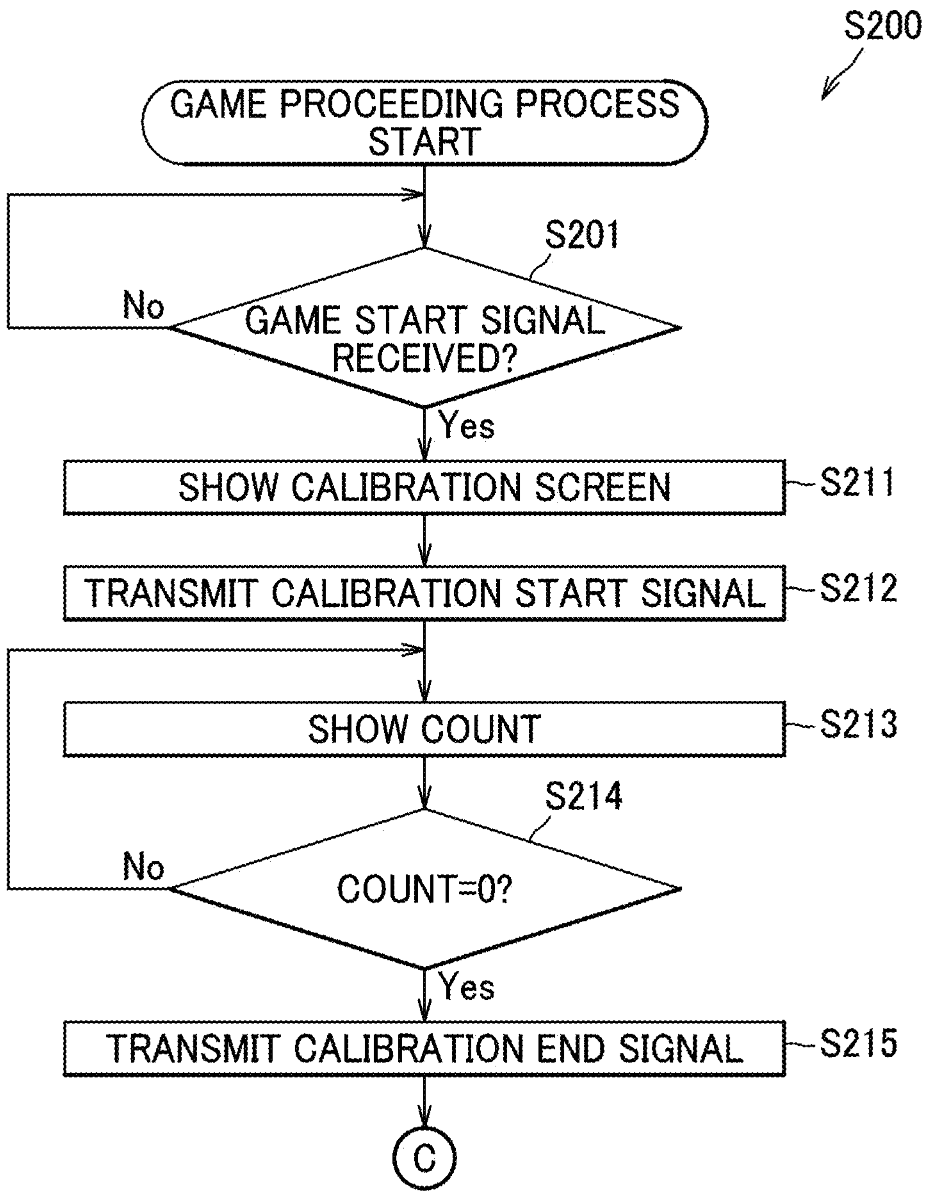
FIG. 12 shows a subset of steps for calibration in a game proceeding process.
Figure 13:
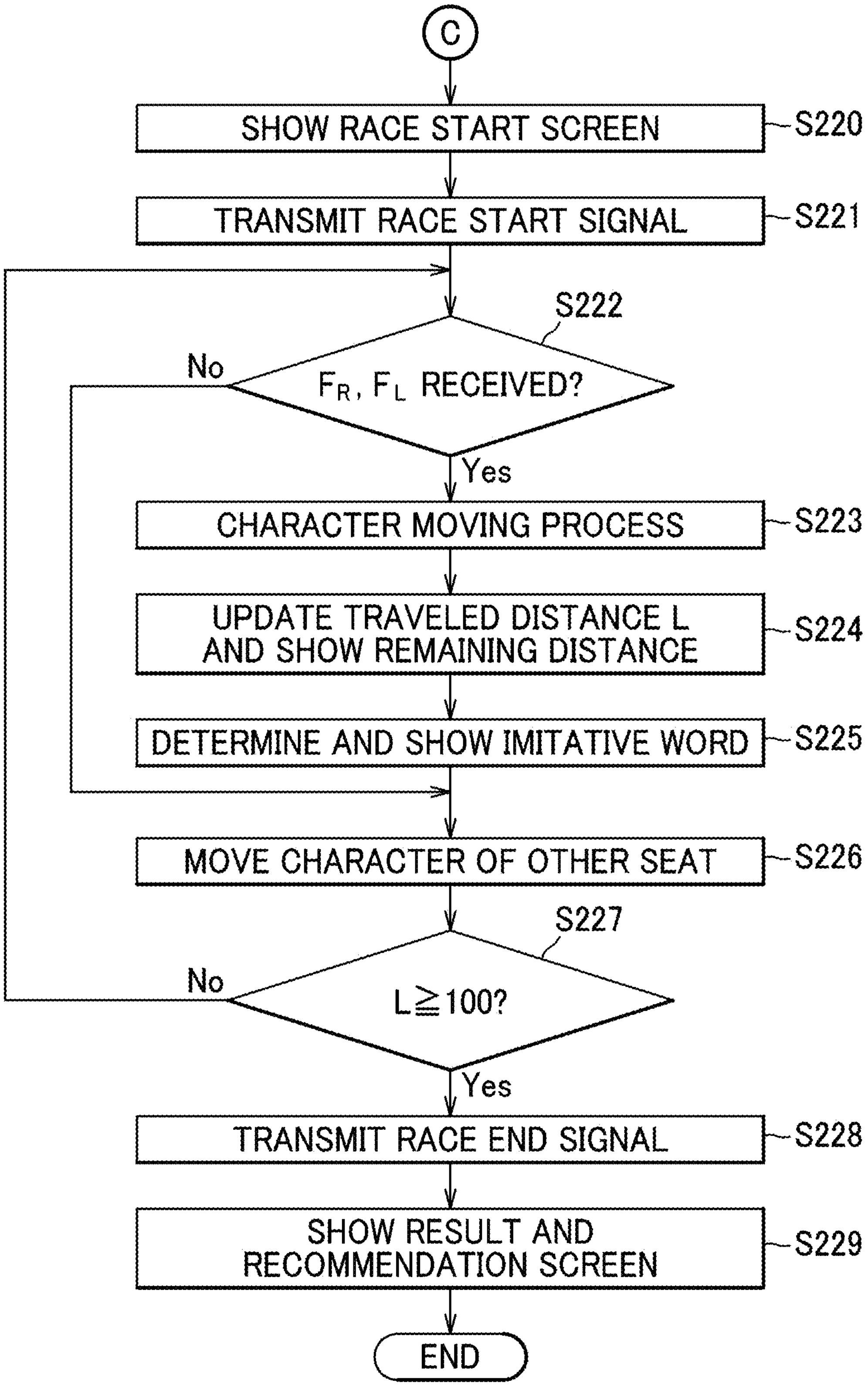
FIG. 13 shows a subset of steps for a race in the game proceeding process.

Next, a description of a process of the app (game processing unit 210) of the smartphone SP will be given. The processes of FIG. 11 to FIG. 13 are executed repeatedly.

When an app is activated, the smartphone SP starts the process of the app.

First of all, the malfunction processing unit 220 determines whether or not a flag FT is 1, which flag FT indicates that a communication failure (a condition of degradation of communication quality or communication interruption caused by weak radio waves, which is a type of communication error) with the server SV is predicted to occur before long (S101). If the flag FT is 0, a communication failure is not predicted, while if the flag FT is 1, a communication failure is predicted. The malfunction processing unit 220 provides, if the flag FT is 1 (Yes, S101), an advance notice of communication failure (S102). The advance notice of communication failure, for example, shows on the display DSP a message such as "Communication interruption may occur. Will you start a game?" as well as buttons for Yes and No. If Yes is selected (Yes, S103), the process of step S110 and the following steps is continued; if No is selected (No, S103), the process is ended. The malfunction processing unit 220 also proceeds to the process of step S110 and the following steps if the flag FT is not 1 in step 101.

The game processing unit 210 shows the start screen on the display DSP (S110). The start screen is, for example, a screen such as shown in FIG. 17. In the start screen, the text "Make entry or not? Now press the seat with shoulders." and an instruction showing that the left shoulder action signals for negative reply (equivalent to saying 'No') and the right shoulder action signals for affirmative reply (equivalent to saying 'Yes') are displayed. In addition, the remaining time to make a reply for participation is shown.

The entry reception processing section 211 transmits an entry reception signal to the control unit 100 (S111). At this time, the entry reception processing section 211 also transmits the entry reception signal to the server SV to create an opportunity to invite other smartphones SP to enter. The entry reception processing section 211 determines whether or not an affirmative-reply signal has been received (S112), and if received, (Yes, S112), then transmits a reception close signal to the control unit 100 (S118). Subsequently, the entry reception processing section 211 transmits an entry signal to the server SV (S119), and, after executing a game proceeding process (S200), ends the process. The game proceeding process will be described later.

If the affirmative-reply signal has not been received (No, S112), then the entry reception processing section 211 determines whether or not a negative-reply signal has been received (S113), and if received (Yes, S113), then ends the process.

On the other hand, if the negative-reply signal has not been received (No, S113), then the entry reception processing section 211 shows a count indicating the remaining time (S114) and determines whether or not the count has reached zero (S115). If the count has not reached zero (No, S115), then the process of entry reception from step S112 is continued, while if the count has reached zero (Yes, S115), then a reception close signal is transmitted to the control unit 100 (S116), and the process is ended.

Figure 18:
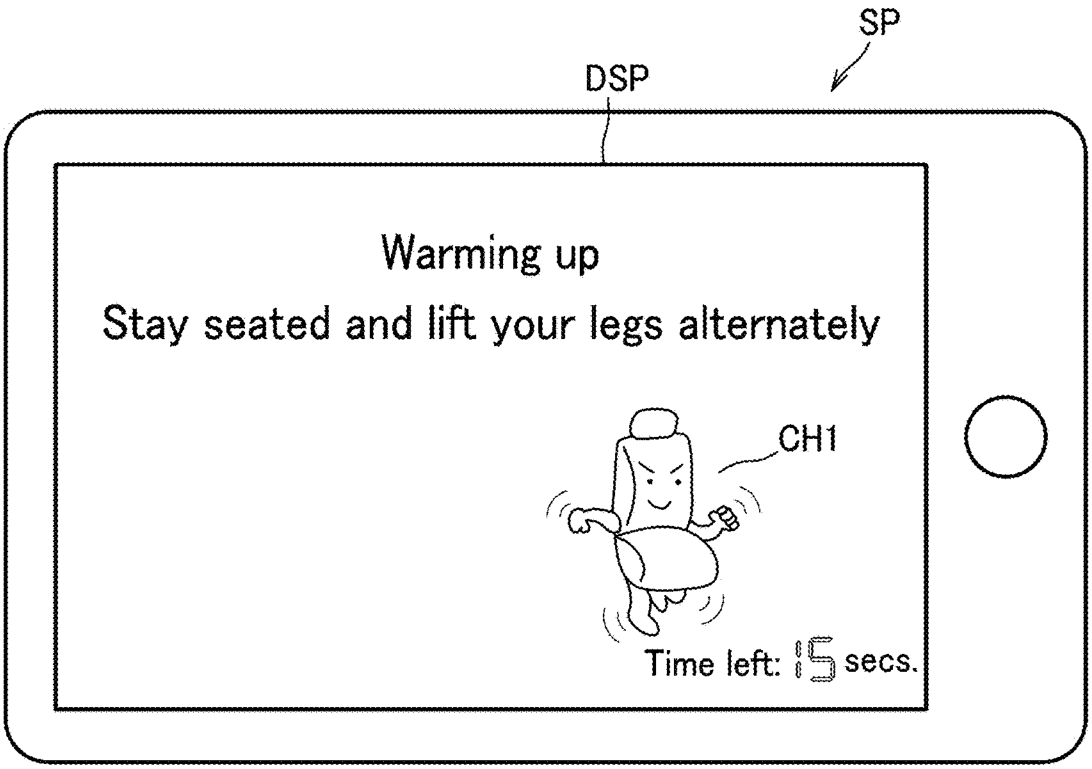
FIG. 18 is an example of a warm-up screen.

As shown in FIG. 12, in the game proceeding process (S200), if the smartphone SP receives a game start signal from the server SV (Yes, S201), first, the calibration instruction section 212 shows a calibration screen on the display DSP (S211). The calibration screen shows, for example, as shown in FIG. 18, an instruction in text "Warming up, stay seated and lift your legs alternately." and the remaining time for calibration. An animated cartoon of a running character CH1, such as a personified seat may be shown on the display DSP to help an occupant P understand what to do.

Subsequently, the calibration instruction section 212 transmits a calibration start signal to the control unit 100 (S212). Then, the updated count of the remaining time is shown on the display DSP (S213), and it is determined whether the count has reached zero (S214). If the count has not reached zero (No, S214), then the countdown in step S213 continues to be displayed; if the count has reached zero (Yes, S214), then the calibration end signal is transmitted to the control unit 100 (S215). The calibration instruction section 212 also transmits the calibration end signal to the server SV.

Figure 19:
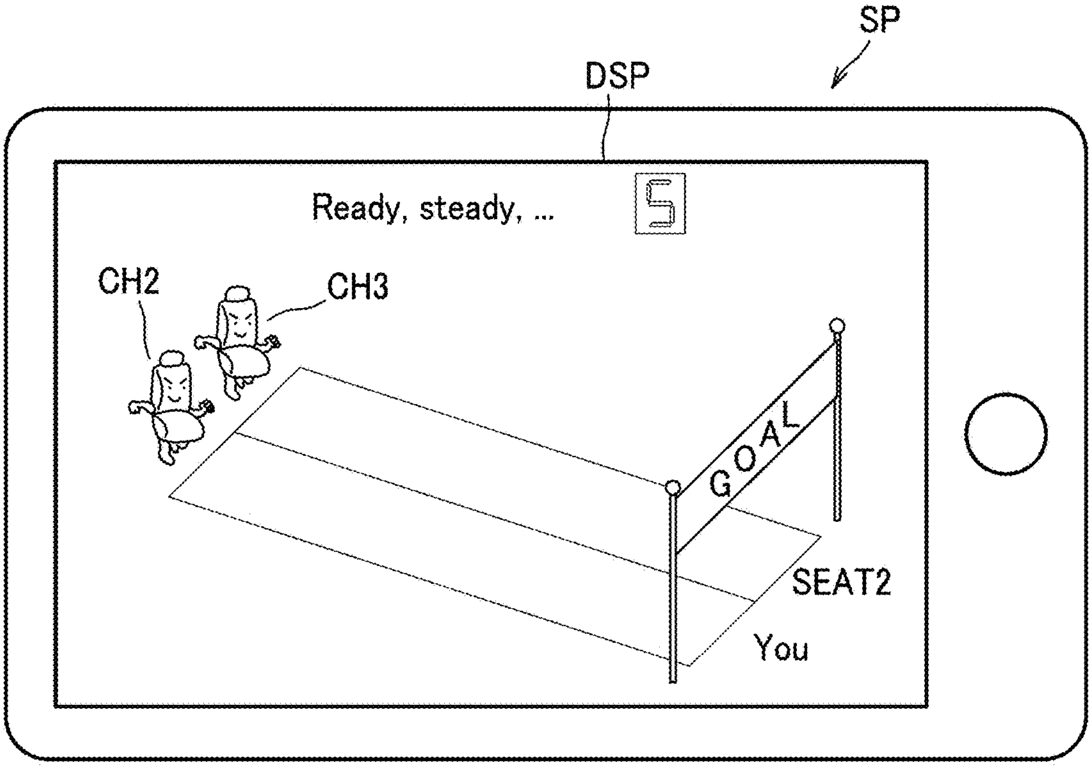
FIG. 19 is an example of a start screen for a 100-meter dash game.

If the calibration ends, the game processing unit 210 then shows a race start screen as shown in FIG. 13 (S220). The race start screen shows, for example, as shown in FIG. 19, a text message "Ready, steady . . . " and a number indicating a countdown for the start. In the race screen, the 100-meter race tracks, and seat-personified characters CH2, CH3 on the respective tracks are also displayed.

For example, if a plurality of tracks are shown and there is an entry of another occupant P participating in the same race, then text labels indicating players, i.e., "You" and "SEAT 2" of which the latter is a label of a participant seated on another seat, are shown on the respective tracks.

Figure 14:
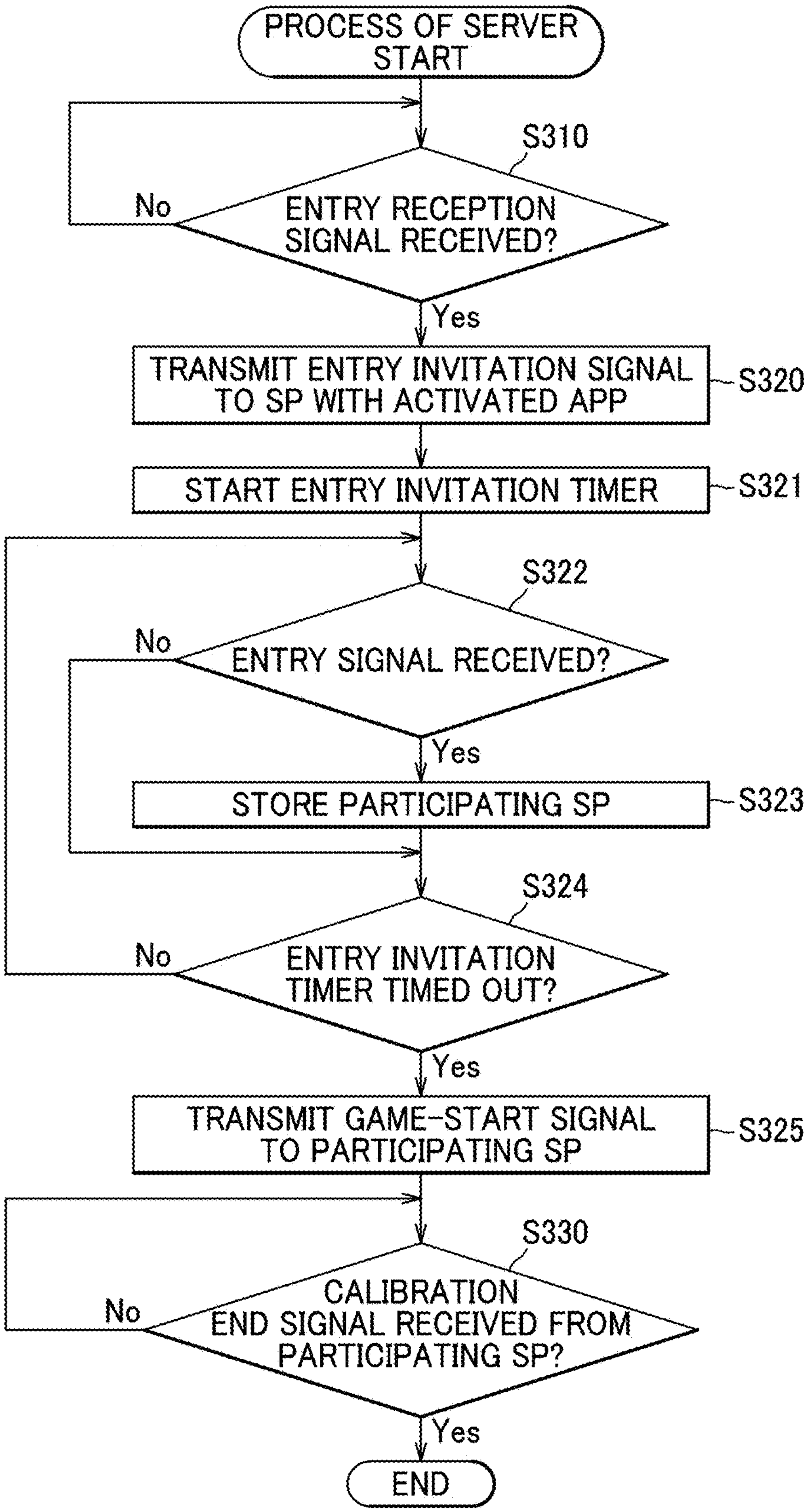
FIG. 14 is a flowchart of an example of a process of the server.

A process of the server SV related to entry reception will now be described with reference to FIG. 14. The process of FIG. 14 is executed repeatedly at a predetermined cycle. In the figures, the smartphone is abbreviated as "SP".

As shown in FIG. 14, the server SV determines whether or not it has received an entry reception signal from the apps of any of the smartphones SP (310), and waits until it receives such signal (No, S310). If an entry reception signal is received (Yes, S310), the server SV transmits entry invitation signals to the smartphones SP registered in the storage unit 390 as having the apps being launched (S320). The server SV then starts the entry invitation timer (S321).

The server SV determines whether or not it has received an entry signal from any of the smartphones SP (S322), and if received (Yes, S322), stores the identification information of the smartphone SP participating in the race in the storage unit 390 (S323).

After step 323, or after making a negative determination in step S322, the server SV determines whether or not the entry invitation timer has timed out (S324), and if not (No, S324), returns to step S322, while if timed out (Yes, S324), transmits a game-start signal to the participating smartphones SP registered in the storage unit 390 (S325). Subsequently, the server SV determines whether or not calibration end signals have been received from all participating smartphones SP (S330), and if received (Yes, S330), ends the present process related to entry reception.

Returning to FIG. 13, the rest of the process of the smartphone SP app will be described. After showing the race start screen (S220), the countdown is executed and the race is started. When the race starts, the game processing unit 210 transmits a race start signal to the control unit 100 (S221). Subsequently, the character locomotion processing section 213 determines whether or not the step intensities $F_R$, $F_L$ have been received (S222). If received (Yes, S222), then the character locomotion processing section 213 executes a process of moving a character CH2 according to the magnitude of the step intensities $F_R$, $F_L$ (S223). The traveled distances L are updated and transmitted to the control unit 100. Further, the character locomotion processing section 213 shows a remaining distance on the display DSP (S224).

Figure 20:
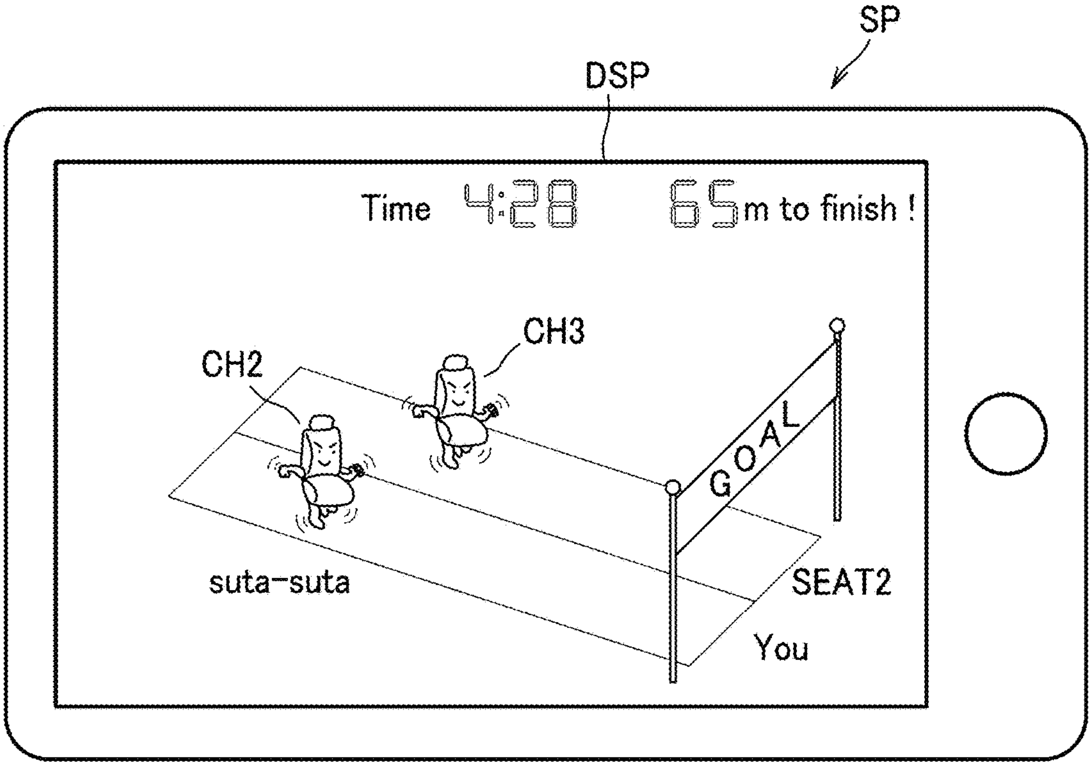
FIG. 20 is an example of a screen shown during the 100-meter dash game.

Next, the imitative word determination section 214 determines an imitative word to be displayed, from the step cycle TS and the normal step cycle $TS_n$, and shows the same on the display DSP (S225). Accordingly, during the race, an animated cartoon of characters CH2, CH3 running on the respective tracks, the remaining distance, and an imitative word such as "suta-suta (walking at brisk pace)" are displayed, as shown in FIG. 20. Moreover, the game processing unit 210 shows the time lapsed after the start.

If the step intensities $F_R$, $F_L$ have not been received (No, S222), then the character locomotion processing section 213 proceeds to step S226 without executing steps S223 to S225.

Subsequently, the game processing unit 210 acquires from the control unit 100, a traveled distance L of the character CH3 for the other seat occupant P, and moves the other seat character CH3, on an as-needed basis (S226).

Figure 21:
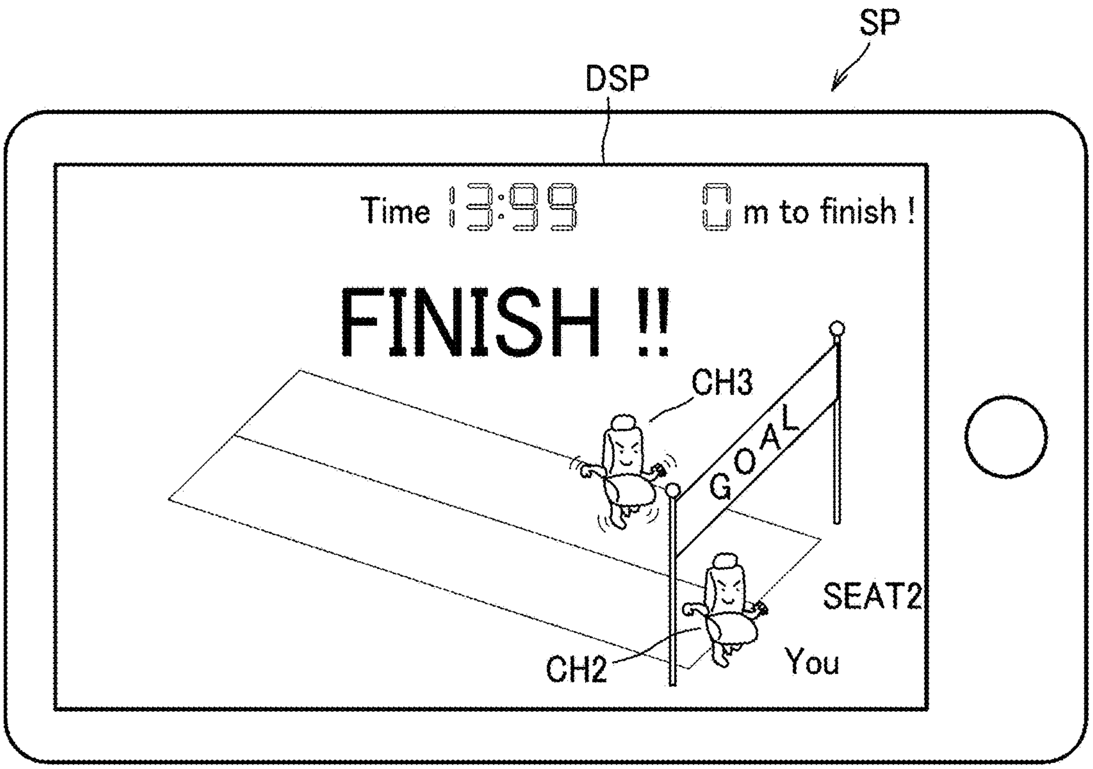
FIG. 21 is an example of a screen shown at the time of finishing in the 100-meter dash game.

Next, the character locomotion processing section 213 determines whether or not the traveled distance L is 100 or greater (S227), and if not, then repeats the process of the race starting from step S222. On the other hand, if the traveled distance L becomes 100 or greater (Yes, S227), then a race end signal is transmitted to the control unit 100 (S228). At the end of the race, a screen for example as shown in FIG. 21 is displayed. In this screen, the remaining distance is shown to be zero meters, and a time recorded at the end of the race is displayed.

Figure 22:
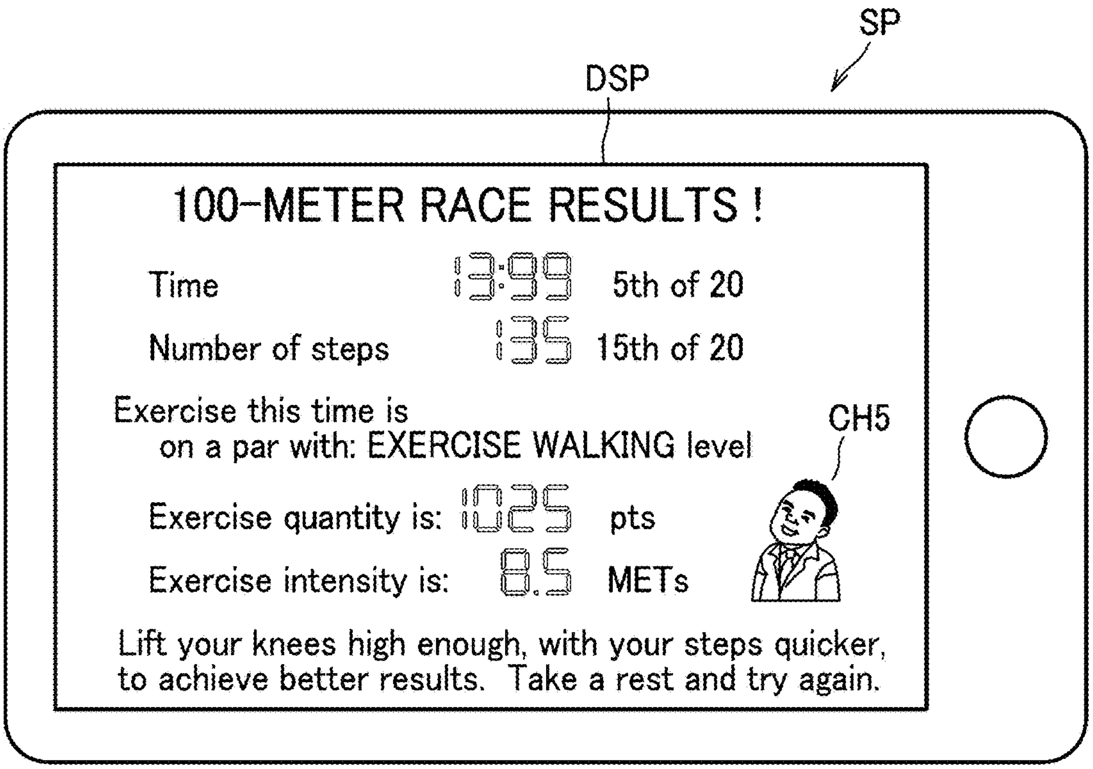
FIG. 22 is an example of a result screen of the 100-meter dash game.

The result output section 219 determines, as a result of the exercise, the exercise level, the quantity of exercise, the exercise intensity and the recommendation, and outputs these results on the display DSP (S229). The result screen is, for example, as shown in FIG. 22. In the result screen, the ranking of among all former players, obtained from data accumulated in the control unit 100 up to that point, is preferably displayed. Preferably, a character with a happy face CH5 is displayed if the result is good, while a character with a sad face is displayed if the result is not good.

After the result output section 219 shows the results, the process of the app ends.

Figure 15:
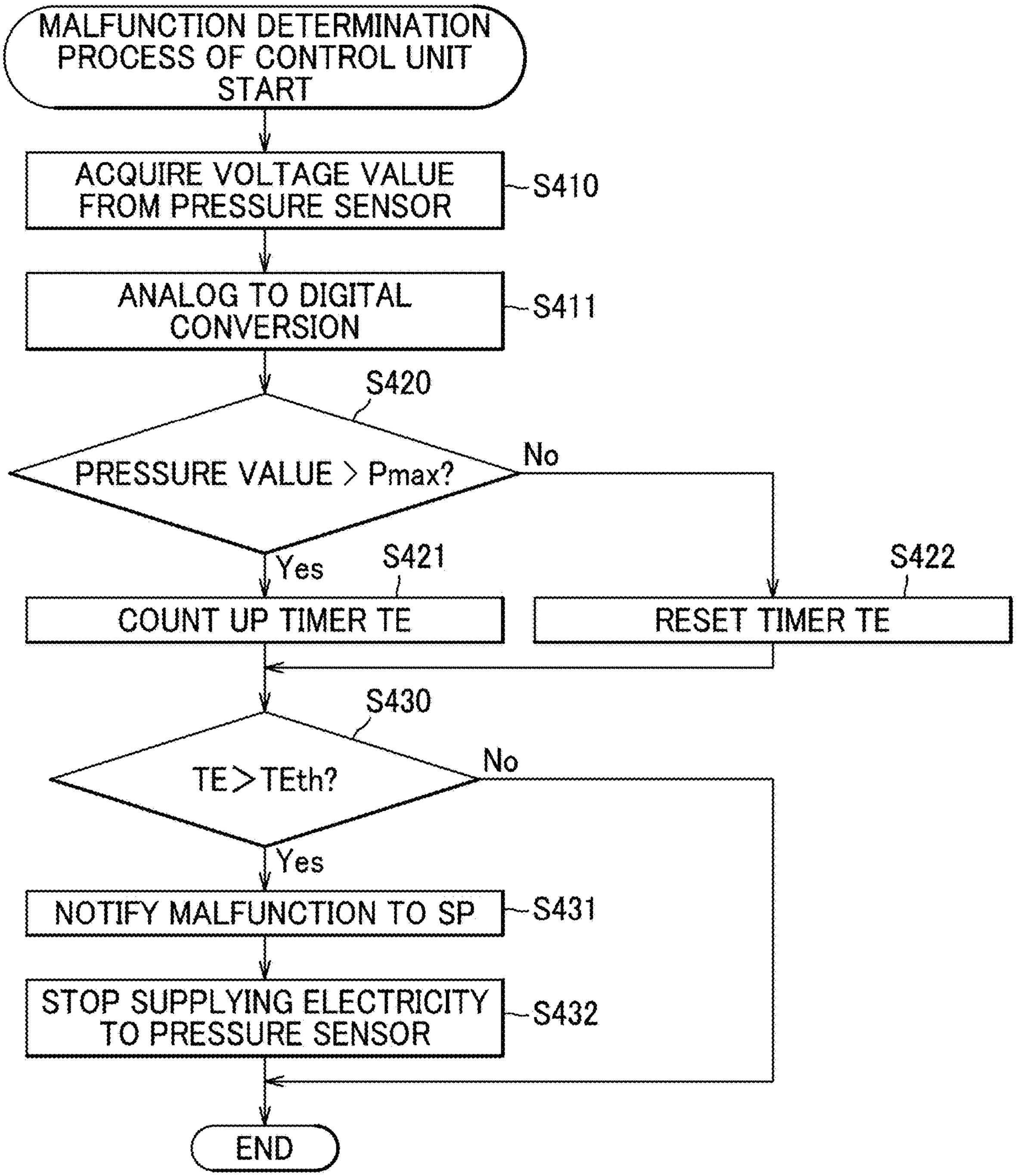
FIG. 15 is a flowchart of a malfunction detection process of the control unit.

Next, the malfunction determination process of the control unit 100 will be described with reference to FIG. 15. The process of FIG. 15 is executed repeatedly or at appropriate times, independently of the processes for the game.

The control unit 100 acquires voltage values from the pressure sensors PS1 to PS6 (S410). Then, the control unit 100 converts the acquired voltage values from analog to digital (S411) to obtain values that can be handled as pressure values. The control unit 100 then executes an error check in steps S420 to S432 for each pressure sensor PS1 to PS6.

The control unit 100 determines whether each pressure value is higher than the predetermined value Pmax (S420). If the pressure value is found to be higher than the predetermined value Pmax (Yes, S420), the control unit 100 causes the timer TE to count up (S421). On the other hand, if the pressure value is not found to be higher than the predetermined value Pmax (No, S420), the control unit 100 resets the timer TE (S422).

The control unit 100 then determines whether or not the count of the timer TE is higher than a threshold value TEth (S430), and if higher (Yes, S430), provides a notification to the smartphone SP that a malfunction has occurred in the pressure sensor (S431). At the same time, the control unit 100 stops supplying electricity to the pressure sensor in which it is determined that a malfunction has occurred (S432). If it is determined that the count of the timer TE is not higher than the threshold value TEth (No, S430), or after step S432, the control unit 100 ends the malfunction determination process.

Figure 16:
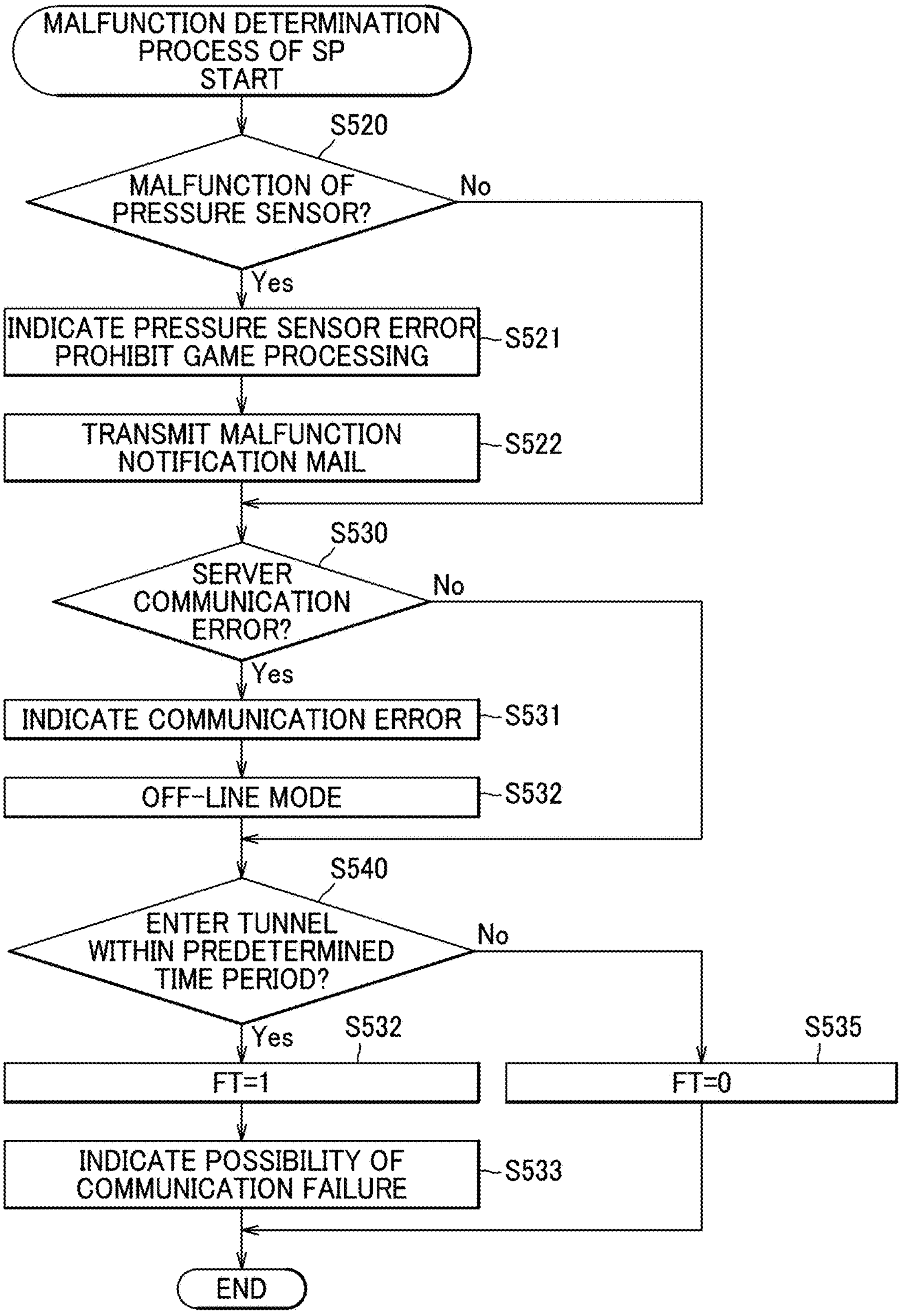
FIG. 16 is a flowchart of a malfunction detection process of a smartphone.

Next, a malfunction determination process of the smartphone SP will be described with reference to FIG. 16. The process of FIG. 16 is executed repeatedly or at appropriate times, independently of the processes for the game.

The malfunction processing unit 220 determines whether a malfunction has occurred in at least one of the pressure sensors PS1 to PS6 based on whether or not it receives a malfunction notification from the control unit 100 (S520). If it is determined that a malfunction has occurred in at least one of the pressure sensors PS1 to PS6 (Yes, S520), the malfunction processing unit 220 indicates a pressure sensor error on the display DSP and prohibits the game processing unit 210 from processing the game (S521). Then, the malfunction processing unit 220 transmits a malfunction notification mail to the mail address of the administrator of the seat experience system SYS (S522).

After step S522, or if it is determined in step S520 that no malfunction has occurred in any of the pressure sensors PS1 to PS6 (No, S520), the malfunction processing unit 220 determines whether or not an error has occurred in communication with the server SV (S530). The malfunction processing unit 220, for example, makes a specific inquiry to the server SV to confirm whether communication is established and determines whether or not an error has occurred in communication based on whether or not there is an appropriate response. If it is determined that an error has occurred in communication with the server SV (Yes, 530), the malfunction processing unit 220 indicates a communication error on the display DSP (S531). The malfunction processing unit 220 then switches operation to an off-line mode in which the game is not executed concurrently with other smartphones SP and only allowed to be executed off-line (S532).

After step S532, or if it is determined that there is no error in communication with the server SV (No, S530), the malfunction processing unit 220 acquires from the navigation system 300, route information currently provided for navigation, location information of the car V, and velocity information of the car V, etc., and determines whether or not the car V will enter a tunnel within a predetermined time period based on the route information, the location information, and the velocity information (S540). If it is determined that the car V is going to enter a tunnel within a predetermined time period (Yes, S540), the malfunction processing unit 220 sets the flag FT to 1 (S532). The malfunction processing unit 220 then indicates on the display DSP that there is a possibility of communication failure with the server SV (communication failure warning) (S533), and ends the present process.

On the other hand, if it is determined that the car V will not enter a tunnel within a predetermined time period (No, S540), the malfunction processing unit 220 sets the flag FT to 0 (S535), and ends the present process.

Although the process of FIG. 16 described above is executed repeatedly or at appropriate times, it is also executed upon startup of the app. Therefore, if there is an error upon startup of the app, the occupant P is notified of a malfunction of the seat experience system SYS, and the administrator is also notified of the malfunction. In addition, if the seat experience system SYS is available for limited usage, the occupant P may select whether or not to execute the app.

According to the seat experience system SYS of the first embodiment configured as described above, the following advantageous effects can be achieved.

Since the controller 100 outputs and transmits, to the smart phone SP, pressure values acquired from the pressure sensors PS1 to PS6 as signals for operating the game app of the smartphone SP, an occupant P seated on the vehicle seat S can operate the smartphone SP by moving his/her legs and/or shoulders on the seat body S0.

Therefore, the smartphone SP does not have to be operated by hand and can be operated by motions of one's body on the seat body S10. Accordingly, when tired inside a vehicle, it is possible to move one's body moderately to refresh oneself.

Since the smartphone SP notifies the occupant P of a malfunction, and limits at least a subset of functions of the seat experience system SYS if a malfunction of the seat experience system SYS, for example, a malfunction of the pressure sensors PS1 to PS6 is detected, or an error has occurred in communication with the server SV, the occupant P can grasp the state of the system and feel secure about using the seat experience system SYS.

Since, in this embodiment, the administrator of the seat experience system SYS can become aware of a malfunction if such malfunction occurs in the seat experience system SYS, the malfunction can be quickly fixed. It is also possible to offer the occupant P an advice of how to deal with the malfunction to make the occupant P feel secure.

Since the control unit 100 does not supply electricity to the pressure sensors PS1 to PS6 in which a malfunction occurs, power consumption can be reduced.

Since the smartphone SP when unable to communicate with the server SV, switches to and operates in an off-line mode, the smartphone SP can provide a game to an occupant P even when communication with the server SV is not available.

Since the smartphone SP predicts that it is going to enter tunnel within a predetermined time period, and indicates on the display and notifies an occupant P of a possibility of losing communication with the server SV, the occupant P can be made aware that a communication error may possibly occur beforehand.

Since the seat experience system SYS operates differently according to the type and/or severity of a malfunction, functions thereof can be limited at appropriate levels according to the malfunction.

Although the first embodiment has been described above, specific configurations may be modified were appropriate.

For example, in the above-described embodiment, if communication with the server SV is not available, a game is not executed concurrently with another seat experience system SYS; however, if the control unit 100 in the car V has a function similar to that of the server SV, as established among the plurality of seat experience systems SYS in the cars V, of executing a game in synchronization with a plurality of smartphones SP, the game may be executed concurrently among the plurality of seats S in the cars V in an off-line mode.

In the above-described embodiment, if a malfunction occurs in the seat experience system SYS, the malfunction is shown by text on the display DSP of the smartphone SP which is the seat experience device; however, the malfunction may be shown by pictures or colors. Further, the malfunction may be notified, by voice, vibration, scent, or other ways such as a change in touch as associated with showing of the text on the display DSP. The malfunction may be notified not only to the occupant P using the seat experience system SYS, but also to the smartphones SP of other people on the car by setting user preference. In the present specification, when it is described that the occupant P is notified, it means that the occupant P is notified by the above-described means. For example, by providing a notification of a malfunction to a parent's smartphone SP when a child is playing a game on the seat experience system SYS, the parent may take a necessary action.

In the above-described embodiment, although the seat experience device provides a notification of the malfunction to the terminal used by the administrator of the seat experience system SYS and the server SV, only one of the terminal of the administrator or the server SV may be given such notification of the malfunction.

In the above-described embodiment, although an error in communication between the smartphone SP and the server SV is illustrated as an example of a communication error, the communication error includes other communication errors such as a communication error between the sensor and the controller, between the controller and the seat experience device, etc. If a communication error is detected, the seat experience device preferably not only notifies the occupant of the error, but also tries to reconnect and notifies the occupant of the progress thereof. If an automatic recovery by reconnection fails, the occupant P is preferably notified of procedural steps for reconnection which enables the occupant P to attempt manual reconnection. If the communication error cannot be solved even by the manual process, notification of the details of the malfunction may preferably be given to the server or the terminal used by the administrator, and the occupant is preferably notified of the results of analysis by the server or the administrator. In order to perform such analysis, a mechanism for locating, from a communication log, where and what kind of failure is occurring in communication is preferably provided in the server.

In the above-described embodiment, although malfunctions in communication and in the pressure sensors PS1 to PS6 are given as typical examples of malfunctions, other malfunctions may be detected and notified such as malfunctions of other equipment, for example, malfunctions of temperature control devices such as a heater or a fan provided at the seat, malfunctions of an actuator for moving a part of or the whole seat, malfunctions of other sensors such as a seat weight sensor or temperature sensor, malfunctions relating to the remaining amount or the state of usage of consumables such as the amount of air freshener left for the seat being small, a malfunction of the controller itself, or an abnormality in an external environment. An abnormality in an external environment is, for example, a state that is not desirable for executing the app including a state in which another car is approaching, the road condition is bad, the car speed is high, an earthquake has occurred, a destination is near, a destination has been reached, it is predicted that the game will not end before a destination is reached, the amount of fuel left is small, the battery level is low, the temperature or humidity inside or outside the car is high, etc.

If an unauthorized access to the server and/or seat experience device is found, the seat experience device preferably stops providing services using communication immediately, or ends the app itself immediately, in order to minimize damages such as leakage of personal information. Alternatively, if an unauthorized access is detected, communication from the IP address which made the unauthorized access may be blocked while continuing communication with other sources.

The seat experience device may either limit functions if a malfunction is detected once, or limit functions if malfunctions are detected a plurality of times. The manner in which functions are limited may be provided at different levels according to the severity of the malfunction, such as a forced shutdown of the app as a first limitation, guiding a user to select ending the app as a second limitation, and only inviting a user to end the app as a third limitation. In this case, the manner and intensity of notification can be changed according to the severity of the malfunction, for example, when the severity is high, the malfunction can be notified by a large text and sound, and when the severity is low, the malfunction can be notified by a small text and sound, etc.

The seat experience device may be configured to limit upon detection of a malfunction, viewing of the situation of games played by other people on the car, on another car, or outside the car, etc.

The seat experience device may change the level and/or type of limitation of functions based on the state of the car. The state of the car includes stopped, parked, autonomous driving, etc. The functions may or may not be limited according to positions or types of seats in the car. Further, even if a malfunction occurs, only on condition that all people on the car agree not to limit any functions, or opponents concurrently playing the game outside of the car also agree, the game may be executed without limiting functions.

Preferably, in the course of purchasing or downloading the app of the seat experience device on the smartphones SP, information about the flow of notification and processing upon detection of a malfunction may be provided as an advance notice.

If a malfunction of a subset of sensors is detected, the seat experience device may recommend that the occupant select a game using other sensors with no malfunction. For example, if a malfunction has occurred in a sensor located in a laterally center portion of the seat, it is possible to ask the occupant if he/she will play a game using sensors located on left and right side portions of the seat protruding toward the occupant.

In the above-described embodiment, it is determined that a failure has occurred in a sensor if the controller keeps receiving from the sensor a signal higher than a predetermined value for a predetermined time period; however, it may be determined that a failure has occurred in the sensor if the signal keeps exhibiting values lower than a predetermined value for a predetermined time period, or keeps fluctuating greatly for a predetermined time period. It may be determined that the signal is fluctuating greatly, for example, if the amplitudes of the signal satisfy the condition of being higher than a predetermined value.

Although the seat experience device provides a 100-meter dash game as an example of a game in the above-described embodiment, other games or services may be provided. The seat experience device is not limited to a smartphone, but may be a tablet personal computer, personal computer, navigation system, etc. The seat experience device may be realized by combining other devices in the car V with the smartphone SP, the tablet personal computer, the personal computer, the navigation system, etc. For example, the seat experience device can be configured as a combination of a tablet personal computer for notification of a malfunction and an object installed in the car V for a game and configured to move based on a measurement value of a sensor.

Although a pressure sensor is given as an example of a sensor in the above-described embodiment, the sensor may be another type of sensor, for example, a capacitance sensor, a camera, a temperature sensor, or the like. If pressure is to be measured, a pressure distribution sensor may also be adopted Next, a second embodiment of the seat experience system will be described in detail with reference to FIG. 23 to FIG. 29.

Figure 23:
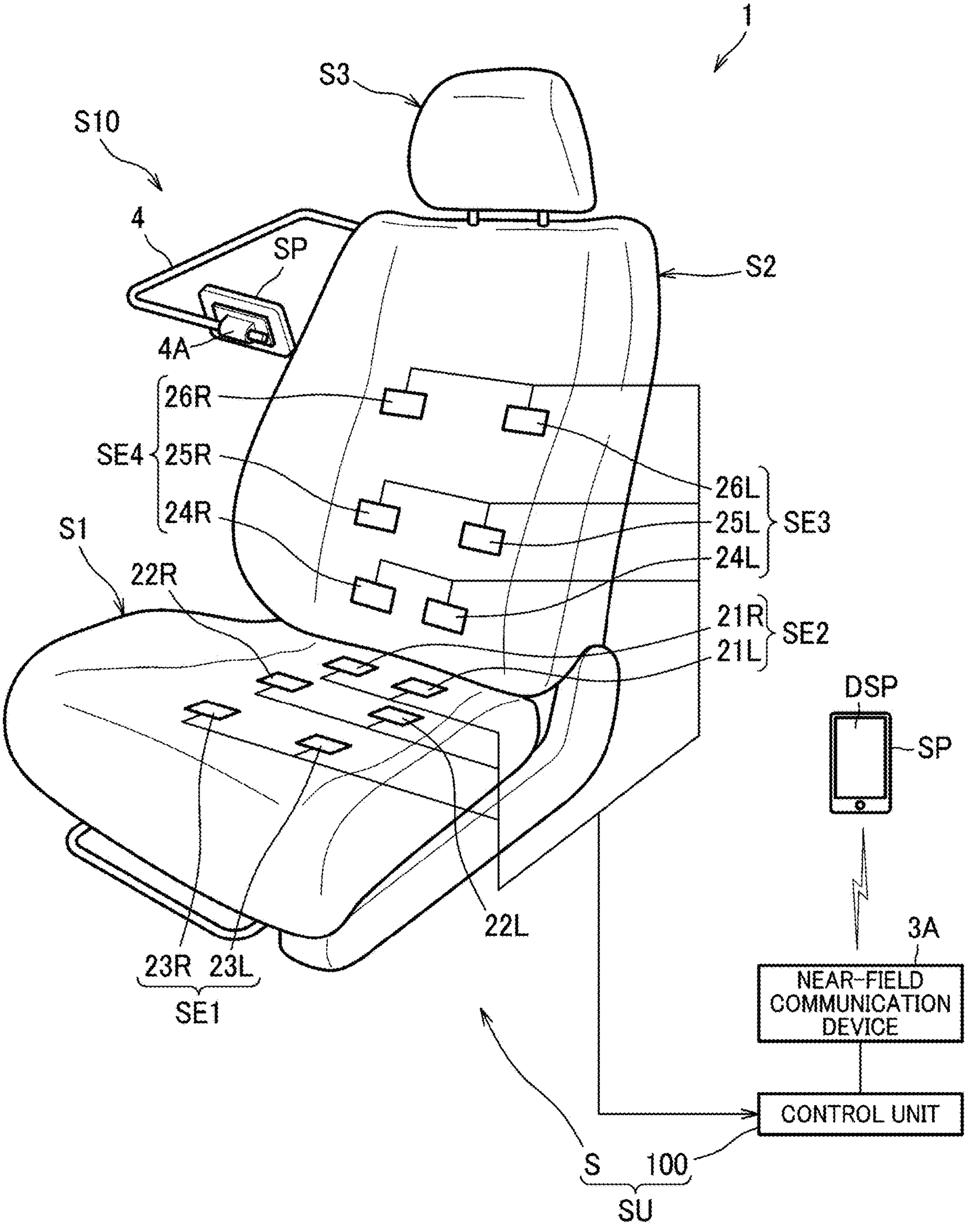
FIG. 23 is a diagram showing the seat experience system according to a second embodiment.

As shown in FIG. 23, the seat experience system 1 of the present embodiment comprises a seat S, and a smartphone SP as an example of a terminal corresponding to the seat experience device of the first embodiment.

The seat S comprises a seat body S10, and pressure sensors 21 to 26. As one example, the seat body S10 is a vehicle seat installed in a vehicle such as a car, and includes a seat cushion S1, a seat back S2, and a headrest S3. A plurality of pressure sensors 21 to 26 are provided under the outer coverings of the seat cushion S1 and the seat back S2. The pressure sensors 21 to 26 are sensors configured to detect a motion of an occupant seated on the seat body S10.

The pressure sensors 21 to 26 are located so as to be capable of detecting a state of a seat surface that faces an occupant seated on the seat body S10, and acquire pressure values from the occupant seated on the seat body S10. The control unit (electronic control unit) 100 is a device that controls operation of the seat body S10 (for example, a motor of a motor-driven reclining device, or a heater, etc. (not shown)), and is connected to the pressure sensors 21 to 26 so as to be capable of acquiring measurement values from the pressure sensors 21 to 26.

The respective pressure sensors 21 to 26 are provided in pairs, each located left and right, symmetric with respect to a laterally central position of the seat S. In the following description and figures, the pressure sensors 21 to 26 on the left side and the pressure sensors 21 to 26 on the right side may be distinguished by adding, to the end of a character, “L” for pressure sensors on the left side and “R” for pressure sensors on the right side.

The pressure sensors 21 to 23 are provided at the seat cushion S1. The pressure sensors 21 are provided in positions corresponding to the lowermost parts of the ischia of the occupant. These positions are where the weight of the occupant is most largely placed.

The pressure sensors 22 are located a little forward of the pressure sensors 21.

The pressure sensors 21 and the pressure sensors 22 are both provided for measuring pressure from the buttocks of the occupant P, and only either pair of the pressure sensors 21 or the pressure sensors 22 may be provided.

The pressure sensors 23 are located forward and largely apart from the pressure sensors 21 and the pressure sensors 22. The pressure sensors 23 are located under the thighs of the occupant and are capable of measuring values of pressure from the thighs of the occupant.

The pressure sensors 24 to 26 are provided at the seat back S2. The pressure sensors 24 are provided in positions corresponding to the back of the lumbar region of the occupant.

The pressure sensors 25 are located a little above the pressure sensors 24.

The pressure sensors 24 and the pressure sensors 25 are both provided for measuring pressure from the lumbar region of the occupant, and only either pair of the pressure sensors 24 or the pressure sensors 25 may be provided.

The pressure sensors 26 are located above and largely apart from the pressure sensors 24 and the pressure sensors 25. The pressure sensors 26 are provided in positions corresponding to the shoulders of the occupant and are capable of measuring values of pressure from the shoulders of the occupant.

In this embodiment, the seat experience system 1 provides an electric shock maze game using the pressure sensors 21 to 26. In this embodiment, the sensors 21 to 26 are examples of sensors for acquiring measurement values to detect a motion of an occupant seated on the seat body S10. The electric shock maze game is a game in which an occupant seated on the seat body S10 moves an operator icon IC, shown on the display DSP that is a screen of the smartphone SP (see FIG. 27(*b*)), to a goal without contacting walls W forming the maze.

The seat body S10 is provided with a holder 4 for holding a smartphone SP. The holder 4 is formed by bending a wire, with one end fixed to the seat back S2 and the other end having a holding portion 4A for holding the smartphone SP. By fixing the smartphone SP on the holding portion 4A, the occupant can view the display DSP of the smartphone SP without holding the smartphone SP in his/her hand. Accordingly, the occupant can operate the operator icon IC of the electric shock maze game using his/her whole body while viewing the display DSP.

A control unit 100 is provided at the seat.

The control unit 100 is connected to a near-field communication device 3A which enables near-field wireless communication, such as Bluetooth (registered trademark) or, Wi-Fi (registered trademark). The control unit 100 is connected to the pressure sensors 21 to 26. In this embodiment, the control unit 100 and the near-field communication device 3A are provided at the seat body S10. The seat S and the control unit 100 (and the near-field communication device 3A) constitute a seat unit SU.

The control unit 100 and the smartphone SP each include a CPU, a ROM, a RAM, a rewritable nonvolatile memory, etc. (not shown) and execute a pre-stored program. The smartphone SP further includes the display DSP. The smartphone SP operates according to a program and functions as means for executing the electric shock maze game.

The control unit 100 has a function of transmitting to the smartphone SP via the near-field communication device 3A, measurement values acquired from the pressure sensors 21 to 26 (information for detecting the motion of the occupant seated on the seat body S10). The smartphone SP has a function of acquiring the measurement values from the respective sensors 21 to 26 via the control unit 100, etc., and moving an object to be operated (operable object) on the display DSP. To be more specific, the smartphone SP, based on information acquired from the respective sensors 21 to 26, sets a command for moving the operable object, and moves the operable object on the display DSP based on the set command. The smartphone SP also changes the velocity of the operable object based on information acquired from the respective sensors 21 to 26.

Specifically, the smartphone SP is capable of determining, based on measurement values from the respective sensors 21 to 26, whether a posture assumed by the occupant is a leaning-forward posture in which a weight of the occupant is placed further forward than the weight of the occupant assuming a normal posture, or a leaning-rearward posture in which the weight of the occupant is placed further rearward than the weight of the occupant in the normal posture. Further, the smartphone SP is capable of determining, based on measurement values from the respective sensors 21 to 26, whether the posture assumed by the occupant is a leaning-leftward posture in which the weight of the occupant is placed further leftward than the weight of the occupant in the normal posture, or a leaning-rightward posture in which the weight of the occupant is placed further rightward than the weight of the occupant in the normal posture.

The smartphone SP determines, based on the measurement values acquired from the two pressure sensors 23 positioned on the forward side of the seat cushion S1 (also referred to as “forward cushion sensors SE1” in the following description), as to whether or not the posture assumed by the occupant is the leaning-forward posture. The forward cushion sensors SE1 are examples of a first pressure sensor, and are configured to output a first normal pressure value when the posture assumed by the occupant is the normal posture, output a first higher pressure value higher than the first normal pressure value when the posture assumed by the occupant is the leaning-forward posture, and output a first lower pressure value lower than the first normal pressure value when the posture assumed by the occupant is the leaning-rearward posture.

The first normal pressure value is defined as a certain range of values. To be more specific, the first normal pressure value is a normal range of values that is set by including marginal values provided on the plus side and the minus side of values output from the pressure sensor 23, during a setting process for the normal posture in the electric shock maze game, i.e., calibration, which will be described later. The first higher pressure value is a value higher than the normal range, and the first lower pressure value is a value lower than the normal range. The other normal pressure values, higher pressure values, and lower pressure values which will be described later (for example, second normal pressure value, second higher pressure value, and second lower pressure value) can be defined in a similar manner.

If the first higher pressure value is acquired from the forward cushion sensors SE1, the smartphone SP determines that the posture assumed by the occupant is the leaning-forward posture. In this embodiment, the pressure value acquired from the forward pressure sensors SE1 is the higher of the measurement values acquired from the plurality of forward pressure sensors. The pressure value acquired from the forward pressure sensors SE1 may also be, for example, an average value of a plurality of measurement values acquired from the plurality of forward pressure sensors SE1. The same applies to the pressure values acquired from the other sensors which will be described later (for example, rearward cushion sensors SE2 described later).

The smartphone SP determines, based on measurement values acquired from two pressure sensors 21 positioned on the rearward side of the seat cushion S1 (also referred to as "rearward cushion sensors SE2" in the following description), as to whether or not the posture assumed by the occupant is the leaning-rearward posture. The rearward cushion sensors SE2 are examples of a second pressure sensor, and are configured to output a second normal pressure value when the posture assumed by the occupant is the normal posture, output a second lower pressure value lower than the second normal pressure value when the posture assumed by the occupant is the leaning-forward posture, and output a second higher pressure value higher than the second normal pressure value when the posture assumed by the occupant is the leaning-rearward posture. If the second higher pressure value is acquired from the rearward cushion sensors SE2, the smartphone SP determines that the posture assumed by the occupant is the leaning-rearward posture.

The smartphone SP determines, based on measurement values acquired from the three pressure sensors 24L, 25L, 26L positioned on the left side of the seat back S2 (also referred to as "left-side back sensors SE3" in the following description), as to whether or not the posture assumed by the occupant is the leaning-leftward posture. The left-side back sensors SE3 are examples of a third pressure sensor, and are configured to output a third normal pressure value when the posture assumed by the occupant is the normal posture, output a third higher pressure value higher than the third normal pressure value when the posture assumed by the occupant is the leaning-leftward posture, and output a third lower pressure value lower than the third normal pressure value when the posture assumed by the occupant is the leaning-rightward posture. If the third higher pressure value is acquired from the left-side back sensors SE3, the smartphone SP determines that the posture assumed by the occupant is the leaning-leftward posture.

The leaning-leftward posture is a posture in which a center of mass is shifted to the left of the center of the body of the occupant, and includes, for example, a posture in which the occupant twists his/her body to the left. The same can be said for the leaning-rightward posture described later; the leaning-rightward posture is a posture in which a center of mass is shifted to the right of the center of the body of the occupant, and includes, for example, a posture in which the occupant twists his/her body to the right.

The smartphone SP determines, based on measurement values acquired from the three pressure sensors 24R, 25R, 26R positioned on the right side of the seat back S2 (also referred to as "right-side back sensors SE4" in the following description), as to whether or not the posture assumed by the occupant is the leaning-rightward posture. The right-side back sensors SE4 are examples of a fourth pressure sensor, and are configured to output a fourth normal pressure value when the posture assumed by the occupant is the normal posture, output a fourth lower pressure value lower than the fourth normal pressure value when the posture assumed by the occupant is the leaning-leftward posture, and output a fourth higher pressure value higher than the fourth normal pressure value when the posture assumed by the occupant is the leaning-rightward posture. If the fourth higher pressure value is acquired from the right-side back sensors SE4, the smartphone SP determines that the posture assumed by the occupant is the leaning-rightward posture.

If it is determined that the posture is the leaning-forward posture, the smartphone SP sets a first command, and if it is determined that the posture is the leaning-rearward posture, the smartphone SP sets a second command. Further, if it is determined that the posture is the leaning-leftward posture, the smartphone SP sets a third command, and if it is determined that the posture is the leaning-rightward posture, the smartphone SP sets a fourth command.

Each command is an instruction for moving the operable object in the electric shock maze game played on the display DSP of the smartphone SP. Specifically, the first command indicates that an operation to move the operable object on the display DSP upward has been performed. The second command indicates that an operation to move the operable object on the display DSP downward has been performed. The third command indicates that an operation to move the operable object on the display DSP toward the left has been performed. The fourth command indicates that an operation to move the operable object on the display DSP toward the right has been performed. In the following description, the first command is also referred to as "up command", the second command is also referred to as "down command", the third command is also referred to as "left command", and the fourth command is also referred to as "right command".

If it is determined that the posture is the leaning-forward posture, the smartphone SP sets a velocity of the operable object in such a manner that the higher the first higher pressure value acquired when it is determined that the posture is the leaning-forward posture, the higher the velocity of upward movement of the operable object on the screen is. If it is determined that the posture is the leaning-rearward posture, the smartphone SP sets the velocity of the operable object in such a manner that the higher the second higher pressure value acquired when it is determined that the posture is the leaning-rearward posture, the higher the velocity of downward movement of the operable object on the screen is.

If it is determined that the posture is the leaning-leftward posture, the smartphone SP sets the velocity of the operable object in such a manner that the higher the third higher pressure value acquired when it is determined that the posture is the leaning-leftward posture, the higher the velocity of leftward movement of the operable object on the screen is. If it is determined that the posture is the leaning-rightward posture, the smartphone SP sets the velocity of the operable object in such a manner that the higher the fourth higher pressure value acquired when it is determined that the posture is the leaning-rightward posture, the higher the velocity of rightward movement of the operable object on the screen is.

Figure 27:
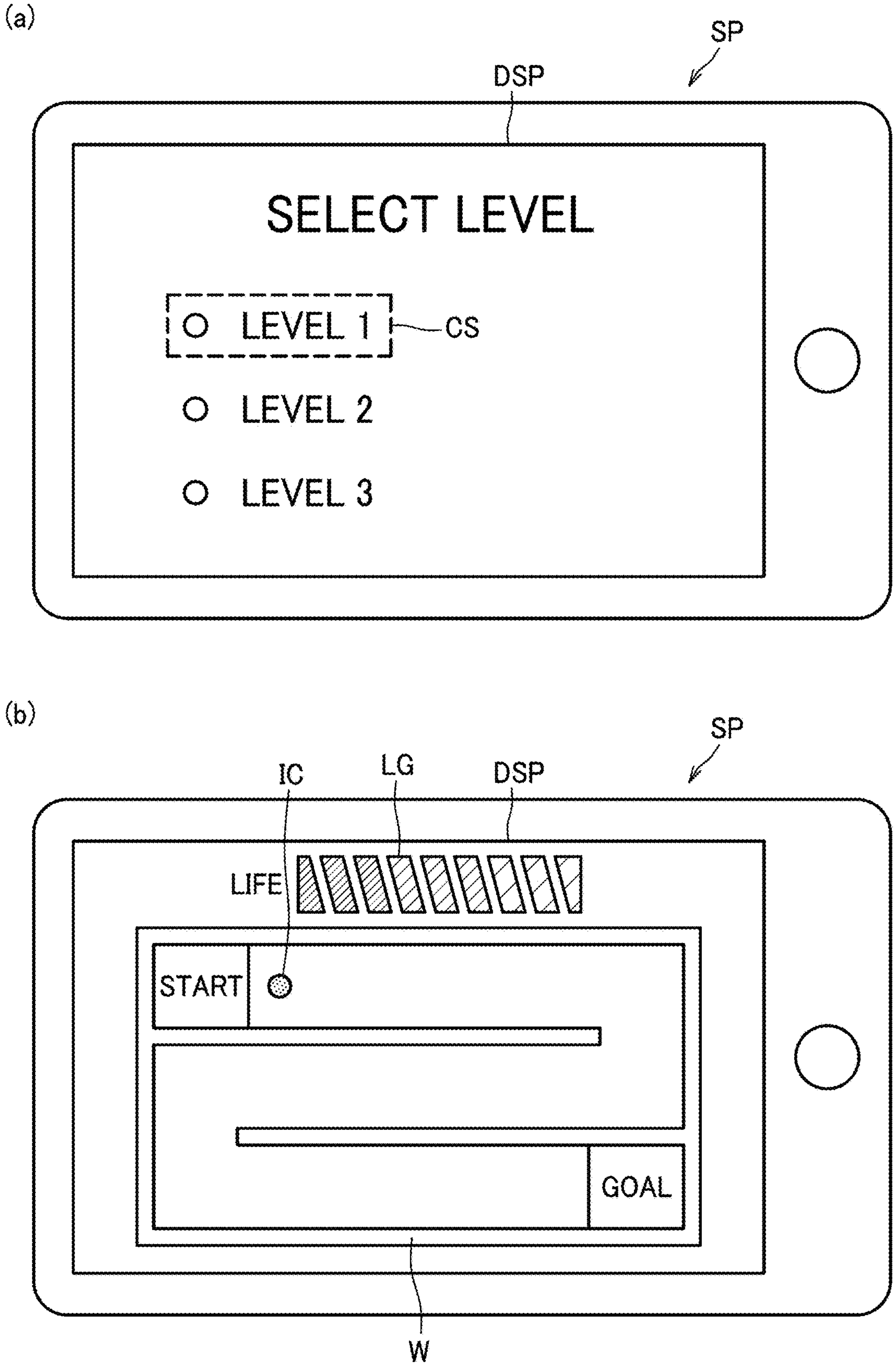
FIG. 27 includes (a) a diagram showing a screen for selecting a level, and (b) a diagram showing a screen shown during the electric shock maze game.

The smartphone has a function of moving the operable object in the electric shock maze game based on the command and the velocity set by the smartphone. The operable object in the electric shock maze game is, on the screen for selecting a level (difficulty) for the electric shock maze game as shown in FIG. 27(*a*), a cursor CS for selecting the level, and on the screen displayed during execution of the electric shock maze game as shown in FIG. 27(*b*) (also referred to as "game screen" in the following description), the operator icon IC.

The smartphone SP, currently displaying a screen for selecting the level, moves the cursor CS downward on the screen in response to a down command received from the seat S, and moves the cursor CS upward on the screen in response to an up command received from the seat S. At this time, the smartphone SP changes the velocity of the cursor CS in accordance with the magnitude of the pressure values.

On the game screen, the operator icon IC, the walls W forming the maze, and a life gauge LG that diminishes each time the operator icon IC contacts the wall W are shown. During execution of the electric shock maze game, the smartphone SP moves the operator icon IC in a direction corresponding to the command and changes the velocity of the operator icon IC in accordance with the magnitude of the pressure values.

Next, the operation of the smartphone SP will be described in detail. During execution of the electric shock maze game, the smartphone SP repeatedly executes a process shown in FIG. 24 at all times.

Figure 24:
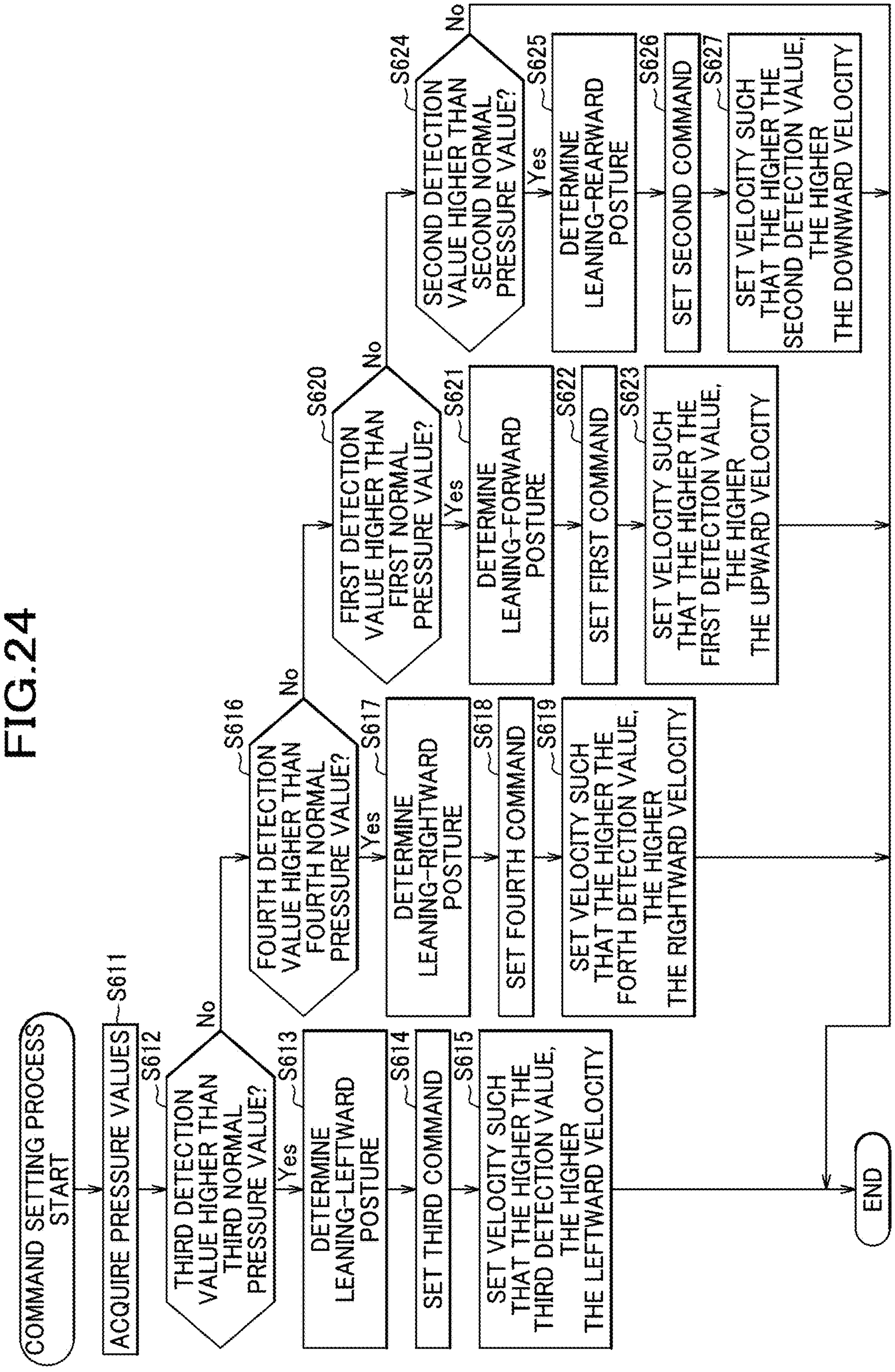
FIG. 24 is a flowchart showing a command setting process.

As shown in FIG. 24, the smartphone SP receives pressure values from each of the sensors SE1 to SE4 (S611). After step S611, the smartphone SP determines whether or not a third detection value acquired from the left-side back sensors SE3 is higher than the third normal pressure value, i.e., is the third higher pressure value (S612).

If it is determined in step S612 that the third detection value is higher than the third normal pressure value (Yes), the smartphone SP determines that the posture of the occupant is the leaning-leftward posture (S613). After step 613, the smartphone SP sets the left command as the third command (S614).

After step S614, the smartphone SP sets the velocity of the operator icon IC in such a manner that the higher the third detection value acquired when it is determined that the posture is the leaning-leftward posture, the higher the velocity of leftward movement of the operator icon IC on the screen is (S615), and ends the present process.

If it is determined in step S612 that the third detection value is not higher than the third normal pressure value (No), the smartphone SP determines whether or not a fourth detection value acquired from the right-side back sensors SE4 is higher than the fourth normal pressure value, i.e., is the fourth higher pressure value (S616).

If it is determined in step S616 that the fourth detection value is higher than the fourth normal pressure value (Yes), the smartphone SP determines that the posture of the occupant is the leaning-rightward posture (S617). After step 617, the smartphone SP sets the right command as the fourth command (S618).

After step S618, the smartphone SP sets the velocity of the operator icon IC in such a manner that the higher the fourth detection value acquired when it is determined that the posture is the leaning-rightward posture, the higher the velocity of rightward movement of the operator icon IC on the screen is (S619), and ends the present process.

If it is determined in step S616 that the fourth detection value is not higher than the fourth normal pressure value (No), the smartphone SP determines whether or not a first detection value acquired from the forward cushion sensors SE1 is higher than the first normal pressure value, i.e., is the first higher pressure value (S620).

If it is determined in step 620 that the first detection value is higher than the first normal pressure value (Yes), the smartphone SP determines that the posture of the occupant is the leaning-forward posture (S621). After step S621, the smartphone SP sets the up command as the first command (S622).

After step S622, the smartphone SP sets the velocity of the operator icon IC in such a manner that the higher the first detection value acquired when it is determined that the posture is the leaning-forward posture, the higher the velocity of upward movement of the operator icon IC on the screen is (S623), and ends the present process.

If it is determined in step S620 that the first detection value is not higher than the first normal pressure value (No), the smartphone SP determines whether or not a second detection value acquired from the rearward cushion sensors SE2 is higher than the second normal pressure value, i.e., is the second higher pressure value (S624).

If it is determined in step 624 that the second detection value is higher than the second normal pressure value (Yes), the smartphone SP determines that the posture of the occupant is the leaning-rearward posture (S625). After step S625, the smartphone SP sets the down command as the second command (S626).

After step S626, the smartphone SP sets the velocity of the operator icon IC in such a manner that the higher the second detection value acquired when it is determined that the posture is the leaning-rearward posture, the higher the velocity of downward movement of the operator icon IC on the screen is (S627), and ends the present process. If it is determined in step S624 that the second detection value is not higher than the second normal pressure value (No), the smartphone SP ends the present process without proceeding to other steps.

Figure 25:
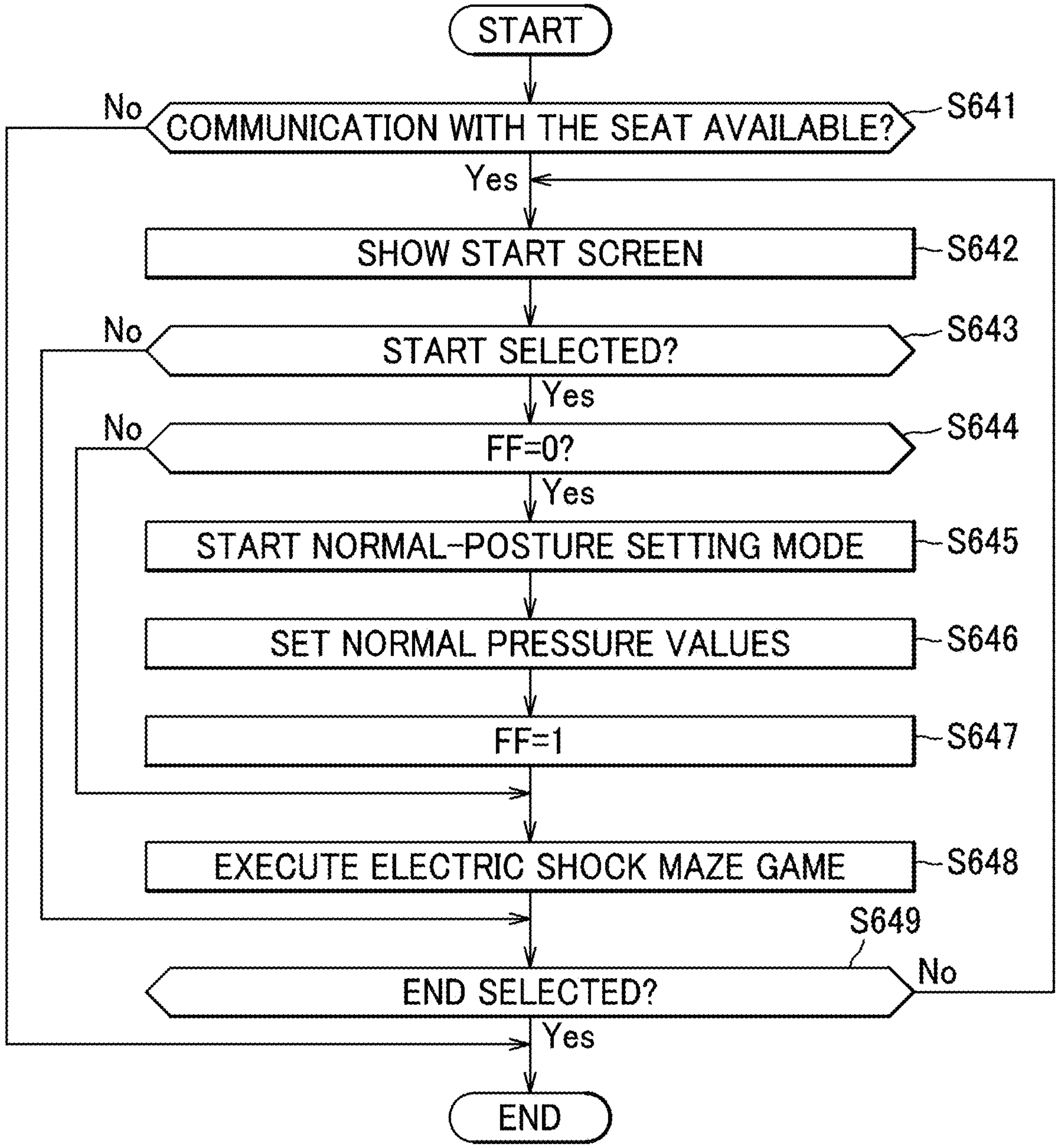
FIG. 25 is a flowchart showing a process for executing an electric shock maze game.

When the occupant starts up the app (application) for executing the electric shock maze game, the smartphone SP starts the process shown in FIG. 25 (START). In this process, the smartphone SP first determines whether or not communication with the seat S is available (S641).

If it is determined in step S641 that communication with the seat S is not available (No), the smartphone SP ends the present process. If it is determined in step S641 that communication is available (Yes), the smartphone SP shows a start screen (see FIG. 26(*a*)) for the electric shock maze game on the display DSP (S642).

Figure 26:
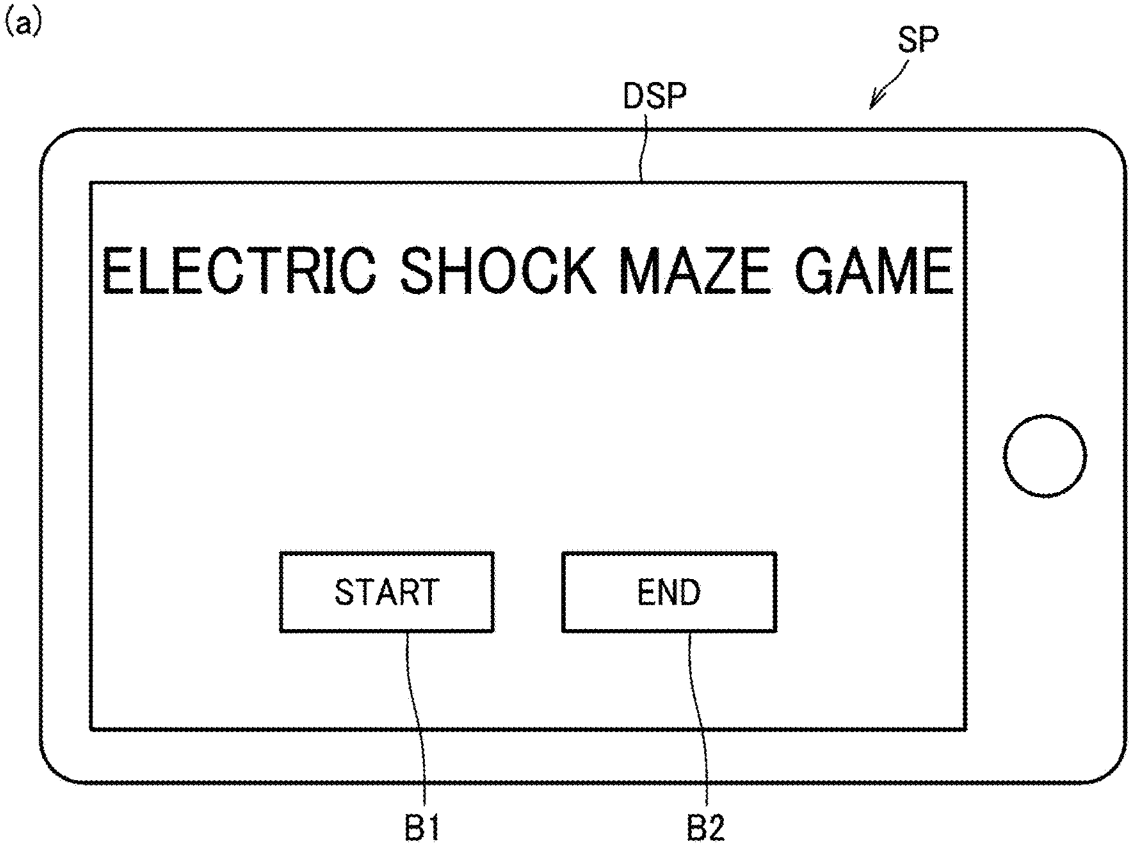
FIG. 26 includes (a) a diagram showing a start screen, and (b) a diagram showing a screen for setting a normal posture.
Figure 26:
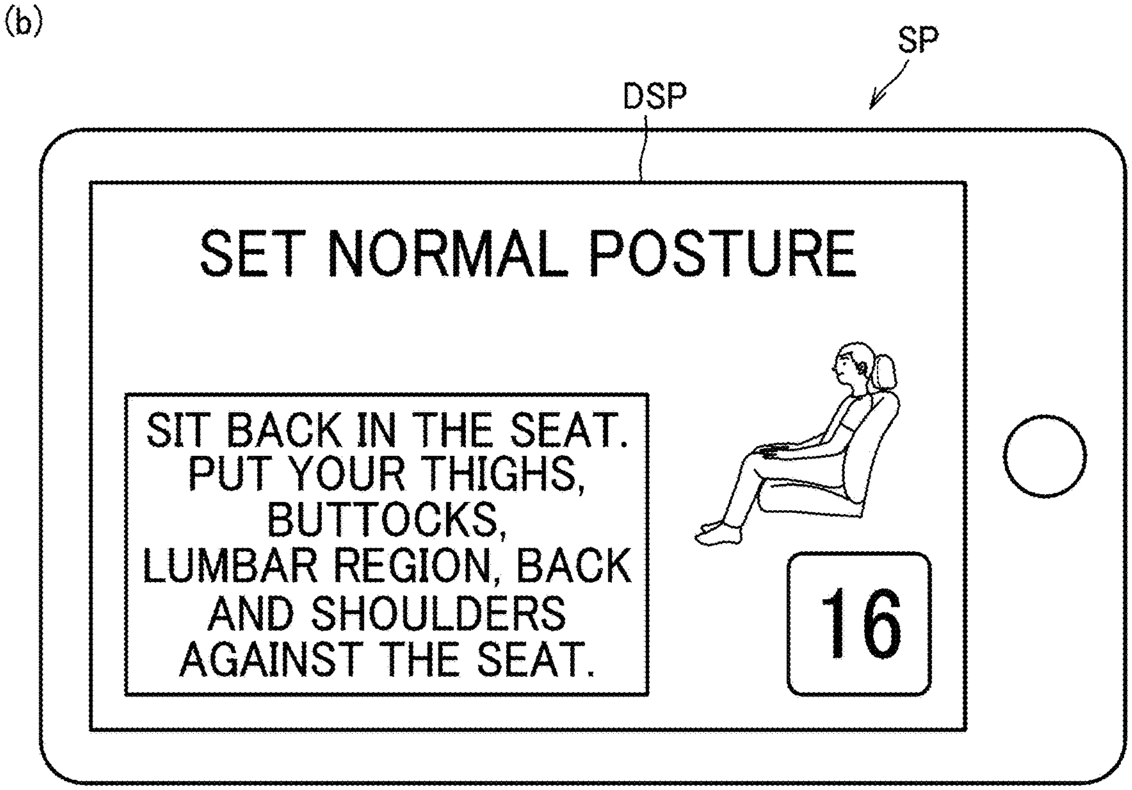

On the start screen shown in FIG. 26(*a*), a start button B1 for starting the electric shock maze game and a button B2 for ending the electric shock maze game is displayed.

After step S642, the smartphone SP determines whether or not the start button B1 has been selected (S643). If it is determined in step S643 that the start button B1 has been selected (Yes), the smartphone SP determines whether or not a flag FF, indicating whether a normal-posture setting mode for the electric shock maze game has already been executed in the past, is set to 0 (S644).

The normal-posture setting mode is a mode in which an ordinary seated posture of the occupant is set as the normal posture. In the normal-posture setting mode, the smartphone SP acquires respective values of pressure from the occupant in the normal posture, and sets the respective normal pressure values for setting the respective commands in the electric shock maze game. The smartphone SP executes the process of FIG. 24 described above based on the respective normal pressure values set in the normal-posture setting mode.

If it is determined in step S644 that FF=0 is not true (No), i.e., the normal-posture setting mode has been executed in the past, the smartphone SP skips the normal-posture setting mode (S645 to S647) and starts the electric shock maze game (S648). If it is determined in step S644 that FF=0 is true (Yes), i.e., the normal-posture setting mode has never been executed in the past, the smartphone SP starts the normal-posture setting mode (S645).

When the normal-posture setting mode is started, the smartphone SP shows the screen shown in FIG. 26(*b*) on the display DSP. In the screen of FIG. 26(*b*), a message "Sit back in the seat. Put your thighs, buttocks, lumbar region, back and shoulders against the seat." and a countdown indicator indicating the remaining time for acquiring pressure values from the respective sensors SE1 to SE4 are shown. In this embodiment, the number "16" indicating a countdown of 16 counts is shown as the countdown indicator at the start of the normal-posture setting mode.

During the countdown of 16 counts, the smartphone SP acquires pressure values from the respective sensors SE1 to SE4. To be more specific, the smartphone SP does not acquire pressure values during the first 8 counts, and acquires pressure values while counting down the remaining 8 counts. That is, the smartphone SP does not acquire pressure values for a predetermined time period after the normal-posture setting mode starts, and acquires pressure values after lapse of the predetermined time period. In this way, by not acquiring the pressure values for a predetermined time period after the normal-posture setting mode starts, it is possible to eliminate unstable pressure values which may occur, for example, when the occupant is being reseated on the seat S, so that more accurate pressure values can be acquired.

To be more specific, the smartphone SP acquires pressure values from the respective pressure sensors SE1 to SE4 at a predetermined cycle while counting down 8 counts. For example, if the smartphone SP acquires the pressure values at a cycle of 20 Hz, and 1 count is 1 second, the number of pressure values acquired from one pressure sensor will be 161.

As shown in FIG. 25, the smartphone SP sets, as each of the normal pressure values for the pressure sensors SE1 to SE4, a range of values including marginal values provided on the plus side and the minus side of an average value of the pressure values acquired from the corresponding pressure sensors SE1 to SE4 (S646).

After step S646, the smartphone SP sets the flag FF to 1 (S647) and starts the electric shock maze game (S648). In the electric shock maze game, the smartphone SP first shows a level selection screen shown in FIG. 27(*a*). The smartphone SP displaying the level selection screen responds to entry of an up command or down command set based on the pressure values, and moves the cursor CS on the screen upward or downward. The smartphone SP moves the cursor CS at a velocity in accordance with the pressure values.

The method for determining the level selected by the cursor CS may be any adoptable method. For example, when the left command or the right command is set based on the pressure values, the smartphone SP may determine the level selected by the cursor CS as the level to be used in the electric shock maze game.

After selecting the level, the smartphone SP displays the game screen shown in FIG. 27(*b*). In the game screen, the operator icon IC and the walls W as well as the life gauge LG which diminishes each time the operator icon IC contacts the wall W, etc. are shown. In the game screen, the smartphone SP sets a command based on the pressure values output from the respective sensors SE1 to SE4 and moves the operator icon IC in a direction corresponding to the command at a velocity in accordance with the pressure values.

When the electric shock maze game ends, the smartphone SP displays the start screen shown in FIG. 26(*a*). Returning to FIG. 25, after step S648, or if it is determined No in step S643, the smartphone SP determines whether or not the button B2 for ending the electric shock maze game has been selected (S649). If it is determined in step S649 that the button B2 has not been selected (No), the smartphone SP returns to the process of step S642. If it is determined in step S649 that the button B2 has been selected (Yes), the smartphone SP ends the present process.

Next, an example of a specific operation of the seat experience device 1 will be described in detail. When the occupant operates his/her smartphone SP to start the electric shock maze game while each of the devices (S, SP) configuring the seat experience system 1 is in a communicable state as shown in FIG. 23, the process of step S641: Yes→step S642 in the process shown in FIG. 25 is successively executed. As a result, the start screen shown in FIG. 26(*a*) appears on the display DSP.

If the occupant selects the start button B1, it is determined Yes in step S643 and the process proceeds to step S644. If the occupant has never performed the normal-posture setting mode in the past, it is determined Yes in step S644 and the normal-posture setting mode is executed (S645 to S647).

In the normal-posture setting mode, the screen shown in FIG. 26(*b*) is shown on the display DSP. The occupant reseats himself/herself, according to instructions on the screen, so that his/her whole body closely contacts the seat S. While the countdown indicator on the screen counts down from 16 to 0, the pressure values from the respective sensors SE1 to SE4 are acquired by the smartphone SP as the occupant keeps his/her posture.

The smartphone SP sets, based on the pressure values acquired in the normal-posture setting mode, the respective normal pressure values for setting the respective commands for the electric shock maze game. After setting the respective normal pressure values, the smartphone SP shows the level selection screen shown in FIG. 27(*a*) on the display DSP (S648).

In the level selection screen, when the occupant seated on the seat S leans his/her body forward, the cursor CS moves upward on the screen in such a manner that the larger the angle of the leaning-forward posture, the higher the velocity of the cursor CS is. When the occupant leans his/her body rearward, the cursor CS moves toward the bottom of the screen in such a manner that the larger the angle of the leaning-rearward posture, the higher the velocity of the cursor CS is. Since the moving direction and velocity of the cursor CS and the posture of the occupant match human senses, the occupant can intuitively operate the cursor SC.

After the level is selected, the smartphone SP shows the game screen shown in FIG. 27(*b*) on the display DSP. In the game screen, for example, if the occupant leans his/her body rightward, the operator icon IC moves toward the right in such a manner that the larger the angle of the leaning-rightward posture, the higher the velocity of the operator icon IC is. Similarly, if the occupant leans his/her body in another direction, the operator icon IC moves toward the direction corresponding to the direction the occupant has leaned his/her body, and the operator icon IC moves at a velocity according to the angle of the leaning posture.

In this way, the occupant can enjoy the electric shock maze game while seated on the seat S by leaning his/her body forward, rearward, leftward and rightward. Thus, for example, even an elderly person having weak legs can sufficiently move his/her body and enjoy the electric shock maze game. Since the moving direction and velocity of the operator icon IC and the posture of the occupant during the electric shock maze game match human senses, the occupant can intuitively enjoy the electric shock maze game.

According to the seat experience system SYS of the second embodiment configured as described above, the following advantageous effects can be achieved.

Since the smartphone SP changes the velocity of the operable object on the screen based on information acquired from the respective sensors SE1 to SE4, the operable object on the screen of the smartphone SP can be operated at a velocity reflecting an intention of the occupant in response to the motion of the occupant on the seat S.

Although the second embodiment has been described above, specific configurations may be modified were appropriate as will be shown in the other embodiments described below. In the following description, the same reference characters will be used for referring to configurations similar to the second embodiment and explanations thereof will be omitted.

Figure 28:
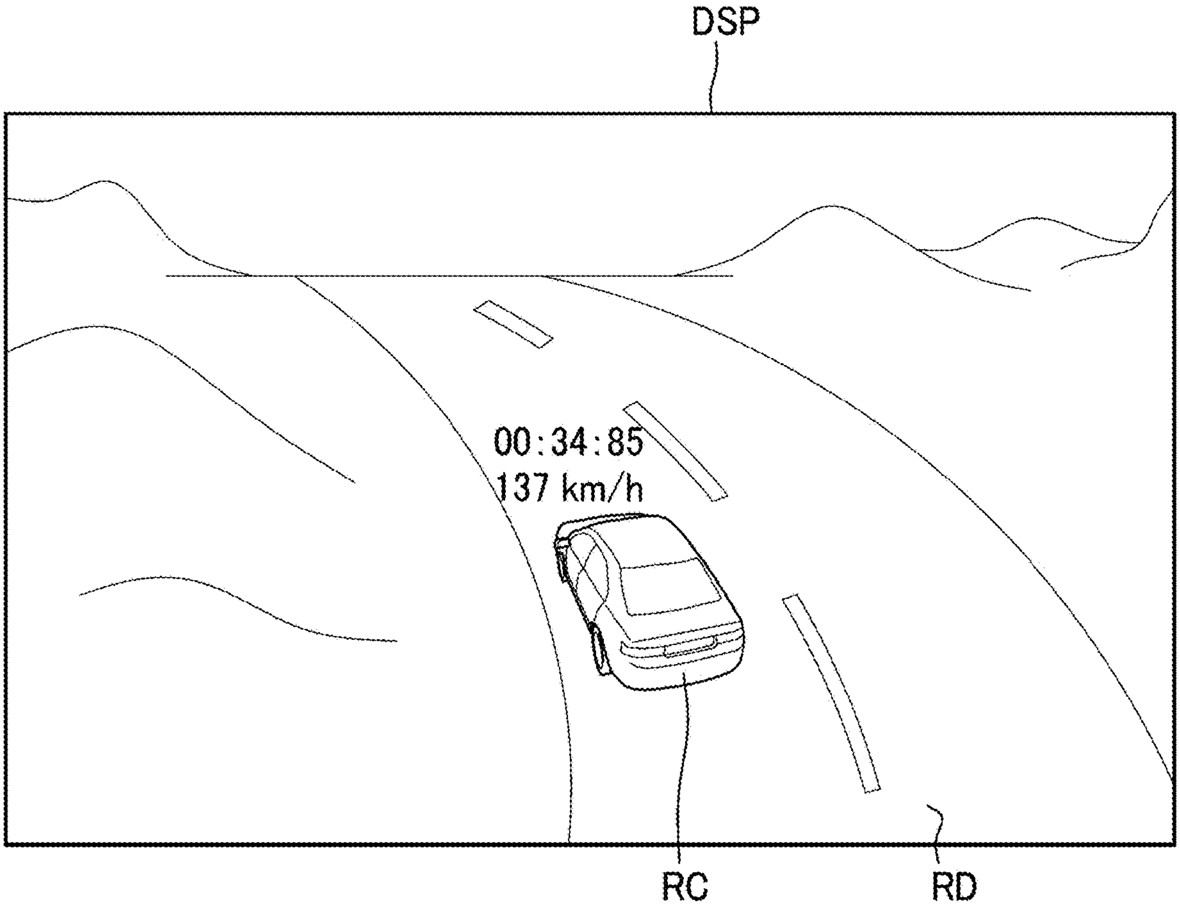
FIG. 28 is a diagram showing a screen shown during a car race game.

In the second embodiment described above, the operable object is a cursor CS or an operator icon IS of the electric shock maze game; however, the operable object may be any object. For example, as shown in FIG. 28, the operable object may be a racing car RC in a car race game.

The racing car RC is an example of a moving object that moves against a background displayed on the screen. In the car race game, the racing car RC moves forward on the road RD, as the background including the road RD automatically rolls to the rear of the racing car RC. The racing car RC can take a turning-rightward or turning-leftward attitude in response to an operation of the occupant, and thus the racing car RC can run along a curved road RD.

In the car race game as described above, the right-side pressure sensor 23R, among the plurality of pressure sensors 21 to 26, which receives the weight from the right leg of the occupant may be used as the fifth pressure sensor SE5 corresponding to the accelerator of the racing car RC. The left-side pressure sensor 23R which receives the weight from the left leg of the occupant may be used as the sixth pressure sensor SE6 corresponding to the brake of the racing car RC. The sensors used for turning the racing car RC rightward and leftward may be the left-side back sensors SE2 and the right-side back sensors SE4 similar to the above-described embodiment.

Figure 29:
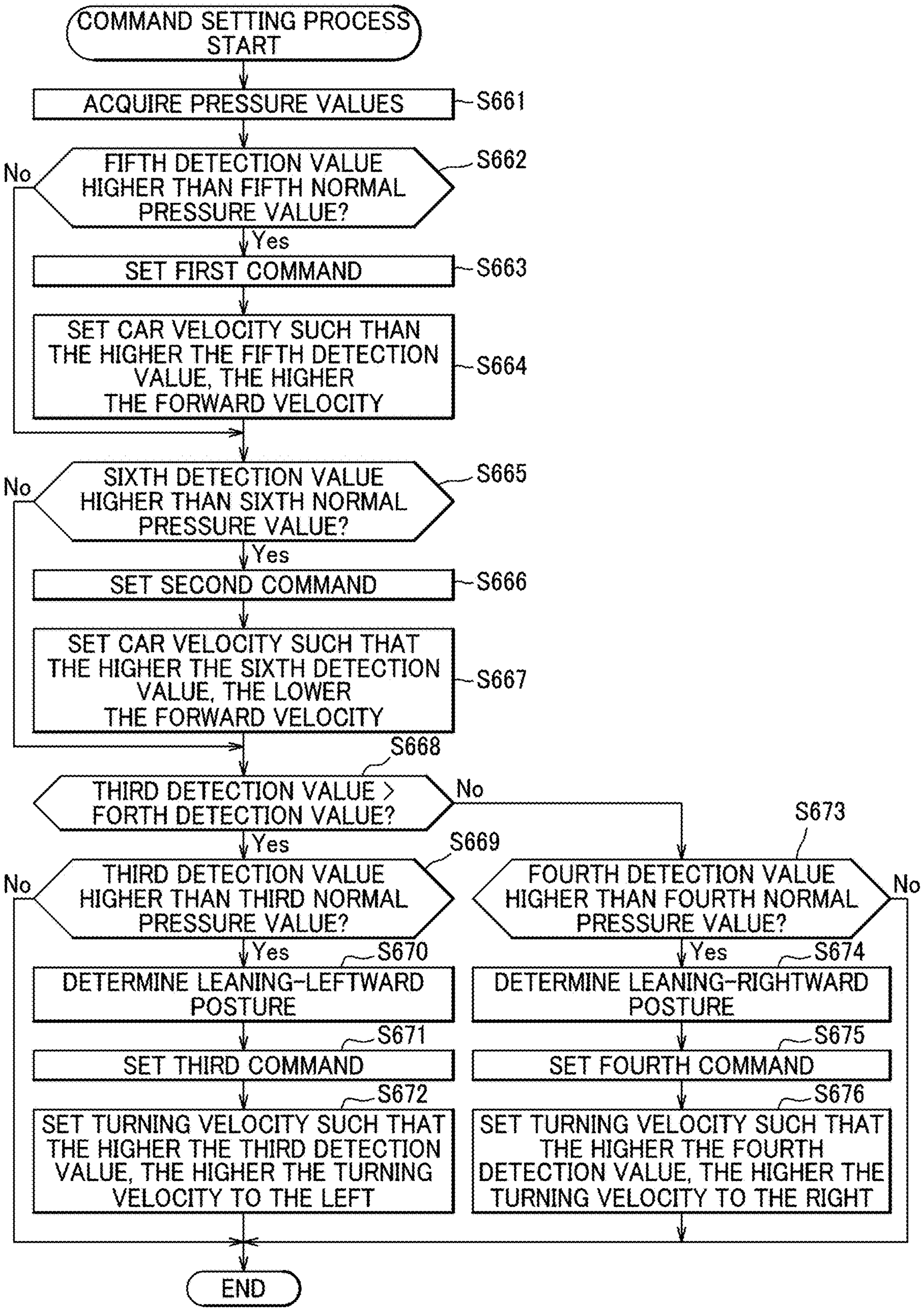
FIG. 29 is a flowchart showing a modified example of the command setting process.

In this embodiment, in the car race game, the smartphone SP executes a command setting process shown in FIG. 29. The process of the smartphone SP at startup of the car race game is similar to that shown in FIG. 25, except that step S648 is replaced by a step for executing the car race game.

In the command setting process, the smartphone SP first acquires pressure values from each of the sensors SE3 to SE6 (S661). After step S661, the smartphone SP determines whether or not a fifth detection value detected by the fifth pressures sensor SE5 is higher than a fifth normal pressure value (S662). The fifth normal pressure value and a sixth normal pressure value described later may be set the same way as the third normal pressure value was set.

If it is determined in step S662 that the fifth detection value is higher than the fifth normal pressure value (Yes), the smartphone SP sets a first command for moving the racing car RC relatively forward on the road RD (S663). After step S663, the smart phone SP sets the velocity of the racing car RC in such a manner that the higher the fifth detection value, the higher the velocity of forward movement of the racing car is (S664).

After step S664, or if it is determined No in step S662, the smartphone SP determines whether or not the sixth detection value detected by the sixth pressure sensor SE6 is higher than the sixth normal pressure value (S665). If it is determined in step S665 that the sixth detection value is higher than the sixth normal pressure value (Yes), the smartphone SP sets a second command for applying a brake to the racing car RC (S666). After step S666, the smartphone SP sets the velocity of the racing car RC in such a manner that the higher the sixth detection value, the lower the velocity of forward movement of the racing car is (S667).

If the fifth detection value and sixth detection value are both higher than corresponding normal pressure values, the smart phone SP sets the velocity in accordance with the magnitudes of the fifth detection value and the sixth detection value. For example, the smartphone SP sets the velocity of forward movement of the racing car RC as obtained by subtracting the velocity corresponding to the sixth detection value from the velocity corresponding to the fifth detection value.

After step S667, the smartphone SP determines whether or not the third detection value detected by the left-side back sensors SE3 is higher than the fourth detection value detected by the right-side back sensors SE4 (S668). If it is determined in step S668 that the third detection value is higher than the fourth detection value (Yes), the smartphone SP determines whether or not the third detection value is higher than the third normal pressure value (S669).

If it is determined in step S669 that the third detection value is higher than the third normal pressure value (Yes), the smartphone SP determines that the posture of the occupant is the leaning-leftward posture (S670), and sets the third command for causing the racing car RC to turn left (S671).

After step S671, the smartphone SP sets the velocity of the turn (turning velocity) in such a manner that the higher the third detection value, the higher the turning velocity toward the left is (S672). After step 672, or if it is determined No in step S669, the smartphone SP ends the present process.

If it is determined in step S668 that the third detection value is not higher than the fourth detection value (No), the smartphone SP determines whether or not the fourth detection value is higher than the fourth normal pressure value (S673). If it is determined in step S673 that the fourth detection value is higher than the fourth normal pressure value (Yes), the smartphone SP determines that the posture of the occupant is the leaning-rightward posture (S674), and sets the fourth command for causing the racing car RC to turn right (S674).

After step S675, the smartphone SP sets the velocity of the turn in such a manner that the higher the fourth detection value, the higher the turning velocity toward the right is (S676). After step S676, or if it is determined No in step S673, the smartphone SP ends the present process.

Also in this embodiment, since the operation of the accelerator, the brake and turning of the racing car RC, and the posture of the occupant match human senses, the occupant can intuitively enjoy the car race game.

Determination of the posture of the occupant and setting of the velocity of the object using the pressure values acquired from the plurality of pressure sensors 21 to 26 provided at the seat S, is not limited to the methods of the embodiments described above. For example, if the fourth lower pressure value is acquired from the right-side back sensors SE4, the smartphone SP may determine that the posture of the occupant is the leaning-leftward posture, and set the velocity of the operable object in such a manner that the lower the fourth lower pressure value acquired when the leaning-leftward posture is determined, the higher the (moving or turning) velocity of the operable object toward the left is (S676). If the third lower pressure value is acquired from the left-side back sensors SE3, the smartphone SP may determine that the posture of the occupant is the leaning-rightward posture, and set the velocity of the operable object in such a manner that the lower the third lower pressure value acquired when the leaning-right posture is determined, the higher the (moving or turning) velocity of the operable object toward the right is.

If the second lower pressure value is acquired from the rearward cushion sensors SE2, the smartphone SP may determine that the posture of the occupant is the leaning-forward posture, and set the velocity of the operable object in such a manner that the lower the second lower pressure value acquired when the leaning-forward posture is determined, the higher the velocity of upward movement of the operable object on the screen is. Further, if the first lower pressure value is acquired from the forward cushion sensors SE1, the smartphone SP may determine that the posture of the occupant is the leaning-rearward posture, and set the velocity of the operable object in such a manner that the lower the first lower pressure value acquired when the leaning-rearward posture is determined, the higher the velocity of downward movement of the operable object on the screen is.

The leaning-forward and leaning-rearward postures and the leaning-leftward and leaning-rightward postures may be determined based on the pressure value from one sensor. For example, the leaning-forward posture may be determined if the first higher pressure value is acquired from the forward cushion sensors SE1, the leaning-rearward posture may be determined if the first lower pressure value is acquired from the forward cushion sensors SE1. Even in this case, the velocity of the operable object may be set in such a manner that the higher the first higher pressure value acquired when the leaning-forward posture is determined, the higher the velocity of upward movement of the operable object on the screen is, and the lower the first lower pressure value acquired when the leaning-rearward posture is determined, the higher the velocity of downward movement of the operable object on the screen is.

The first pressure sensor, the second pressure sensor, the third pressure sensor, and the fourth pressure sensor are not limited to those in the embodiments described above. For example, the sensors provided at the seat back S2 may be the second pressure sensor, and the pressure sensors provided at the seat cushion S1 may be the third pressure sensor or the fourth pressure sensor.

In the above-described embodiment, pressure sensors 21 to 26 are provided as an example of sensor; however the sensor may be, for example, an optical sensor, a capacitive sensor, a sensor that detects the volume of sounds, etc. For example, if an optical sensor or a capacitive sensor is used, the velocity of the operable object may be set according to the distance between the sensor and the body of the occupant, and if a sensor that detects the volume of sounds is used, the velocity of the operable object may be set, for example, according to the volume of the detected sound.

The sensor may be provided at the left and right side portions of the seat cushion or the seat back (the portions protruding from the seat surfaces), the headrest, the armrest, or parts provided near the seat (instrument panel, door, or floor), etc.

Next, a third embodiment of the seat experience system will be described in detail referring mainly to FIG. 23, and FIG. 30 to FIG. 35.

The seat experience system 1 of the present embodiment comprises, similar to the second embodiment shown in FIG. 23, a seat S, and a smartphone SP as an example of a terminal. The seat S comprises a control unit 100 as an example of a controller.

The seat S comprises a seat body S10, and pressure sensors 21 to 26. Since the configuration and arrangement of the seat body S10 and the pressure sensors 21 to 26 are similar to the second embodiment, a detailed description thereof will be omitted.

In this embodiment, the seat experience system 1 provides a dance game using the pressure sensors 21 to 26. In this embodiment, the sensors 21 to 26 are examples of a sensor for acquiring measurement values for detecting a motion of an occupant seated on the seat body S10. The dance game is a game in which the occupant seated on the seat body S10 moves according to instructions provided by an arrow icon shown on a display DSP which is a screen of the smartphone SP to cause a character on the display DSP to dance.

The seat body S10 comprises a holder 4 for holding the smartphone SP. The holder 4 is formed by bending a wire, with one end fixed to a seat back S2 and the other end having a holding portion 4A for holding the smartphone SP. By fixing the smartphone SP on the holding portion 4A, the occupant can view the display DSP of the smartphone SP without holding the smartphone SP in his/her hand. Accordingly, the occupant can perform the motion instructed in the dance game using his/her whole body while viewing the display DSP.

The seat experience system SYS of the present embodiment comprises the seat S, the control unit 100 and the smartphone SP. The hardware configurations of the control unit 100 and the smartphone SP are similar to the second embodiment. In the present embodiment, the smartphone SP operates according to a program and thereby functions as a means for executing the dance game.

Similar to the second embodiment, the control unit 100 of the present embodiment has a function of acquiring measurement values (information for detecting the motion of the occupant seated on the seat body S10) from the respective pressure sensors 21 to 26. In this embodiment, the control unit 100 also has a function of causing, based on the measurement values acquired from the respective pressure sensors 21 to 26, an operable object to move on the display DSP of the smartphone SP. To be more specific, the control unit 100 sets, based on the information acquired from the respective pressure sensors 21 to 26, a command for moving the operable object, and outputs the set command to the smartphone SP to cause the operable object on the display DSP of the smartphone SP to move.

Specifically, in the present embodiment, it is not the smartphone SP but the control unit 100 that can make a determination based on the measurement values of the respective sensors 21 to 26, as to whether the posture of the occupant is a leaning-forward posture in which a weight of the occupant is placed further forward than the weight of the occupant assuming a normal posture, or a leaning-rearward posture in which the weight of the occupant is placed further rearward than the weight of the occupant in the normal posture. Similarly, in the present embodiment, it is not the smartphone SP but the control unit 100 that can make a determination based on the measurement values of the respective sensors 21 to 26, as to whether the posture assumed by the occupant is a leaning-leftward posture in which a weight of the occupant is placed further leftward than the weight of the occupant in the normal posture, or a leaning-rightward posture in which the weight of the occupant is placed further rightward than the weight of the occupant in the normal posture.

If it is determined that the posture is the leaning-forward posture, the control unit 100 sets a first command, and if it is determined that the posture is the leaning-rearward posture, the control unit 100 sets a second command. Further, if it is determined that the posture is the leaning-leftward posture, the control unit 100 sets the third command, and if it is determined that the posture is the leaning-rightward posture, the control unit 100 sets a fourth command.

Since the determination of the posture (leaning-forward, leaning-rearward, leaning-rightward, or leaning-leftward posture) of the occupant based on the measurement values of the respective pressure sensors 21 to 26, and the setting of commands (first command, second command, third command, and fourth command) based on the determination of the posture of the occupant, made by the control unit 100, is the same as the determination and setting made by the smartphone SP in the second embodiment described above, a description thereof will be omitted to avoid repetition.

In the present embodiment, similar to the second embodiment described above, the first normal pressure value and the second normal pressure value of the forward cushion sensors SE1 and the rearward cushion sensors SE2, used for determination by the control unit 200, are each provided as a certain range of values. To be more specific, in a setting process of the normal posture, i.e., calibration, during the dance game which will be described later, normal ranges of values for the first normal pressure value and the second normal pressure value are set as ranges of values including marginal values provided on the plus side and the minus side of values respectively output from the forward cushion sensors SE1 and the rearward cushion sensors SE1. The first higher pressure value and the second higher pressure value are values higher than the normal ranges, and the first lower pressure value and the second lower pressure value are values lower than the normal ranges. The same can be said for the other normal pressure values, higher pressure values, and lower pressure values described later.

Each command is an instruction for moving the operable object in the dance game played on the display DSP of the smartphone SP. Specifically, the first command indicates that an operation to move the operable object upward on the display DSP has been performed. The second command indicates that an operation to move the operable object downward on the display DSP has been performed. The third command indicates that an operation to move the operable object toward the left on the display DSP has been performed. The fourth command indicates that an operation to move the operable object toward the right on the display DSP has been performed. In the following description, the first command is also referred to as “up command”, the second command is also referred to as “down command”, the third command is also referred to as “left command”, and the fourth command is also referred to as “right command”.

The smartphone SP has a function of executing a dance game based on commands received from the control unit 100. To be more specific, the smartphone SP has a function of responding to a command received from the control unit 100 and moving the operable object on the display DSP based on the received command. The operable object in the dance game is, on the screen shown in FIG. 33(*a*) for selecting music (a tune) for the dance game, a cursor CS, and on the screen of FIG. 33(*b*) shown during execution of the dance game (also referred to as “game screen” in the following description), arrow icons IC1, IC2, IC3, IC4 that move from below upward.

The smartphone SP displaying the screen for selecting music responds to the down command received from the seat S to move the cursor CS downward on the screen; and responds to the up command received from the seat S to move the cursor CS upward on the screen.

In the game screen, four target icons T1, T2, T3, T4 corresponding to the four arrow icons IC1 to IC4 are shown. During execution of the dance game, when a specific arrow icon (for example, IC2) among the arrow icons IC1 to IC4 moves to a position overlapping a corresponding target icon (for example, T2), the smartphone SP responds to a command corresponding to the specific arrow icon (for example, the down command) received and changes the specific arrow icon. The change of the specific arrow icon, for example, includes changing the color or shape of the specific arrow icon as well as causing the specific arrow icon to disappear from the screen. In this embodiment, the change is causing the specific arrow icon to disappear from the screen.

Next, the operation of the control unit 100 and the smartphone SP will be explained in detail. The control unit 100 repeatedly executes a process shown in FIG. 30 at all times.

Figure 30:
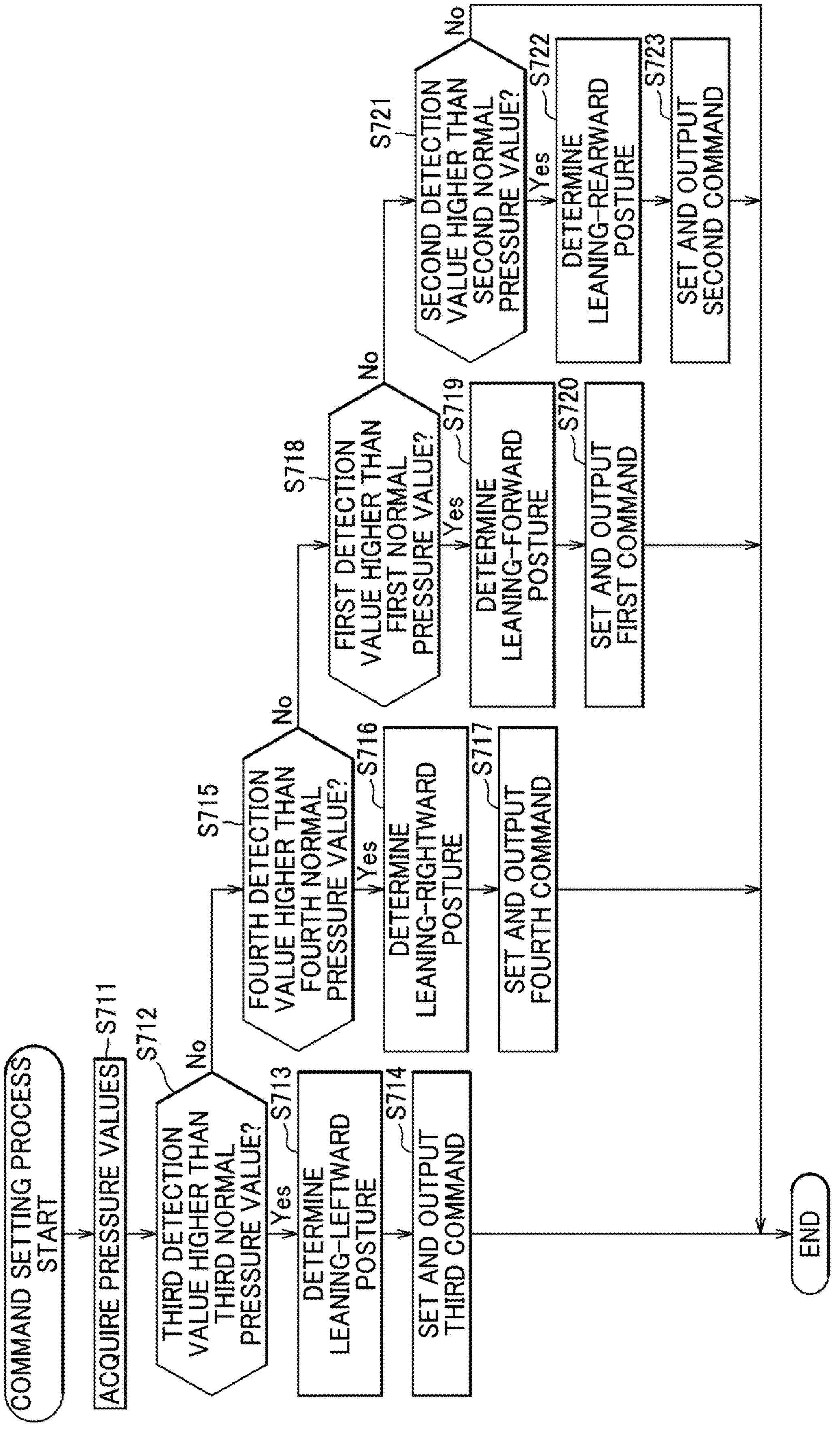
FIG. 30 is a flowchart showing a process of the control unit of the seat experience system according to a third embodiment.

As shown in FIG. 30, the control unit 100 acquires pressure values from the respective sensors SE1 to SE4 (S711). After step 711, the control unit 100 determines whether or not the third detection value acquired from the left-side back sensors SE3 is higher than the third normal pressure value, i.e., is the third higher pressure value (S712).

In step S712, if it is determined that the third detection value is higher than the third normal pressure value (Yes), the control unit 100 determines that the posture of the occupant is the leaning-leftward posture (S713). After step S713, the control unit 100 sets the left command as the third command, outputs the set left command to the smartphone SP (S714), and ends the present process.

If it is determined in step S712 that the third detection value is not higher than the third normal pressure value (No), the control unit 100 determines whether or not the fourth detection value acquired from the right-side back sensors SE4 is higher than the fourth normal pressure value, i.e., is the fourth higher pressure value (S715).

If it is determined in step S715 that the fourth detection value is higher than the fourth normal pressure value (Yes), the control unit 100 determines that the posture of the occupant is the leaning-rightward posture (S716). After step S716, the control unit 100 sets the right command as the fourth command, outputs the set right command to the smartphone SP (S717), and ends the present process.

If it is determined in step S715 that the fourth detection value is not higher than the fourth normal pressure value (No), the control unit 100 determines whether or not the first detection value acquired from the front cushion sensors SE1 is higher than the first normal pressure value, i.e., is the first higher pressure value (S718).

If it is determined in step S718 that the first detection value is higher than the first normal pressure value (Yes), the control unit 100 determines that the posture of the occupant is the leaning-forward posture (S719). After step S719, the control unit 100 sets the up command as the first command, outputs the set up command to the smartphone SP (S720), and ends the present process.

If it is determined in step S718 that the first detection value is not higher than the first normal pressure value (No), the control unit 100 determines whether or not the second detection value acquired from the rearward cushion sensors SE2 is higher than the second normal pressure value, i.e., is the second higher pressure value (S721).

If it is determined in step S721 that the second detection value is higher than the second normal pressure value (Yes), the control unit 100 determines that the posture of the occupant is the leaning-rearward posture (S722). After step S722, the control unit 100 sets the down command as the second command, outputs the set down command to the smartphone SP (S723), and ends the present process. If it is determined in step S721 that the second detection value is not higher than the second normal pressure value (No), the control unit 100 ends the present process without proceeding further.

Figure 31:
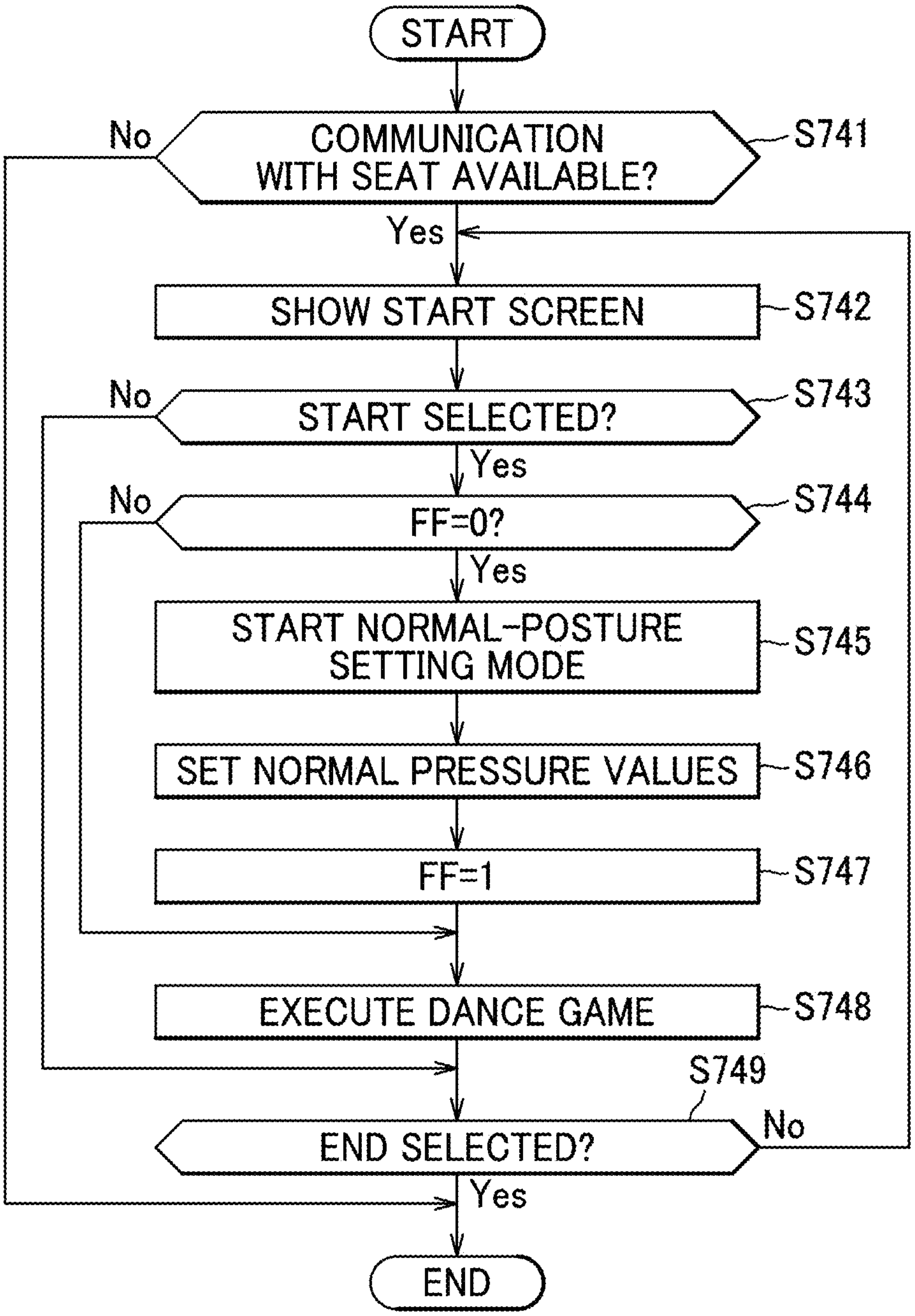
FIG. 31 is a flowchart showing a process of the smartphone.

When the occupant starts up the application (app) for playing the dance game, the smartphone SP starts the process shown in FIG. 31 (START). In this process, the smartphone SP first determines whether or not communication with the seat S is available (S741).

If it is determined in step S741 that communication is not available (No), the smartphone SP ends the present process. If it is determined in step S741 that communication is available (Yes), the smartphone SP shows the start screen (see FIG. 32(*a*)) for the dance game on the display DSP (S742).

Figure 32:
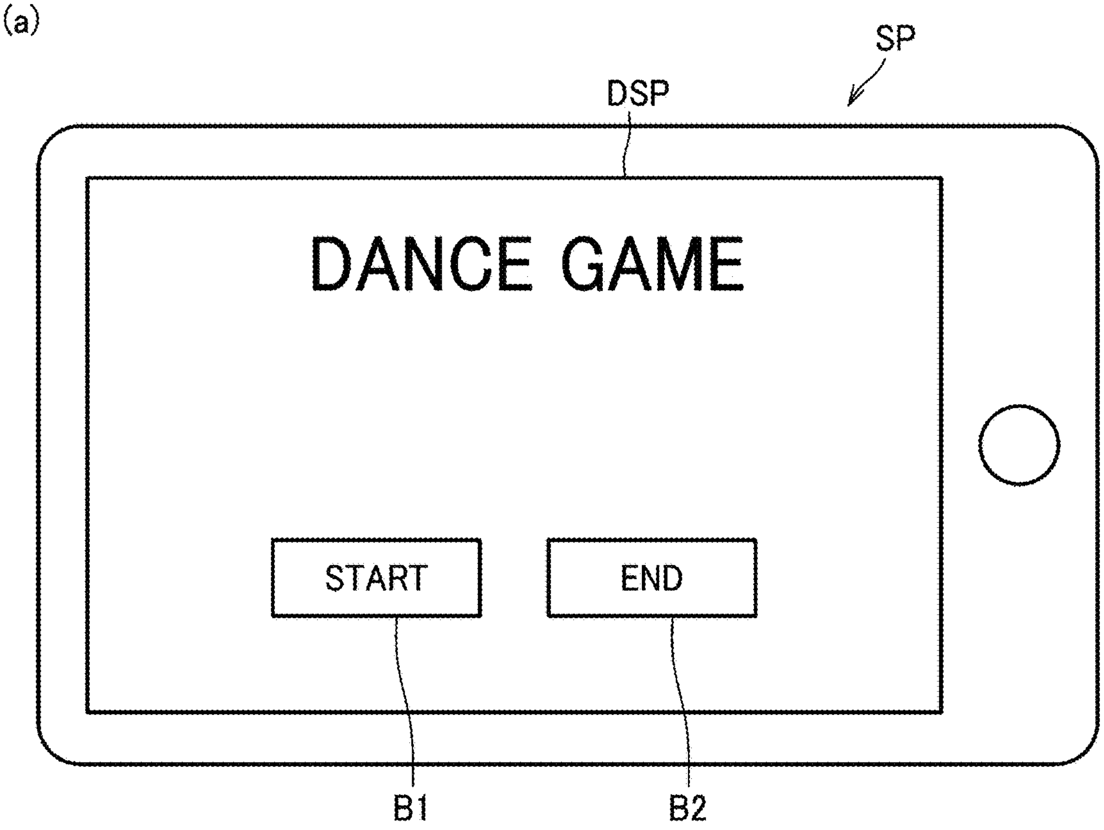
FIG. 32 includes (a) a diagram showing a start screen, and (b) a diagram showing a screen for setting the normal posture.
Figure 32:
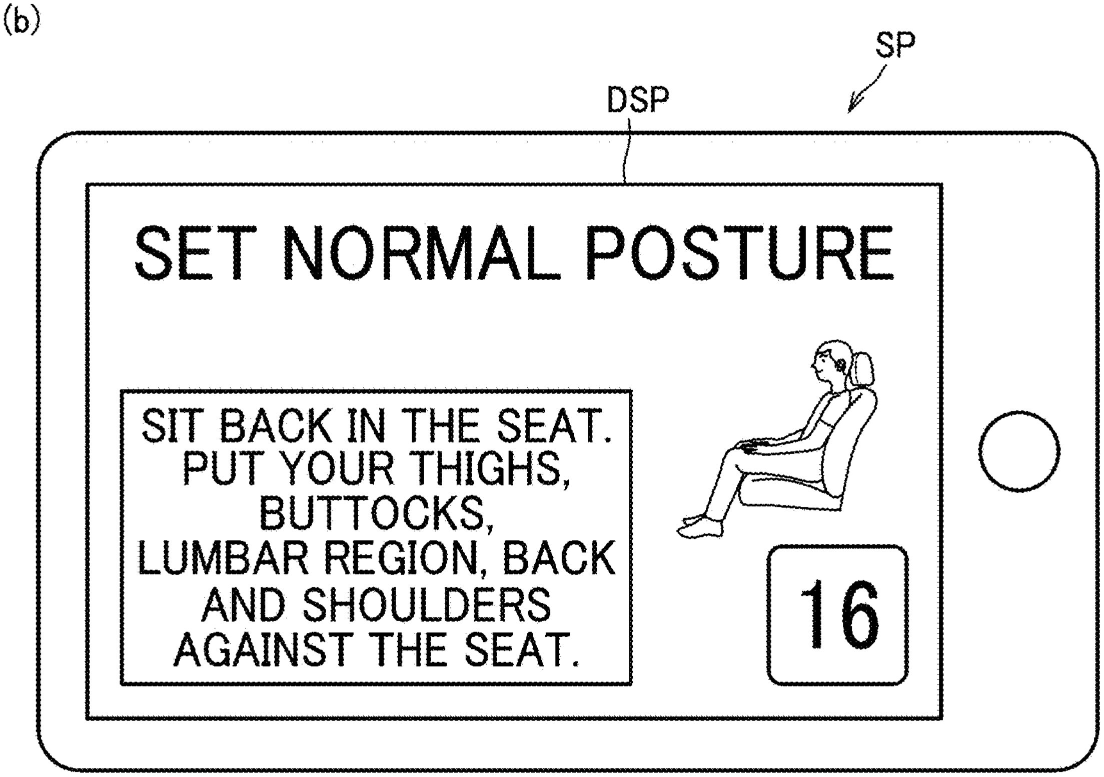

On the start screen shown in FIG. 32(*a*), a start button B1 for starting the dance game and a button B2 for ending the dance game are shown.

After step S742, the smartphone SP determines whether or not the start button B1 has been selected (S743). If it is determined in step S743 that the start button B1 has been selected (Yes), the smartphone SP determines whether or not a flag FF, indicating that a normal-posture setting mode for the dance game has already been executed in the past, is set to 0 (S744).

The normal-posture setting mode is a mode in which an ordinary seated posture of the occupant is set as the normal posture. In the normal-posture setting mode, the smartphone SP acquires from the control unit 100 respective values of pressure from the occupant in the normal posture, and sets, from the respective values of pressure, the respective normal pressure values for setting the corresponding commands in the dance game. The smartphone SP outputs the set normal pressure values to the control unit 100. The control unit 100 executes, based on the respective normal pressure values received from the smartphone SP, the process shown in FIG. 30 described above.

If it is determined in step S744 that FF=0 is not true (No), i.e., if the normal-posture setting mode has been executed in the past, the smartphone SP skips the normal-posture setting mode (S745 to S747) and starts the dance game (S748). If it is determined in step S744 that FF=0 is true (Yes), i.e., if the normal-posture setting mode has never been executed in the past, the smartphone SP starts the normal-posture setting mode (S745).

When the normal-posture setting mode is started, the smartphone SP shows on the display DSP, the screen shown in FIG. 32(*b*). In the screen of FIG. 32(*b*), a message "Sit back in the seat. Put your thighs, buttocks, lumbar region, back and shoulders against the seat." and a countdown indicator indicating the remaining time for acquiring pressure values from the respective sensors SE1 to SE4 are shown. In this embodiment, the number "16" indicating a countdown of 16 counts is shown as the countdown indicator at the start of the normal-posture setting mode.

During the countdown of 16 counts, the smartphone SP acquires pressure values from the respective sensors SE1 to SE4. To be more specific, the smartphone SP does not acquire pressure values during the first 8 counts, and acquires pressure values while counting down the remaining 8 counts. That is, the smartphone SP does not acquire pressure values for a predetermined time period after the normal-posture setting mode starts, and acquires pressure values after lapse of the predetermined time period. In this way, by not acquiring the pressure values for a predetermined time period after the normal-posture setting mode starts, it is possible to eliminate unstable pressure values which may occur, for example, when the occupant is being reseated on the seat S, so that more accurate pressure values can be acquired.

To be more specific, the smartphone SP acquires pressure values from the respective pressure sensors SE1 to SE4 at a predetermined cycle while counting down 8 counts. For example, if the smartphone SP acquires the pressure values at a cycle of 20 Hz, and 1 count is 1 second, the number of pressure values acquired from one pressure sensor will be 161.

As shown in FIG. 31, the smartphone SP sets, as each of the normal pressure values for the pressure sensors SE1 to SE4, a range of values including marginal values provided on the plus side and the minus side of an average value of the pressure values acquired from the corresponding pressure sensors SE1 to SE4 (S746).

After step S746, the smartphone SP sets the flag FF to 1 (S747) and starts the dance game (S748). In the dance game, the smartphone SP first displays the music selection screen shown in FIG. 33(*a*). The smartphone SP displaying the music selection screen responds to the up command or the down command received from the control unit 100 and moves the cursor CS upward or downward on the screen.

The method for determining the music selected by the cursor CS may be any method. For example, when the left command or the right command is received from the control unit 100, the smartphone SP may determine that the music selected by the cursor CS is the music to be used in the dance game.

Figure 33:
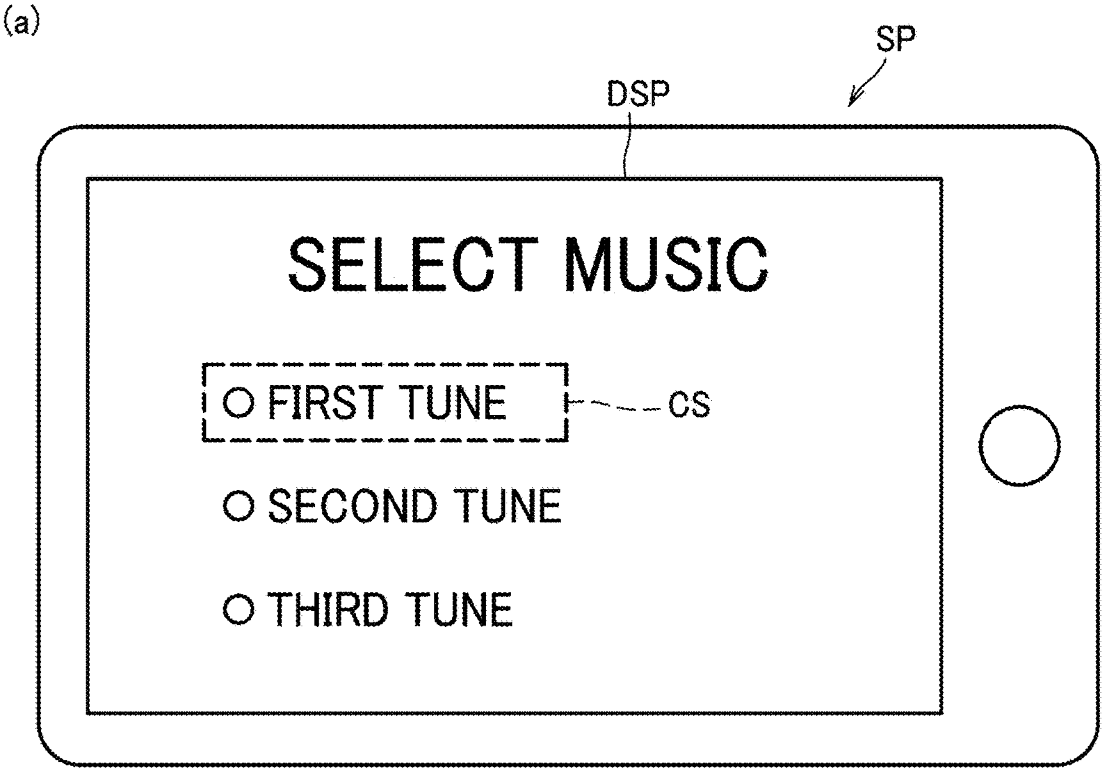
FIG. 33 includes (a) a diagram showing a screen for selecting music, and (b) a diagram showing a screen shown during a dance game.
Figure 33:
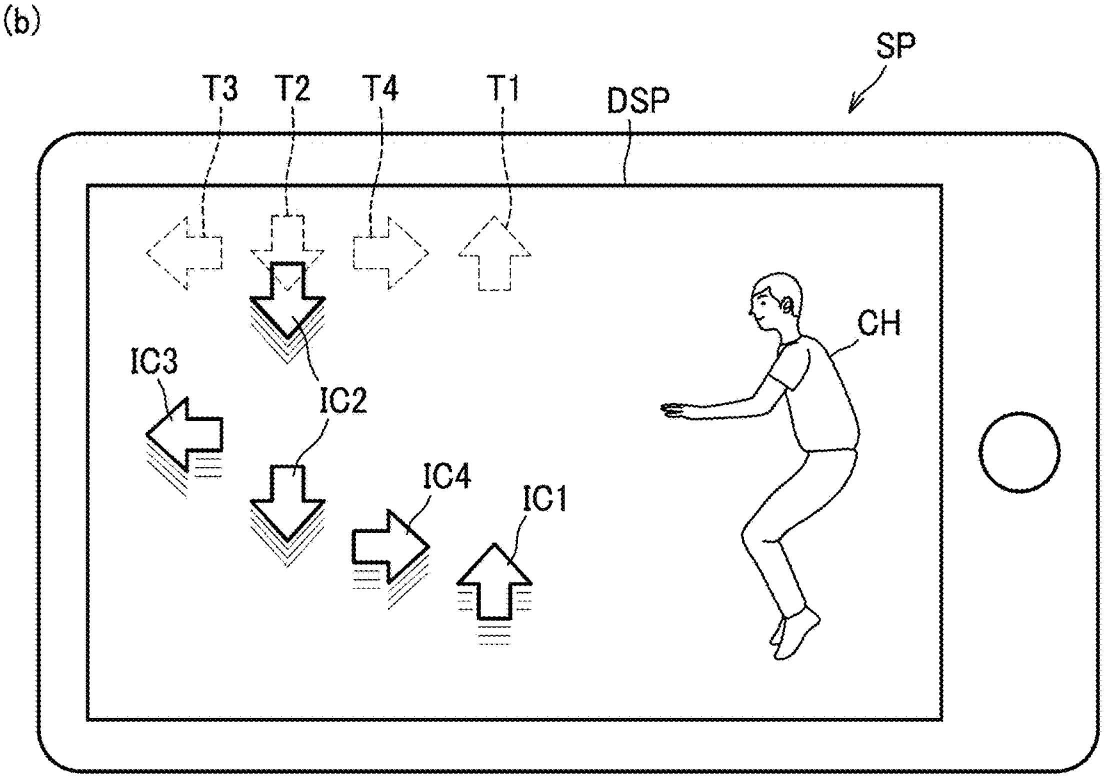

After selecting the music, the smartphone SP displays the game screen shown in FIG. 33(*b*). In the game screen, the selected music is played, and the target icons T1 to T4 and the arrow icons IC1 to IC4 described above as well as a character CH which dances to the music are shown. In the game screen, the smartphone SP causes the arrow icon to disappear or not to disappear, according to the point in time a command output from the control unit 100 is received and the point in time the arrow icon overlaps the target icon.

Specifically, if the direction of operation indicated by the command (for example, right) from the control unit 100 and the pointing direction (for example, right) of the overlapping target icon and arrow icon match, the smartphone SP causes the arrow icon to disappear from the screen. If the direction of operation indicated by the command (for example, right) from the control unit 100 and the pointing direction (for example, right) of the overlapping target icon and arrow icon do not match, the smartphone SP does not cause the arrow icon to disappear and moves the arrow icon past the target icon without causing it to disappear.

When the arrow icon is caused to disappear from the screen, the smartphone SP shows on the screen, according to the degree of overlapping of the arrow icon and target icon upon receipt of a command output from the control unit 100, an evaluation value for evaluating the operation of the occupant by a message such as "Bad", "Good", "Great", or "Excellent". The evaluation value shown on the smartphone SP is such that the larger the degree of overlapping of the arrow icon on the target icon, the better the evaluation value is.

When the dance game ends, the smartphone SP displays the start screen shown in FIG. 32(*a*). Returning to FIG. 31, after step S748, or if it is determined No in step S743, the smartphone SP determines whether or not the button B2 for ending the dance game has been selected (S749). If it is determined in step S749 that the button B2 has not been selected (No), the smartphone SP returns to the process of step S742. If it is determined in step S749 that the button B2 has been selected (Yes), the smartphone SP ends the present process.

Next, an example of a specific operation of the seat experience device 1 will be described in detail. When the occupant operates his/her smartphone SP to start up the dance game while each of the devices (S, SP) making up the seat experience system 1 are able to communicate with each other, in the process shown in FIG. 31, the process of step S741: Yes→step S742 is successively executed. As a result, the start screen shown in FIG. 32(*a*) is shown on the display DSP.

If the occupant selects the start button B1, it is determined Yes in step S743 and the process proceeds to step S744. If the occupant has never performed the normal-posture setting mode in the past, it is determined Yes in step S744 and the normal-posture setting mode is executed (S745 to S747).

In the normal-posture setting mode, the screen shown in FIG. 32(*b*) is shown on the display DSP. The occupant reseats himself/herself, according to instructions on the screen, so that his/her whole body closely contacts the seat S. While the countdown indicator on the screen counts down from 16 to 0, the pressure values from the respective sensors SE1 to SE4 are acquired from the smartphone SP as the occupant keeps his/her posture.

The smartphone SP sets, based on the pressure values acquired in the normal-posture setting mode, the respective normal pressure values for setting the corresponding commands for the dance game, and transmits the respective normal pressure values to the control unit 100. After transmitting the respective normal pressure values, the smartphone SP shows the music selection screen shown in FIG. 33(*a*) on the display (S748).

In the music selection screen, when the occupant seated on the seat S leans his/her body forward, the cursor CS moves upward on the screen, and when the occupant leans his/her body rearward, the cursor CS moves downward on the screen. Since the moving direction of the cursor CS and the posture of the occupant match human senses, the occupant can intuitively operate the cursor SC.

After the music is selected, the smartphone SP shows the game screen shown in FIG. 33(*b*) on the display DSP. In the game screen, the smartphone SP plays the music selected by the occupant, and moves the arrow icons IC1 to IC4 from below upward on the screen in a sequence according to the music.

In the game screen, for example, when the pointing-down arrow icon IC2 moves to a position overlapping the target icon T2, the occupant leans his/her body rearward on the seat S. As a result, a down command is output from the control unit 100.

At a point in time the smartphone SP receives the down command from the control unit 100, if the pointing-down arrow icon IC2 is overlapping the pointing-down target icon T2, the smartphone SP causes the arrow icon IC2 to disappear, and shows an evaluation value according to the degree of overlapping of the arrow icon IC2 and the target icon T2.

In this way, the occupant can enjoy the dance game while seated on the seat S by leaning his/her body forward, rearward, leftward and rightward at the point in time the arrow icon overlaps the target icon T2. Thus, for example, even an elderly person having weak legs can sufficiently move his/her body and enjoy the dance game. Since the direction of the arrow icons IC1 to IC4 and the posture of the occupant during the dance game match human senses, the occupant can intuitively enjoy the dance game.

According to the seat experience system SYS of the third embodiment configured as described above, the following advantageous effects can be achieved.

Since the control unit 100 moves the operable object on the screen by outputting a command based on information acquired from the respective sensors SE1 to SE4, the operable object on the screen of the smartphone SP can be operated by the seat in response to the motion of the occupant on the seat S.

Since the command is set by a control unit 100 provided at the seat S10, the process of changing the pressure values from the respective sensors to commands does not have to be performed by the smartphone SP. Therefore, the processing speed of the smartphone can be made faster, and a controller apart from the seat can be used in combination with the seat S in the dance game.

Although the third embodiment has been described above, specific configurations may be modified were appropriate as will be shown in the other embodiments described below. In the following description, the same reference characters will be used for referring to configurations similar to the above-described embodiment and explanations thereof will be omitted.

Figure 34:
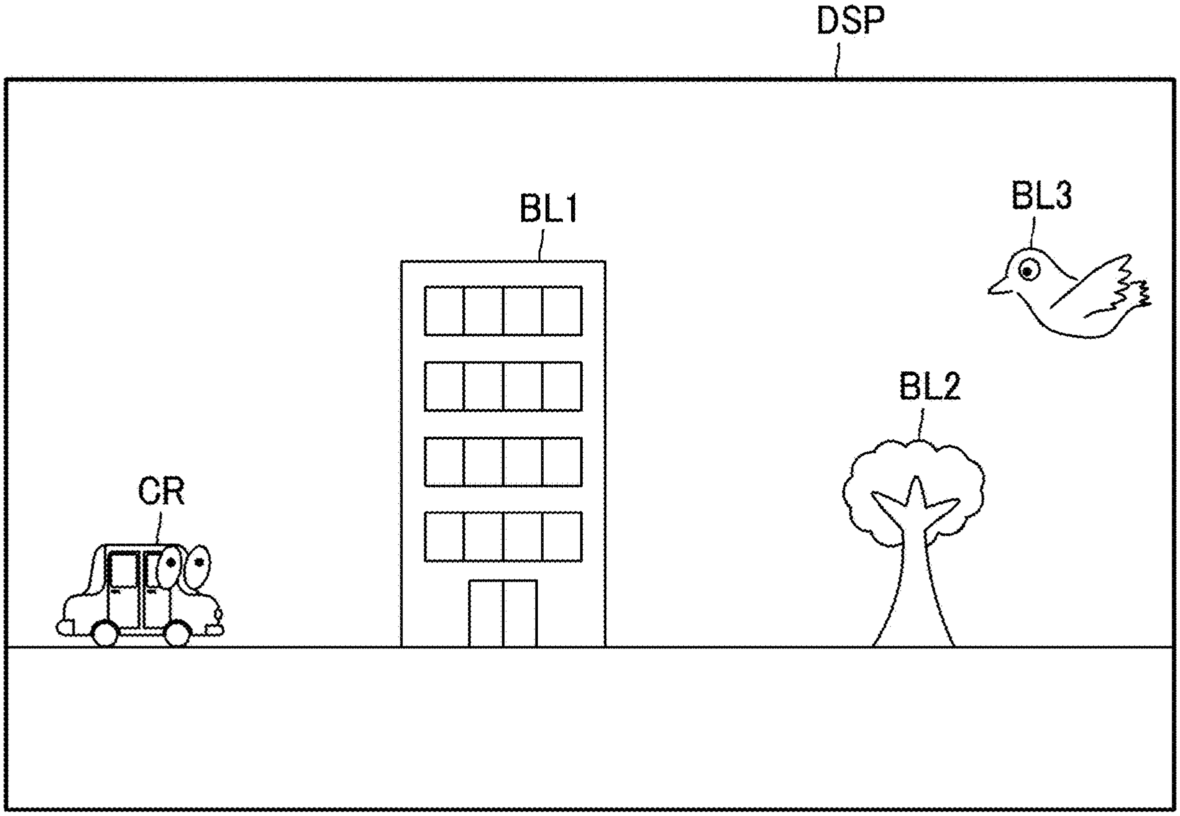
FIG. 34 is a diagram showing a screen shown during an obstacle race game.

In the above-described embodiment, although the commands output from the seat S were used in the dance game, they may be used in any game. For example, as shown in FIG. 34, the commands output from the seat S may be used in an obstacle game in which a character CR with a car as a motif runs around obstacles BL1, BL2, BL3 toward the finish line.

In the obstacle game, the character CR moves relatively toward the right against the background, as the background including the obstacles BL1 to BL3 automatically rolls toward the left of the screen. The character CR goes around the obstacles BL1 to BL3 by making a big jump or a small jump according to the type of the obstacles BL1 to BL3.

The first obstacle BL1 is an obstacle such as a tall building. The character CR can go around the first obstacle by making a big jump at the point in time the character CR approaches the first obstacle BL1.

The second obstacle BL2 is an obstacle such as a tree having a lower height than that of the first obstacle BL1. The third obstacle BL3 is an obstacle such as a bird flying in the sky, and is located on the upper right of the second obstacle BL2. The character CR may make a small jump to jump over the second obstacle BL2 at the point in time the character CR approaches the second obstacle BL2, and then pass under the third obstacle BL3.

In such obstacle game, the first command may be a command for causing the character CR on the screen to jump to a first height. The second command may be a command for causing the character CR on the screen to jump to a second height higher than the first height.

Figure 35:
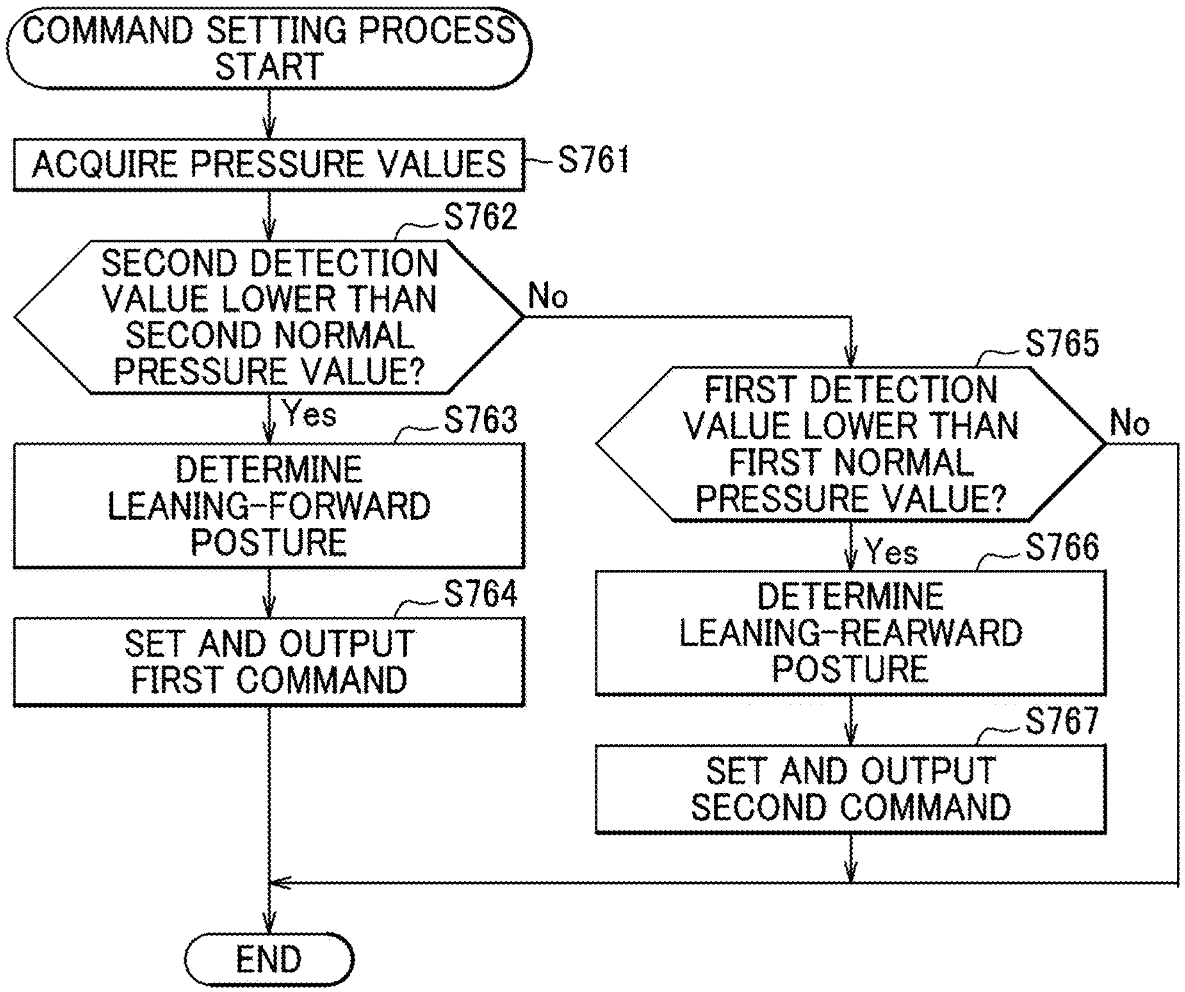
FIG. 35 is a flowchart showing a modified example of the process of the control unit.

In this embodiment, the command setting process, for example, shown in FIG. 35, may be executed by the control unit 100.

In the command setting process, the control unit 100 first acquires pressure values from the forward cushion sensors SE1 and the rearward cushion sensors SE2 (S761). After step S761, the control unit 100 determines whether or not the second detection value detected by the rearward cushion sensors SE2 is lower than the second normal pressure value (S762).

If it is determined in step S762 that the second determination value is lower than the second normal pressure value (Yes), the control unit 100 determines that the posture of the occupant is the leaning-forward posture (S763). That is, in this embodiment, the rearward cushion sensors SE2 are used to determine the leaning-forward posture. After step S763, the control unit 100 sets a first command, outputs the set first command to the smartphone SP (S764), and ends the present process.

If it is determined in step S762 that the second determination value is not lower than the second normal pressure value (No), the control unit 100 determines whether or not the first detection value detected by the forward cushion sensors SE1 is lower than the first normal pressure value (S765).

If it is determined in step S765 that the first detection value is lower than the first normal pressure value (Yes), the control unit 100 determines that the posture of the occupant is the leaning-rearward posture (S766). That is, in this embodiment, the forward cushion sensors SE1 are used to determine the leaning-rearward posture. After step S766, the control unit 100 sets a second command, outputs the second command to the smartphone SP (S767), and ends the present process. If it is determined in step S765 that the first detection value is not lower than the first normal pressure value (No), the control unit 100 ends the present process without setting a command.

Also in this embodiment, since the height of the jump made by the character CR and the posture of the occupant match human senses, the occupant can intuitively enjoy the obstacle game.

The determination of the posture of the occupant using the pressure values acquired from the plurality of pressure sensors 21 to 26 provided at the seat S is not limited to the method in the above-described embodiments. For example, if the fourth lower pressure value is acquired from the right-side back sensors SE4, the control unit 100 may determine that the posture of the occupant is the leaning-leftward posture. If the third lower pressure value is acquired from the left-side back sensors SE3, the control unit 100 may determine that the posture of the occupant is the leaning-rightward posture.

The leaning-forward or leaning-rearward posture and/or the leaning-leftward or leaning-rightward posture may be determined based on a pressure value from one sensor. For example, if the first higher pressure value is acquired from a forward cushion sensor SE1, it can be determined that the posture is the leaning-forward posture, and if the first lower pressure value is acquired from the forward cushion sensor SE1, it can be determined that the posture is the leaning-rearward posture.

The first pressure sensor, the second pressure sensor, the third pressure sensor, and the fourth pressure sensor, are not limited to those described in the above-described embodiments. For example, a sensor provided at the seat back S2 may be the second pressure sensor, and a sensor provided at the seat cushion S1 may be the third sensor or the fourth sensor.

In the above-described embodiment, the controller (control unit 100) is provided at the seat S; however, the controller may be provided at the terminal. In this case, the controller sets the commands to operate the operable object based on information acquired from the sensors, and moves the operable object based on the commands.

In this way, since the process of changing the information from sensors to commands does not have to be performed by the seat S, the processing speed of the seat S can be made faster.

In the above-described embodiment, pressure sensors 21 to 26 are given as examples of a sensor; however, the sensor may be, for example, an optical sensor, a capacitive sensor, etc.

The sensor may be provided at the left and right side portions of the seat cushion or the seat back (the portions protruding from the seat surfaces), the headrest, the armrest, or parts provided near the seat (instrument panel, door, floor), etc.

In the above-described second and third embodiments, the contents of the commands are not limited to those in the above-described embodiments. For example, the first command may be a command for shooting a bullet from a battleplane in a shooting game.

In the above-described embodiments, the results of each game may be uploaded to the cloud. In this case, a world ranking may be viewed via the cloud. A personal record may be stored in the cloud and reviewed later. Records of other people may also be viewed. It is also possible to compare a personal record to another person's record.

The above-described seat experience system may also be applied to an autonomous car. In this case, it is preferable to configure the seat experience system in such a manner that it may be used during autonomous driving. During usage of the seat experience system, it is preferable to limit usage of the seat experience system before terminating autonomous operation. In this case, to avoid the seat experience system from suddenly becoming limited in usage, an advance notice means may be operated to provide audible or visual notification of limited usage after a predetermined time period.

The seat experience system may also be configured such that it may only be used when the car is stopped. Whether the car is stopped may be determined by the car speed being equal to 0 or the shift lever being positioned in the parking range.

In the second embodiment and the third embodiment, similar to the above-described first embodiment, the controller of the seat experience device may be capable of acquiring an abnormality in the outside environment or a malfunction of the seat experience system itself. In this case, it is preferable to limit usage of the seat experience system when an abnormality or a malfunction is acquired. A malfunction of the seat experience system itself includes, for example, a malfunction of the sensor, a malfunction of a harness (breaking), a malfunction in a ECU, a communication error (including a malfunction of the terminal), a malfunction in a temperature control device such as a heater or a fan provided at the seat, a malfunction of an actuator for moving a part of or the whole seat, a malfunction of other sensors such as a seat weight sensor or a temperature sensor, malfunctions relating to the remaining amount or the state of usage of consumables such as the amount of air freshener left for the seat being small, a malfunction of the controller itself, etc. Further, an abnormality in an external environment is, for example, a state which is not desirable for executing the app, which includes a state in which another car is approaching, the road condition is bad, the car speed is high, an earthquake has occurred, a destination is near, a destination has been reached, it is predicted that the game will not end before a destination is reached, the amount of fuel left is small, the battery level is low, the temperature or humidity inside or outside the car is high, etc.

The way to limit usage may include, limiting usage if a malfunction is detected once, or limiting usage if malfunctions are detected a plurality of times. The manner in which usage is limited may be set by a couple of steps. For example, in a first step, a notification via a message or voice that recommends that it is preferable to stop usage is provided, in a second step, a notification via a message or voice that strongly suggests to stop usage is provided, and in a third step, the system is forced to shut down.

When a malfunction of a sensor in a predetermined location is detected, the seat experience system may be configured to recommend a game using other sensors with no malfunction detected. For example, if a malfunction has occurred in a sensor located at the seat surface of the seat cushion, a game is recommend that uses sensors located at side portions on the left and right sides of the seat surface of the seat cushion protruding from the seat surface.

In the above-described embodiment, a smartphone SP was given as an example of a terminal; however the terminal may be a portable terminal such as, for example, a tablet or the like, other than a smartphone SP. The terminal may be a terminal installed on the seat, and may be provided integrally with the seat. The terminal may be a terminal constituting the car navigation system.

In the above-described embodiment, the controller and the seat experience device is connected by wireless communication; however the controller and the seat experience device may be connected by wired communication.

In the above-described embodiment, although a seat installed in a car of an automobile is given as an example of a seat, the seat may be a vehicle seat for a train, etc. other than an automobile, or a vehicle seat for a ship, aircraft, etc. other than a car. The seat may also be a seat for, for example, rehabilitation or training which is installed in locations other than vehicles. The seat is not limited to a vehicle seat but, for example, may be a chair without legs (zaisu).

Any of the elements explained in relation to the exemplified embodiments and illustrative modified examples disclosed in this description may be implemented in combination as desired.

The invention claimed is:

1. A seat experience system comprising:
- a seat comprising:
  - a seat body comprising a seat cushion and a seat back; and
  - a plurality of sensors configured to acquire information for detection of a motion of an occupant seated on the seat body;
  - a controller configured to acquire the information from the plurality of sensors; and
  - a terminal with a screen,
    - wherein the plurality of sensors comprises a first pressure sensor provided at the seat back,
    - wherein the first pressure sensor is configured to:
      - output a first normal pressure value when a posture assumed by the occupant is a normal posture, and
      - output a first lower pressure value lower than the first normal pressure value when the posture assumed by the occupant is a leaning-forward posture in which a weight of the occupant is placed further forward than the weight of the occupant in the normal posture, and
    - wherein the controller is configured to:
      - determine, upon receipt of the first lower pressure value from the first pressure sensor, that the posture of the occupant is the leaning-forward posture;
      - set a first command upon a determination that the posture of the occupant is the leaning-forward posture; and
      - cause an operable object on the screen to perform an action when a pressure value acquired from the first pressure sensor is lower than the first normal pressure value, the first normal pressure value being a pressure value of the first pressure sensor corresponding to a normal seating posture of the occupant.

2. The seat experience system according to claim 1,
- wherein the first pressure sensor is further configured to;
  - output a first higher pressure value higher than the first normal pressure value when the posture assumed by the occupant is a leaning-rearward posture in which the weight of the occupant is placed further rearward than the weight of the occupant in the normal posture, and
- wherein the controller is further configured to:
  - determine, upon receipt of the first higher pressure value from the first pressure sensor, that the posture of the occupant is the leaning-rearward posture;
  - set a second command upon a determination that the posture of the occupant is the leaning-rearward posture; and
  - cause the operable object on the screen to move based on the second command.

3. The seat experience system according to claim 2,
- wherein the first command indicates that an operation to move the operable object on the screen in the upward direction has been performed, and
- wherein the second command indicates that an operation to move the operable object on the screen in the downward direction has been performed.

4. The seat experience system according to claim 2,
- wherein the first command causes the operable object on the screen to jump to a first height, and
- wherein the second command causes the operable object on the screen to jump to a second height higher than the first height.

5. The seat experience system according to claim 2,
- wherein the controller is further configured to:
  - determine, based on the information from the plurality of sensors, whether the posture of the occupant is a leaning-leftward posture in which the weight of the occupant is placed further leftward than the weight of the occupant in the normal posture or a leaning-rightward posture in which the weight of the occupant is placed further rightward than the weight of the occupant in the normal posture,
- wherein a third command is set upon a determination that the posture of the occupant is the leaning-leftward posture, and
- wherein a fourth command is set upon a determination that the posture of the occupant is the leaning-rightward posture.

6. The seat experience system according to claim 5, wherein the plurality of sensors further comprises a second pressure sensor or a third pressure sensor,
wherein the second pressure sensor is configured to:
output a second normal pressure value when the posture assumed by the occupant is the normal posture,
output a second higher pressure value higher than the second normal pressure value when the posture assumed by the occupant is the leaning-leftward posture, and
output a second lower pressure value lower than the second normal pressure value when the posture assumed by the occupant is the leaning-rightward posture,
wherein the third pressure sensor is configured to:
output a third normal pressure value when the posture assumed by the occupant is the normal posture,
output a third lower pressure value lower than the third normal pressure value when the posture assumed by the occupant is the leaning-leftward posture, and
output a third higher pressure value higher than the third normal pressure value when the posture assumed by the occupant is the leaning-rightward posture, and
wherein the controller is further configured to:
determine, upon receipt of the second higher pressure value from the second pressure sensor or upon receipt of the third lower pressure value from the third pressure sensor, that the posture of the occupant is the leaning-leftward posture.

7. The seat experience system according to claim 5, wherein the plurality of sensors further comprises a second pressure sensor or a third pressure sensor,
wherein the second pressure sensor is configured to:
output a second normal pressure value when the posture assumed by the occupant is the normal posture,
output a second higher pressure value higher than the second normal pressure value when the posture assumed by the occupant is the leaning-leftward posture, and
output a second lower pressure value lower than the second normal pressure value when the posture assumed by the occupant is the leaning-rightward posture;
wherein the third pressure sensor is configured to:
output a third normal pressure value when the posture assumed by the occupant is the normal posture,
output a third lower pressure value lower than the third normal pressure value when the posture assumed by the occupant is the leaning-leftward posture, and
output a third higher pressure value higher than the third normal pressure value when the posture assumed by the occupant is the leaning-rightward posture, and
wherein the controller is further configured to:
determine, upon receipt of the second lower pressure value from the second pressure sensor or upon receipt of the third higher pressure value from the third pressure sensor, that the posture of the occupant is the leaning-rightward posture.

8. The seat experience system according to claim 1, wherein the controller is further configured to;
determine, based on the information from the plurality of sensors, whether the posture of the occupant is a leaning-leftward posture in which the weight of the occupant is placed further leftward than the weight of the occupant in the normal posture or a leaning-rightward posture in which the weight of the occupant is placed further rightward than the weight of the occupant in the normal posture,
wherein a third command is set upon a determination that the posture of the occupant is the leaning-leftward posture, and
wherein a fourth command is set upon a determination that the posture of the occupant is the leaning-rightward posture.

9. The seat experience system according to claim 8, wherein the plurality of sensors further comprises a second pressure sensor or a third pressure sensor,
wherein the second pressure sensor is configured to:
output a second normal pressure value when the posture assumed by the occupant is the normal posture,
output a second higher pressure value higher than the second normal pressure value when the posture assumed by the occupant is the leaning-leftward posture, and
output a second lower pressure value lower than the second normal pressure value when the posture assumed by the occupant is the leaning-rightward posture,
wherein the third pressure sensor is configured to:
output a third normal pressure value when the posture assumed by the occupant is the normal posture,
output a third lower pressure value lower than the third normal pressure value when the posture assumed by the occupant is the leaning-leftward posture, and
output a third higher pressure value higher than the third normal pressure value when the posture assumed by the occupant is the leaning-rightward posture, and
wherein the controller is further configured to:
determine, upon receipt of the second higher pressure value from the second pressure sensor or upon receipt of the third lower pressure value from the third pressure sensor, that the posture of the occupant is the leaning-leftward posture.

10. The seat experience system according to claim 9, wherein the second pressure sensor or the third pressure sensor is provided at the seat back.

11. The seat experience system according to claim 8, wherein the plurality of sensors further comprises a second pressure sensor or a third pressure sensor,
wherein the second pressure sensor is configured to:
output a second normal pressure value when the posture assumed by the occupant is the normal posture,
output a second higher pressure value higher than the second normal pressure value when the posture assumed by the occupant is the leaning-leftward posture, and
output a second lower pressure value lower than the second normal pressure value when the posture assumed by the occupant is the leaning-rightward posture,
wherein the third pressure sensor is configured to:
output a third normal pressure value when the posture assumed by the occupant is the normal posture,
output a third lower pressure value lower than the third normal pressure value when the posture assumed by the occupant is the leaning-leftward posture, and
output a third higher pressure value higher than the third normal pressure value when the posture assumed by the occupant is the leaning-rightward posture, and wherein the controller is further configured to;

determine, upon receipt of the second lower pressure value from the second pressure sensor or upon receipt of the third higher pressure value from the third pressure sensor, that the posture of the occupant is the leaning-rightward posture.

12. The seat experience system according to claim 8, wherein the second pressure sensor or the third pressure sensor is provided at the seat back, wherein the third command indicates that an operation to move the operable object on the screen toward the left has been performed, and wherein the fourth command indicates that an operation to move the operable object on the screen toward the right has been performed.

13. The seat experience system according to claim 1, wherein the controller is further configured to:

cause the operable object on the screen to perform an action when a pressure value acquired from the first pressure sensor is higher than the first normal pressure value.

14. The seat experience system according to claim 13, wherein the controller is further configured to:

cause the operable object on the screen to perform an upward action when a pressure value acquired from the first pressure sensor is lower than the first normal pressure value; and cause the operable object on the screen to perform a downward action when a pressure value acquired from the first pressure sensor is higher than the first normal pressure value.

15. The seat experience system according to claim 13, wherein the controller is further configured to:

cause the operable object on the screen to jump to a first height when a pressure value acquired from the first pressure sensor is lower than the first normal pressure value, and cause the operable object on the screen to jump to a second height higher than the first height when a pressure value acquired from the first pressure sensor is higher than the first normal pressure value.

16. The seat experience system according to claim 1, wherein the plurality of sensors further comprises:

a second pressure sensor provided at a left side of a seat surface of the seat back, wherein the controller is further configured to:

cause the operable object on the screen to perform a leftward action when a pressure value acquired from the second pressure sensor is higher than a second normal pressure value, the second normal pressure value being a pressure value of the second pressure sensor corresponding to the normal seating posture of the occupant; and cause the operable object on the screen to perform a rightward action when a pressure value acquired from the second pressure sensor is lower than the second normal pressure value.

17. The seat experience system according to claim 1, wherein the plurality of sensors further comprises:

a third pressure sensor provided at a right side of a seat surface of the seat back, wherein the controller is further configured to:

cause the operable object on the screen to perform a rightward action when a pressure value acquired from the third pressure sensor is higher than a third normal pressure value, the third normal pressure value being a pressure value of the third pressure sensor corresponding to the normal seating posture of the occupant; and cause the operable object on the screen to perform a leftward action when a pressure value acquired from the third pressure sensor is lower than the third normal pressure value.

18. The seat experience system according to claim 1, wherein the plurality of sensors further comprises:

a second pressure sensor provided at a left side of a seat surface of the seat cushion, and wherein the controller is further configured to:

cause the operable object on the screen to perform a leftward action when a pressure value acquired from the second pressure sensor is higher than a second normal pressure value, the second normal pressure value being a pressure value of the second pressure sensor corresponding to the normal seating posture of the occupant; and cause the operable object on the screen to perform a rightward action when a pressure value acquired from the second pressure sensor is lower than the second normal pressure value.

19. The seat experience system according to claim 1, wherein the plurality of sensors further comprises:

a third pressure sensor provided at a right side of a seat surface of the seat cushion, wherein the controller is further configured to:

cause the operable object on the screen to perform a rightward action when a pressure value acquired from the third pressure sensor is higher than a third normal pressure value, the third normal pressure value being a pressure value of the third pressure sensor corresponding to the normal seating posture of the occupant; and cause the operable object on the screen to perform a leftward action when a pressure value acquired from the third pressure sensor is lower than the third normal pressure value.

20. The seat experience system according to claim 1, wherein causing the operable object on the screen to perform an action comprises causing the operable object to disappear from the screen.

* * * * *